(12) United States Patent
Yao et al.

(10) Patent No.: US 12,451,821 B2
(45) Date of Patent: Oct. 21, 2025

(54) ELECTRIC POWER GENERATION FROM AMBIENT HUMIDITY USING PROTEIN NANOWIRES

(71) Applicant: University of Massachusetts, Boston, MA (US)

(72) Inventors: Jun Yao, Boston, MA (US); Derek Lovley, Amherst, MA (US); Xiaomeng Liu, Boston, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 17/280,555

(22) PCT Filed: Sep. 30, 2019

(86) PCT No.: PCT/US2019/053882
§ 371 (c)(1),
(2) Date: Mar. 26, 2021

(87) PCT Pub. No.: WO2020/069523
PCT Pub. Date: Apr. 2, 2020

(65) Prior Publication Data
US 2021/0344286 A1    Nov. 4, 2021

Related U.S. Application Data

(60) Provisional application No. 62/835,023, filed on Apr. 17, 2019, provisional application No. 62/738,320, filed on Sep. 28, 2018.

(51) Int. Cl.
*B82Y 5/00*          (2011.01)
*C07K 14/195*        (2006.01)
(Continued)

(52) U.S. Cl.
CPC ................................ *H02N 1/08* (2013.01)

(58) Field of Classification Search
CPC .......... H02N 3/00; H02N 1/08; H02N 11/002; F03G 7/005; F03G 7/06; H05K 1/0277;
(Continued)

(56) References Cited

U.S. PATENT DOCUMENTS 7,498,155 B2   3/2009  Lovley et al.
8,232,584 B2   7/2012  Lieber
(Continued)

FOREIGN PATENT DOCUMENTS

CN        1527051       9/2004
CN        108365776 A   8/2018
(Continued)

OTHER PUBLICATIONS

English machine translation of Liu et al. (CN 108365776) (Year: 2018).*

(Continued)

*Primary Examiner* — Burton S Mullins
(74) *Attorney, Agent, or Firm* — Hamilton, Brook, Smith & Reynolds, P.C.

(57) ABSTRACT

An electric power generation system is provided. The electric power generation system includes an electric power generation device and an ambient environment comprising an atmospheric relative humidity of at least 20%. The electric power generation device includes a thin film of protein nanowires or a nanowire composite, the thin film having an opposing first surface and second surface. The electric power generation device also includes a first electrode and a second electrode, electrically connected to the first surface and second surface, respectively, of the thin film. At least one of the first surface and the second surface of the thin film is at least partially exposed to the ambient (Continued)

environment. A moisture gradient and charge gradient is therefore created and maintained in the thin film to continuously generate power.

29 Claims, 42 Drawing Sheets

(51) Int. Cl.
  *C12N 1/20* (2006.01)
  *H01B 1/12* (2006.01)
  *H02N 1/08* (2006.01)
(58) Field of Classification Search
  CPC .......... H05K 3/20; H05K 3/207; H05K 3/202;
       H10K 71/60; H10K 71/611; H01G 5/011;
       B82Y 5/00; C07K 14/195; C12N 1/20;
       H02B 1/12
  USPC ..................................... 310/300, 306, 365
  See application file for complete search history.

(56) References Cited

U.S. PATENT DOCUMENTS

| | | | |
|---|---|---|---|
| 8,608,921 B2 | 12/2013 | Li | |
| 8,729,233 B2* | 5/2014 | Reguera | B82Y 5/00 530/350 |
| 8,846,890 B2 | 9/2014 | Reguera et al. | |
| 9,102,521 B2 | 8/2015 | Lieber et al. | |
| 9,234,508 B2* | 1/2016 | Sahin | H01G 5/16 |
| 9,601,227 B2* | 3/2017 | Reguera | H01B 1/12 |
| 9,697,460 B2 | 7/2017 | Collins et al. | |
| 9,784,249 B2* | 10/2017 | Li | H02N 10/00 |
| 10,083,974 B1 | 9/2018 | Huang et al. | |
| 10,311,357 B2 | 6/2019 | Nugent et al. | |
| 10,388,370 B2 | 8/2019 | Schmidt et al. | |
| 10,640,954 B2 | 5/2020 | Kim et al. | |
| 10,684,244 B2 | 6/2020 | Chen | |
| 10,741,778 B2 | 8/2020 | Kirsch et al. | |
| 11,043,265 B2 | 6/2021 | Li et al. | |
| 11,063,227 B2 | 7/2021 | Kirsch et al. | |
| 11,066,449 B2 | 7/2021 | Lovley et al. | |
| 11,133,058 B1 | 9/2021 | Philip et al. | |
| 11,631,824 B2 | 4/2023 | Yao et al. | |
| 11,823,808 B2 | 11/2023 | Lovley et al. | |
| 11,982,637 B2 | 5/2024 | Yao et al. | |
| 12,215,374 B2* | 2/2025 | Dastoor | H10K 10/488 |
| 12,264,207 B2* | 4/2025 | Chen | C08B 37/006 |
| 2006/0057051 A1 | 3/2006 | Dai et al. | |
| 2006/0113880 A1* | 6/2006 | Pei | H02N 2/023 310/800 |
| 2007/0157967 A1 | 7/2007 | Mershin et al. | |
| 2008/0283799 A1 | 11/2008 | Alden et al. | |
| 2009/0188784 A1 | 7/2009 | Lee | |
| 2010/0119879 A1 | 5/2010 | Girguis | |
| 2012/0053319 A1 | 3/2012 | Reguera et al. | |
| 2014/0239237 A1 | 8/2014 | Vajo | |
| 2014/0330337 A1 | 11/2014 | Linke et al. | |
| 2014/0336357 A1 | 11/2014 | Reguera et al. | |
| 2018/0007819 A1 | 1/2018 | Reguera | |
| 2018/0195997 A1 | 7/2018 | Li et al. | |
| 2018/0202964 A1 | 7/2018 | Alam et al. | |
| 2018/0371029 A1* | 12/2018 | Lovley | C07K 14/195 |
| 2019/0148085 A1* | 5/2019 | Kim | B01D 69/06 361/502 |
| 2020/0090830 A1* | 3/2020 | Lovley | C08L 89/00 |
| 2021/0002332 A1* | 1/2021 | Malvankar | C12P 21/02 |
| 2021/0070811 A1 | 3/2021 | Reguera et al. | |
| 2021/0336169 A1 | 10/2021 | Yao et al. | |
| 2021/0341406 A1 | 11/2021 | Yao et al. | |
| 2021/0344286 A1 | 11/2021 | Yao et al. | |
| 2023/0040959 A1 | 2/2023 | Lovley et al. | |
| 2023/0160885 A1 | 5/2023 | Lovley et al. | |
| 2023/0344369 A1 | 10/2023 | Lovley et al. | |

FOREIGN PATENT DOCUMENTS

| | | | |
|---|---|---|---|
| CN | 108365776 B * | 8/2020 | ............ B82Y 40/00 |
| KR | 101203181 | 11/2012 | |
| KR | 101768665 | 9/2017 | |
| WO | 2013033456 A2 | 3/2013 | |
| WO | 2017/015306 A2 | 1/2017 | |
| WO | 2019144931 | 8/2019 | |
| WO | 2019/169331 A1 | 9/2019 | |
| WO | 2020069523 A1 | 4/2020 | |
| WO | 20200191281 A1 | 9/2020 | |
| WO | 2021102327 A1 | 5/2021 | |

OTHER PUBLICATIONS

Notification Concerning Transmittal of International Preliminary Report on Patentability for International Application No. PCT/US2019/053882, entitled: "Electric Power Generation from Ambient Humidity Using Protein Nanowires," mailed Apr. 8, 2021.
Notification of Transmittal of the International Search Report and Written Opinion of International Application No. PCT/US2019/053882, titled: "Electric Power Generation From Ambient Humidity Using Protein Nanowires," mailed Jan. 17, 2020.
Amrin et al., "Electrical properties and conduction mechanism in carboxylfunctionalized multiwalled carbon fianotubes/poly(vinyl alcohol) composites," J Mater Sci (2016) 51:2453-2464.
Balberg et al, "Excluded volume and its relation to the onset of percolation," Physical Review B, vol. 30, No. 7, Oct. 1, 1984.
Bauhofer et al, "A review and analysis of electrical percolation in carbon nanotube polymer composites," Elsevier, Composites Science and Technology 69 (2009) 1486-1498.
Byrne et al., "Recent Advances in Research on Carbon Nanotube-Polymer Composites," Advanced Materials, 2010,22, 1672-1688.
Celzard et al,"Critical concentration in percolating systems containing a high-aspect-ratio filler," Physical Review B, vol. 53, No. 10, Mar. 1, 1996.
Chandrakishore et al, "Facile synthesis of carbon nanotubes and their use in the fabrication of resistive switching memory devices," RSC Advances, 2014, 4, 9905-9911.
Chen et al., "Electrical Conductivity of Polymer Blends of Poly(3,4-ethylenedioxythiophene) : Poly styrenesulfonate) :N-Methyl-2-pyrrolidinone and Polyvinyl Alcohol," Journal of Applied Polymer Science, vol. 125,?134-3141 (2012).
Childers et al., "Geobacter metallireducens accesses insoluble Fe(III) oxide by chemotaxis" Nature, vol. 416, Apr. 18, 2002, pp. 767-769.
Cho et al., "Synthesis and electrical properties of polymer composites with polyaniline nanoparticles," Elsevier, Materials Science and Engineering C 24 (2004) 15-18.
Coppi et al., "Development of a Genetic System for Geobacter sulfurreducens", Applied and Environmental Microbiology, vol. 67, No. 7, Jul. 2001, pp. 3180-3187.
Gangopadhyay et al., "Polyaniline-poly(vinyl alcohol) conducting composite: material with easy processability ?nd novel application potential," Elsevier, Synthetic Metals 123 (2001) 21-31.
Green et al, "Conductive Hydrogels: Mechanically Robust Hybrids for Use as Biomaterials," Macromolecular Bioscience, 2012, 12, 494-501.
Guo et al, "Flexible transparent conductors based on metal nanowire networks," Elsevier, Materials Today, vol. m, No. 3, Apr. 2015.
Li et al., "Ordered multiphase polymer nanocomposites for high-performance solid-state supercapacitors," Elsevier, Composites: Part B 71 (2015), 40-44.
Liu et al., "Flexible supercapacitor sheets based on hybrid nanocomposite materials," Elsevier, Nano Energy (2013) 133-137.
Liu et al., "A Geobacter sulfurreducens Strain Expressing Pseudomonas aeruginosa Type IV Pili Localizes OmcS on Pili but Is Deficient in Fe(III) Oxide Reduction and Current Production", Applied and Environmental Microbiology, vol. go, No. 3, Feb. 2014, pp. 1219-1224.
Lovley et al., "Seeing is believing: novel imaging techniques help clarify microbial nanowire structure and function", Environmental microbiology, vol. 17, Issue 7, 2015, pp. 2209-2215.

(56) References Cited

OTHER PUBLICATIONS

Lovley, "e-Biologics: Fabrication of Sustainable Electronics with 'Green' Biological Materials," American Society for Microbiology, May/Jun. 2017, vol. 8, Issue 3 e00695-17.
Makhlouki et al., "Transport Properties in Polypyrrole-PVA Composites: Evidence for Hopping Conduction," Journal of Applied Polymer Science, vol. 44, 443-446 (1992).
Malhofer et al., "Direct visualization of percolation paths in carbon nanotube/polymer composites," Elsevier, Organic Electronics 45 (2017) 151-158.
Malvankar et al., "Tunable metallic-like conductivity in microbial nanowires", Nature Nanotechnology, vol. 6, Sep. 2011, pp. 573-579.
Malvankar et al., "Lack of cytochrome involvement in long-range electron transport through conductive biofilms and nanowires of Geobacter sulfurreducens", Energy & Environmental Science, vol. 5, 2012, pp. 8651-8659.
Malvankar et al., "Microbial nanowires for bioenergy applications", Current Opinion in Biotechnology, vol. 27, 2017, pp. 88-95.
Malvankar et al., "Microbial Nanowires: A New Paradigm for Biological Electron Transfer and Bioelectronics", ChemSusChem Concepts, vol. 5, 2012, pp. 1039-1046.
Malvankar et al., "Structural Basis for Metallic-Like Conductivity in Microbial Nanowires," Mar./Apr. 2015 mBio vol. 6 Issue 2 e00084-15.
Malvankar et al., Visualization of charge propagation along individual pili proteins using ambient electrostatic force microscopy Nature Nanotechnology, vol. 9, Dec. 2014, pp. 1-10.
Miaudet et al, "Thermo-electrical properties of PVA-nanotube composite fibers," ELSEVIER, ScienceDirect, Polymer 48 (2007) 4068-4074.
Nevin et al., "Anode Biofilm Transcriptomics Reveals Outer Surface Components Essential for High Density Current 14 Production in Geobacter sulfurreducens Fuel Cells", PLoS ONE, vol. 4, Issue 5, May 2009, pp. 1-11.
Nevin et al., "Power output and columbic efficiencies from biofilms of Geobacter sulfurreducens comparable to mixed 15 community microbial fuel cells", Environmental Microbiology, vol. 10, No. 10, 2008, pp. 2505-2514.
Ogura et al.,"A Conductive and Humidity-Sensitive Composite Film Derived from Poly(o-phenylenediamine) and Polyvinyl Alcohol," J_ Electrochem_ Soc., vol. 142, No_ 9, Sep. 1995.
Reardon et al., "Structure of the Type IVa Major Pilin from the Electrically Conductive Bacterial Nanowires of Geobacter sulfurreducens", Journal of Biological Chemistry, vol. 288, No. 41, 2013, pp. 29260-29266.
Reguera et al., "Extracellular electron transfer via microbial nanowires", Nature, vol. 435, Jun. 2005, pp. 1098-1101.
Richter, "Mutational Analysis of Geopilin Function in Geobacter Sulfurreducens", 2011,[retrieved on line Dec. J8, 2016] at <http://scholarworks.umass.edu/open_access_dissertations/378/], 157 pages.
Shih et al., "Tryptophan-Accelerated Electron Flow Through Proteins", Science, vol. 320, Jun. 27, 2008, pp. 1760-1762.
Sun et al, "Flexible polydimethylsiloxane/multi-walled carbon nanotubes membranous metacomposites with negative permittivity," Elsevier, Polymer 125 (2017) 50-57.
Tan et al., "Synthetic Biological Protein Nanowires with High Conductivity," small 2016, 12, No_ 33, 4481-4485.
Tang et al, "Effect of pH on Protein Distribution in Electrospun PVA/BSA Composite Nanofibers," 2012 American Chemical Society, 1269-1278.
Tseng et al.,"Digital memory device based on tobacco mosaic virus conjugated with nanoparticles," nature nanotechnology, vol. 1., Oct. 2006, pp. 72-77.
Vargas et al., "Aromatic Amino Acids Required for Pili Conductivity and Long-Range Extracellular Electron Transport in Geobacter sulfurreducens", mBio, vol. 4, Issue 2, Mar./Apr. 2013, pp. 1-6.
Walker et al., "Electrically conductive pili from pilin genes of phylogenetically diverse microorganisms," The ISME Journal (2018) 12, 48-58.
Wu, S., et al, "Regulation of expression of pilA gene in Myxococcus xanthus," Journal of Bacteriology, 179(24):7748-7758 (1997).
Yang, "Synthesis and characterization of the cross-linked PVA/TiO2 composite polymer membrane for alkaline DMFC," Elsivier, Journal of Membrane Science 288 (2007) 51-60.
Yang, Yen-Chun, et al., "PilR enhances the sensitivity of Xanthomonas axonopodis pv. citri to the infection of filamentous bacteriophage Cf," Current Microbiology, 48(4):251-261 (2004).
Zezelj et al., Publisher's Note: From percolating to dense random stick networks: Conductivity model nvestigation (Phys. Rev_ B 86, 134202 (2012)]. Physical Review B 86, 139904(E) (2012).
Zhang et al., "Composite films of nanostructured polyaniline with poly(vinyl alcohol)," Elsevier, Synthetic Metals 128 (2002) 83-89.
Zhang et al., "Electrical and dielectric behaviors and their origins in the three-dimensional polyvinyl alcohol/MWCNI pomposites with low percolation threshold," Elsevier, Carbon 47 (2009) 1311-1320.
Liu, et al., "Biological Synthesis of High-Conductive Pili in Aerobic Bacterium Pseudomonas Aeruginosa," Applied Microbiology and Biotechnology (2019) 103:1535-1544.
Guterman, et al., "Toward Peptide-Based Bioelectronics: Reductionist Design of Conductive Pili Mimetics," Bioelectron Med (Lond.) May 2018: 1(2): 131-137.
Rico, et al., "Functional Reconstitution of the Type Iva Pilus Assembly System from Enterohaemorrhagic *Escherichia coli*," Mol Microbiol. Mar. 2019; 111(3): 732-749.
Al-Abadleh, et al., "FT-IT study of water adsorption on aluminum oxide surfaces," Langmuir 19, 341-347 (2003).
Audette, G. et al., "Protein Nanotubes: From Bio-nanotech towards Medical Applications," Biomedicines Journal, Jun. 2019, vol. 7/46 (2019).
Bai, J. et al., "Sunlight-coordinated high-performance moisture power in natural condition," Adv. Mater. (2022) https://doi.org/10.1002/adma.202103897.
Cheng, H. et al., "Spontaneous power source in ambient air of a well-directionally reduced graphene oxide bulk," Energy Environ. Sci. 11, 2839 (2018).
Fereiro, J.A. et al., "Tunneling explains efficient electron transport via protein junctions," Weizmann Institute of Science Reports, vol. 114; No. 20 (2017).
Fu, T. et al., "Self-sustained green neuromorphic interfaces," Nat. Commun. 12, 3351 (2021).
Gielen, et al., "The role of renewable energy in the global energy transformation," Energy Strategy Rev. 24, 38-50 (2019).
Han, et al., "Facile synthesis of poly(3,4-ethylenedioxythiophene) nanofibers from an aqueous surfactant solution," Small 2, 1164-1169 (2006).
Kaunda, et al., "Hydropower in the context of sustainable energy supply: a review of technologies and challenges," ISRN Renewable Energy 2012, 730631 (2012).
Langmuir, "Vapor pressures, evaporation, condensation and adsorption," J. Am. Chem. Soc. 54, 2798-2832 (1932).
Liu, et al., "Induced potential in porous carbon films through water vapor absorption," Angew. Chem. Int. Ed. 55, 8003-8007 (2016).
Liu, T. et al., "Regulating the interlayer spacing of graphene oxide membranes and enhancing their stability by use of PACI," Environ. Sci. Technol. 53, 11949-11959 (2019).
Liu, X. et al., "Multifunctional protein nanowire humidity sensors for green wearable electronics," Adv. Electron. Mater. 6, 2000721 (2020).
Lovley, et al., "Intrinsically conductive microbial nanowires for 'green' electronics with novel functions," Trends Biotechnol. 39, 940-952 (2021).
Márquez, A. et al., "Nanoporous silk films with capillary action and size-exclusion capacity for sensitive glucose determination in whole blood," Lab Chip 21, 608-615 (2021).
Pang, et al, "The pressure exerted by a confined ideal gas," J. Phys. A: Math. Theor. 44, 365001 (2011).
Paradiso, et al., "Energy scavenging for mobile and wireless electronics," IEEE Pervasive Comp. 4, 18-27 (2005).
Qin, Y. et al., "Constant electricity generation in nanostructured silicon by evaporation-driven water flow," Angew. Chem. Int. Ed 59, 10619-10625 (2020).

(56) References Cited

OTHER PUBLICATIONS

Ren, G. et al., "A facile and sustainable hygroelectric generator using whole-cell Geobacter sulfurreducens," Nano Energy 89, 106361 (2021).
Revil, et al., "Theory of ionic-surface electrical conduction in porous media," Phys. Rev. B 55, 1757-1773 (1997).
Rezende, et al., "Detection of charge distributions in insulator surfaces," J. Phys. Condens. Matter 21, 263002 (2009).
Shen, et al., "Moisture-enabled electricity generation: from physics and materials to self-powered applications," Adv. Mater. 32, 2003722 (2020).
Sisman, et al., "Quantum boundary layer: a non-uniform density distribution of an ideal gas in thermodynamic equilibrium," Phys. Lett. A 362, 16-20 (2007).
Sisman, et al., "The Casimir-like size effects in ideal gases," Phys. Lett. A 320, 360-366 (2004).
Stokes, et al., "A. Standard solutions for humidity control at 25° C," Ind. Eng. Chem. 41, 2013 (1949).
Sun, Z. et al., "Emerging design principles, materials, and applications for moisture-enabled electric generation," eScience (2022) https://doi.org/10.1016/j.esci.2021.12.009.
Tang, et al., "Compilation and evaluation of gas phase diffusion coefficients of reactive trace gases in the atmosphere: vol. 2. Diffusivities of organic compounds, pressure-normalized mean free paths, and average Knudsen numbers for gas uptake calculations," Atoms. Chem. Phys. 15, 5585-5598 (2015).
Yin, B., et al., "Bioinspired and bristled microparticles for ultrasensitive pressure and strain sensors," Nat. Commun. 9, 5161 (2018).
Zhang, et al., "Digestion of ambient humidity for energy generation," Joule 4, 2532-2536 (2020).
Zhang, et al., "Emerging hydrovoltaic technology," Nat. Nanotechnol. 13, 1109-1119 (2018).
Zhang, et al., "Sub-10 nm wide cellulose nanofibers for ultrathin nanoporous membranes with high organic permeation," Adv. Funct. Mater. 26, 792-800 (2016).
Zhao, F. et al., "Direct power generation from a graphene oxide film under moisture," Adv. Mater. 27, 4351-4357 (2015).
Zhou, et al., "Origin of the chemical and kinetic stability of graphene oxide," Sci. Rep. 3, 2484 (2013).
Hanikel "MOF water harvesters", Nature Nanotechnology, vol. 15, pp. 348-355 (2020). (Year: 2020).
Hanikel et al. "Rapid cycling and expectional yield in a metal-organic framework water harvester", ACS Cent. Sci. 5, pp. 1699-1706 (2019). (Year: 2019).
http://en.wikipedia.org/wiki/Adsorption (Year: 2024).
Huang et al., "Interface-mediated hygroelectric generator with an output voltage approaching 1.5 volts", Nat Commun. Oct. 9, 2018; 9(1):4166. doi: 10.1038/s41467-018-06633-z. PMID: 30301892; PMCID: PMC6177432. (Year: 2018).
Kim et al. "Water harvesting from air with metal-organic frameworks powered by natural sunlight" Science Apr. 13, 2017 vol. 356, Issue 6336, pp. 430-434. DOI: 10.1126/science.aam8743 (Year: 2017).
Wang et al. "Moisture adsorption-desorption full cycle power generation" Nat Commun 13, 2524 (2022). http://doi.org/10.1038/s41467-022-30156-3 (Year: 2022).
Yin, Jun et al. "Hydrovoltaic Energy on the Way" Joule, vol. 4, Issue 9, pp. 1852-1855, Sep. 16, 2020. (Year: 2020).
Ueki T., et al., Decorating the Outer Surface of Microbially Produced Protein Nanowires with Peptides, ACS Synth Biol. Aug. 16, 2019;8(8):1809-1817.
Ueki T., et al., An *Escherichia coli* Chassis for Production of Electrically Conductive Protein Nanowires, ACS Synth Biol. Mar. 20, 2020;9(3):647-654.
Liu X., et al., "Power Generation from Ambient Humidity Using Protein Nanowires," Nature; 578: 550-554 (2020).
Lovley, D. R., Electrically conductive pili: Biological function and potential applications in electronics, Curr. Opin. Electrochem. 4, 190 (2017).
Lovley, D., et al., "Geobacter Protein Nanowires", Front. Microbiol. 10, 2078 (2019).
Adhikari, R. Y., et al., Conductivity of individual Geobacter pili, RSC Adv. 6, 8354 (2016).
Tan, Y. et al. Expressing the Geobacter metallireducens PilA in Geobacter sulfurreducens Yields Pili with Exceptional Conductivity. MBio. 8, 02203-16 (2017).
Adhikari, R. Y., et al. Conductivity of individual Geobacter pili. RSC Advances 6, 8354-8357 (2016).
Malvankar, N.S., et al., "Tunable Metallic-Like Conductivity in Microbial Nanowire Networks", Nat. Nanotechnol. 6, 573-579 (2011).
Milano, Gianluca, et al., "Self-limited single nanowire systems combining all-in-one memristive and neuromorphic functionalities", Dec. 2018, Nature Communications, Article No. 5151. pp. 1-10 (Year: 2018).
Fu, Tianda, et al, "Bioinspired bio-voltage memristors", Nature Communications, 2020, Article pp. 1-10 (Year: 2020).
Kumar, Anish, et al., "Protein Biosensors Based on Polymer Nanowires, Carbon Nanotubes and Zinc Oxide Nanorods", Sensors Journal, May 2011, 5087-5111 (Year: 2011).
Zhou, Jiangfeng, et al., "Development of nanowire-modified electrodes applied in the locally enhanced electric field Treatment (Lee FT) for water disinfection", 2020, Journals of Materials Chemistry. Article, 12262-12277 (Year: 2020).
Liu, Xiaomeng, et al, "Power generation from ambient humidity using protein nanowires", Feb. 2020, pp. 550-556 (Year: 2020).
Cui, Yi, et al, "Nanowire Nanosensors for Highly Sensitive and Selective Detection of Biological and Chemical Species", Aug. 2021, Science Magazine, vol. 293, pp. 1289-1292. (Year: 2021).

\* cited by examiner

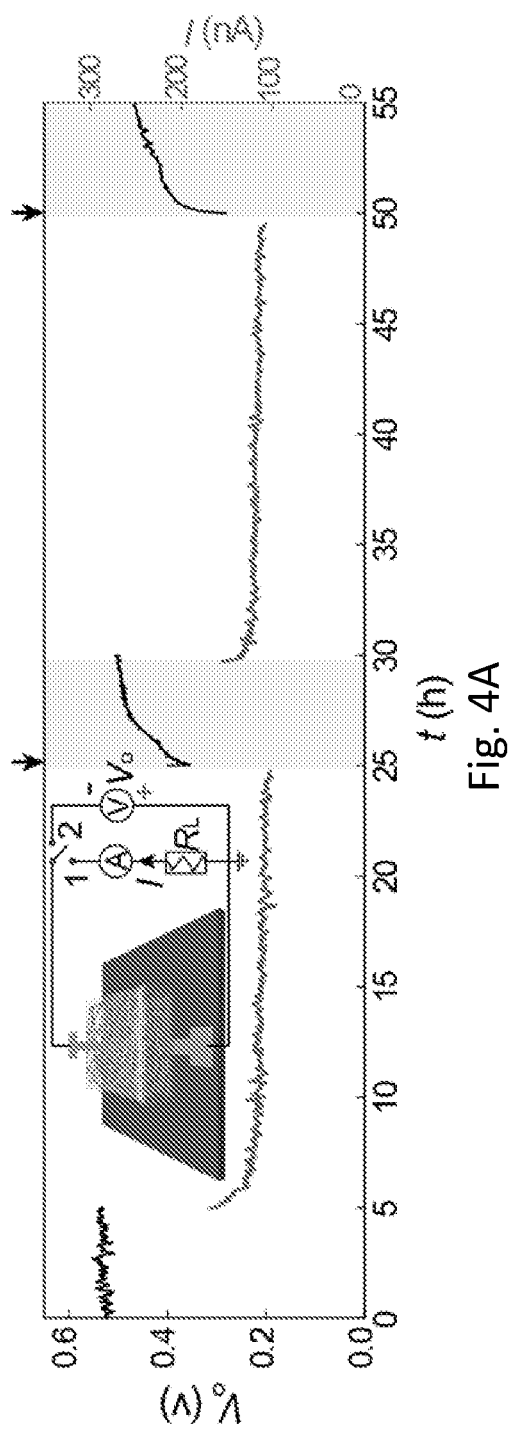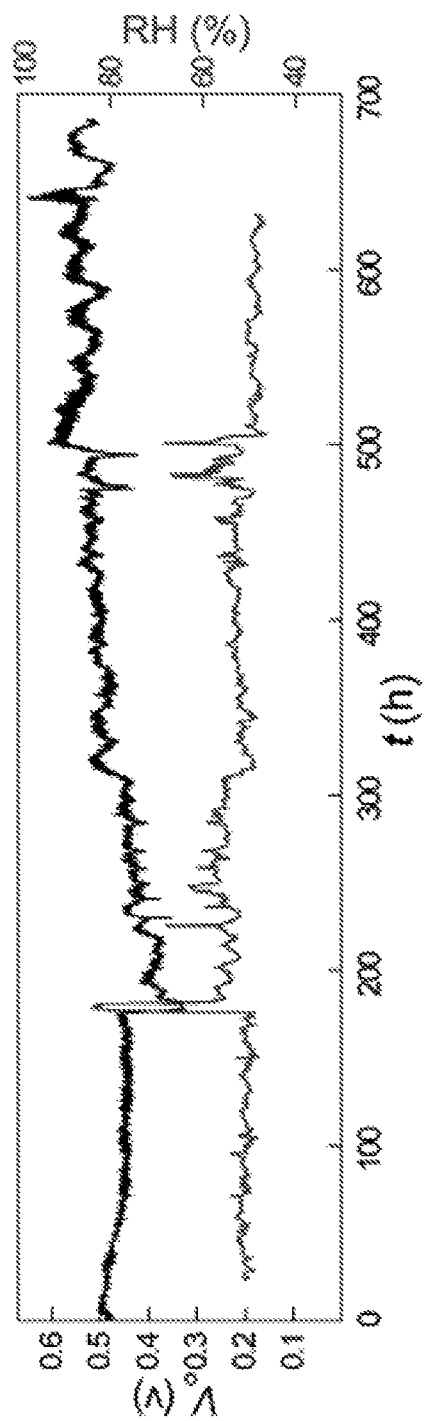
Fig. 4A
Fig. 4B

ELECTRIC POWER GENERATION FROM AMBIENT HUMIDITY USING PROTEIN NANOWIRES

This application is the U.S. National Stage of International Application No. PCT/US2019/053882, filed Sep. 30, 2019, published in English, which claims the benefit of U.S. Provisional Application No. 62/738,320, filed Sep. 28, 2018 and U.S. Provisional Application No. 62/835,023, filed Apr. 17, 2019. The entire teachings of the above applications are incorporated herein by reference.

TECHNICAL FIELD

The present invention relates generally to the production of electric power, and more particularly, to devices fabricated with conductive protein nanowires or nanowire composites that generate electric power from ambient atmospheric moisture and methods of using such devices to generate continuous electric power.

BACKGROUND

Sustainable sources of power are required to mitigate environmental threats associated with fossil fuels. Harvesting energy from the environment has shown growing potential in providing clean energy and supporting self-sustained systems. Known technologies include solar cells, wind turbines, thermoelectric devices, and mechanical generators. Each of these technologies is constrained by specific environmental conditions such as light intensity, wind speed, thermal gradient, and vibration density, and hence are limited in providing continuous and ubiquitous energy.

Atmospheric moisture, which has elevated free energy compared to liquid water, is a diffusive and ubiquitous energy source. For example, even the Sahara Desert has an average relative humidity (RH) around 25%. The earth's atmosphere, in fact, contains an amount of water equivalent to 10% of total volume of freshwater lakes in the world. When condensed to liquid water, this atmospheric supply of water can release nearly $10^{18}$ kJ of energy, which is an order of magnitude larger than annual global electricity consumption (which is around $10^{18}$-$10^{17}$ kJ). This potential has aroused recent interest in developing methods for harvesting the energy available in atmospheric moisture. Two main strategies have generally been adopted.

The first strategy relies on a moisture gradient near sources of liquid water to drive micro/nanofluidic water transport in a thin film to induce charge imbalance and transport for electric output. This technology, however, is restricted to environments where there is an existing liquid water source (e.g., near a body of water or water surface) and may be difficult to scale up.

The second strategy relies on an engineered gradient in surface functional groups in carbon material (e.g., carboxyl group) to induce a vertical gradient in ionized mobile charge (e.g., $H^+$) in an ambient humid environment. The diffusion of the mobile charges leads to electric potential similar to that in a biological cell membrane. However, the power output of devices according to this strategy are only capable of producing brief bursts (less than 50 sec) of current (around 0.9 $\mu A/cm^2$, or a power density around 30 $\mu W/cm^3$) before the device voltage collapses. Re-establishing the voltage (to around 0.2 V or 20 V/cm) through self-recharging, then requires around 100 s. Accordingly, the charging time greatly exceeds the time of power output. Additionally, slow decay in current generation is likely due to induced gradual modification of hydroxyl groups on graphene surface in the ambient environment.

SUMMARY

A new device for sustainably and continuously producing electric power in the ambient environment is provided. Instead of relying on a liquid water source, the device can use moisture naturally present in the ambient environment in the form of atmospheric humidity. The device, therefore, can operate and continuously produce electric power where there is no liquid water source. The device is fabricated with conductive protein nanowires produced by the microorganism *Geobacter sulfurreducens*. The continuous power generation results from an depth-dependent humidity adsorption in the protein nanowire film. This creates a vertical moisture gradient in the protein nanowire film, as will be described herein. This moisture gradient results in a vertical charge gradient and the charge gradient, therefore, produces a steady electric field or DC voltage for powering electronics.

The power output of the disclosed invention is continuous and stable in the ambient environment. The output voltage can be maintained in devices of less than 1 $mm^2$ (thickness of around 5 $\mu m$) and can yield an instant power density of around 13 $kW/m^3$. Even without optimization, this value exceeds a number of well-established energy-harvesting technologies. Furthermore, unlike solar panels that are inherently confined to a 2D-plane configuration, the technology described here can be stacked in 3D configurations (as moisture is 3D diffusive) to greatly increase the power output within a given square area.

The protein nanowire technology of the disclosed invention enables electric power generation from anywhere, at any time, in an ambient environment and thus is more versatile than existing technologies such as solar cells, wind turbines, and mechanical generators that are inherently intermittent and limited by environmental conditions.

Moreover, the thin film device of the disclosed invention can readily be "painted" on a diversity of surfaces (e.g., clothes, walls), and can therefore serve as the basis for "electronic fabrics" or be incorporated into a broad range of electronic devices, to provide instant electric power.

According to an aspect of the invention, an electric power generation system is provided. The electric power generation system includes an electric power generation device. The electric power generation device includes a thin film or biofilm of protein nanowires or a nanowire composite. The thin film or biofilm has an opposing first surface and second surface. The electric power generation device includes a first electrode electrically connected to the first surface of the thin film or biofilm, and a second electrode electrically connected to the second surface of the thin film or biofilm. The electric power generation system also includes an ambient environment including an atmospheric relative humidity of at least 20%. At least one of the first surface and the second surface of the thin film or biofilm is at least partially exposed to the ambient environment, and a moisture gradient is created and maintained in the thin film or biofilm.

In an embodiment, the protein nanowires are harvested from one or more of the microorganisms *Geobacter sulfurreducens*, *Geobacter metallireducens*, *Syntrophus aciditrophicus*, and *Methanospirillum hungatei*.

In another embodiment, the protein nanowires are genetically modified Aro-5 nanowires.

In another embodiment, the protein nanowires are OmcS-pili nanowires. In another embodiment, the protein nanowires are OmcS-OmcS pili nanowires.

In another embodiment, the protein nanowires are organic synthetic nanowires.

In another embodiment, at least two electric power generation devices are stacked in a three-dimensional configuration. At least one of the first surface and the second surface of the thin film or biofilm of each electric power generation devices are at least partially exposed to the atmospheric relative humidity in the ambient environment.

In another embodiment, the first electrode and the second electrode include one or more of gold, platinum, aluminum and carbon.

In another embodiment, the thin film has a thickness in the range of 0.5 μm-500 μm.

In another embodiment, the atmospheric relative humidity is in the range of 30%-90%.

According to another aspect of the invention, a method of continuously producing electric power using atmospheric relative humidity in an ambient environment is provided. The method includes providing an electric power generation device. The electric power generation device includes a thin film or biofilm of protein nanowires or a nanowire composite. The thin film or biofilm has an opposing first surface and second surface. The electric power generation device further includes a first electrode electrically connected to the first surface of the thin film or biofilm, and a second electrode electrically connected the second surface of the thin film or biofilm. The method then includes at least partially exposing at least one of the first surface and the second surface of the thin film or biofilm of the electric power generation device to the ambient environment, wherein the atmospheric relative humidity is at least 20%, and forming and maintaining a moisture gradient in the thin film or biofilm. The method then includes continuously generating power in the electric power generation device.

In an embodiment, the protein nanowires are harvested from one or more of the microorganisms *Geobacter sulfurreducens, Geobacter metallireducens, Syntrophus acidi-trophicus*, and *Methanospirillum hungatei*.

In another embodiment, the protein nanowires are genetically modified Aro-5 nanowires.

In another embodiment, the protein nanowires are OmcS-pili nanowires.

In another embodiment, the protein nanowires are OmcS-OmcS pili nanowires.

In another embodiment, the protein nanowires are organic synthetic nanowires.

In an embodiment, the method further includes providing at least two of the electric power generation devices and stacking the at least two electric power generation devices in a three-dimensional configuration. The method then includes at least partially exposing at least one of the first surface and the second surface of the thin film or biofilm of each of the electric power generation devices to the ambient environment, wherein the atmospheric relative humidity is at least 20%. The method then includes forming and maintaining a moisture gradient in the thin film or biofilm of each of the electric power generation devices, and continuously generating a power output from each of the electric power generation devices.

In another embodiment, the first electrode and the second electrode include one or more of gold, platinum, aluminum and carbon.

In another embodiment, the thin film has a thickness in the range of 0.5 μm-500 μm.

In another embodiment, the atmospheric relative humidity is in the range of 30%-90%.

In another embodiment, the power output is associated with the atmospheric relative humidity.

BRIEF DESCRIPTION OF THE DRAWINGS

FIG. 4A is a graph showing the evolution of I and $V_o$ the electric power generation device of the present invention in an ambient environment with a relative humidity of around 50%.

FIG. 4B is a graph showing the continuous recording of $V_o$ from the electric power generation device of the present invention for 700 hours.

DETAILED DESCRIPTION

The present disclosure is directed to a method of generating continuous electric power using an electric power generator having a thin film of protein nanowires, for example, protein nanowires harvested from the microorganism *Geobacter sulfurreducens*. The electric power generator of the present disclosure generates continuous electric power in the ambient environment, producing sustained voltage of, for example, around 0.5 V across a 7 µm film thickness with a current density of around 17 µA/cm². The driving force behind this phenomenon is the self-maintained moisture gradient that forms within the film when exposed to the atmospheric humidity naturally present in ambient environments. Connecting multiple devices linearly can scale up voltage and current to power a wide variety of electronics, such as for example wearable personal electronics, portable energy sources, and mobile devices. The electric power generator disclosed herein can produce continuous electric power from ambient atmospheric moisture with 100-fold improvement in power density over previously known devices.

Figure 1:
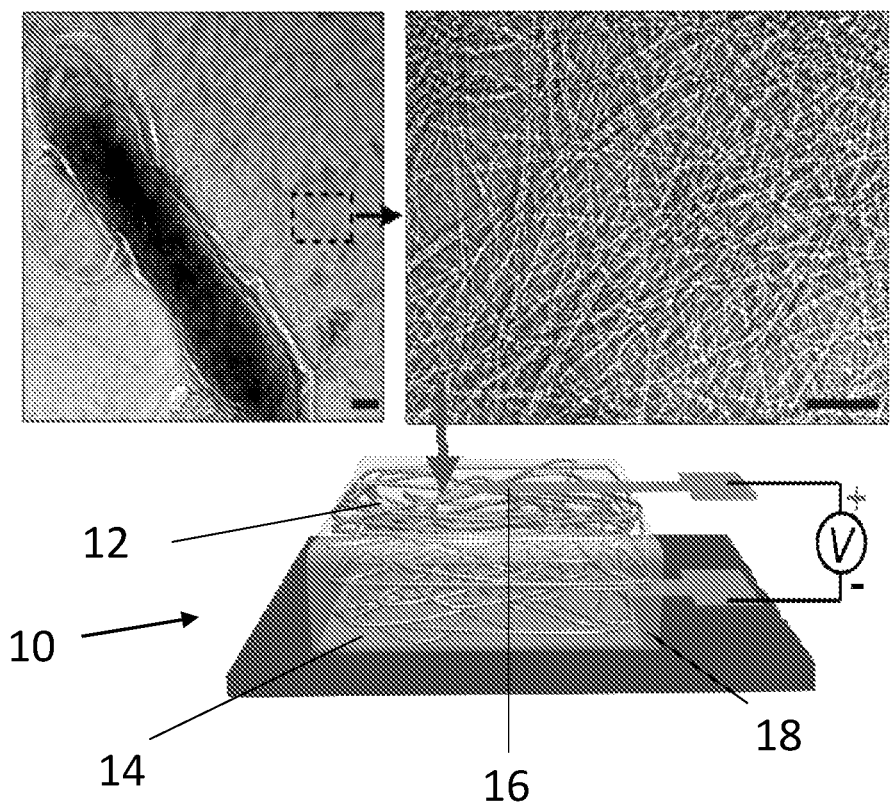
FIG. 1 is a schematic drawing of an electric power generation device in accordance with an aspect of the present invention, including TEM images of a nanowire network and the microorganism *Geobacter sulfurreducens*.

FIG. 1 depicts an exemplary structure of an electric power generator device 10 (bottom image) according to an aspect of the present disclosure. As depicted, a thin film of protein nanowires 12 is deposited on a first electrode 14. The thin film of protein nanowires 12 may be, for example, around 7 µm thick. The thin film, however, may be anywhere in the range of, for example, 0.5 µm-20 µm, 1.0 µm-15 µm, 2.0 µm-10 µm, 3.0 µm-8.0 µm, 4.0 µm-7.0 µm, or 5.0 µm-6.0 µm. The first electrode 14 may be, for example, made of gold (Au), platinum (Pt), aluminum (Al), carbon (C) or other suitable materials. The first electrode 14 may have an area of around 25 mm². The first electrode 14 may, however, have any area that is the same size or smaller than the area of the protein nanowire film. The first electrode 14 may be patterned on a glass substrate 18. A second electrode 16 is disposed on top of the thin film of protein nanowires 12. The second electrode 16 may have an area of around 1 mm² or may have any area that is smaller than the area of the protein nanowire film to allow exposure of the protein nanowire film to the ambient atmosphere. The second electrode 16 may be, for example, made of Au, Pt, Al, or other suitable materials, similar to the first electrode 14. The second electrode 16 may be in a mesh form, or may otherwise be porous. The first and second electrodes 14, 16 are positioned on opposing surfaces of the thin film of protein nanowires, so as to measure an electric field or DC voltage through the thin film. At least one surface of the thin film is at least partially exposed to the ambient environment so that ambient atmospheric humidity can reach the thin film.

The protein nanowires 12 may be, for example, pili sheared from the microorganism *Geobacter sulfurreducens* (GS). In an embodiment, the pili are electrically conductive. Examples of other protein nanowires include the protein nanowires produced by the bacterium *Geobacter metaffireducens* (GM). These wires have the same diameter (3 nm) as the GS wires, but are 5,000-fold more conductive. The protein nanowires produced by bacterium *Syntrophus acidi-trophicus* (SA) may also be used. These wires are only slightly thicker (4 nm) than the GS wires and have similar conductivity. The protein wires produced by the archaeon *Methanospirillum hungatei* (MH) may also be used and are of somewhat larger diameter (10 nm) and more conductive than the GS wires. In addition, the gene for the pilin monomer that GS assembles into protein nanowires can be modified to yield "synthetic protein nanowires" with higher conductivities as described in U.S. Patent Publication No. 2018/0371029A1, which is incorporated herein by reference. The protein nanowires 12 may also be produced from expression of the pillin genes of various bacteria and archaea in an appropriate host organism. For example, the protein nanowires may be variants of various pillin genes that exist in nature.

FIG. 1 also depicts transmission electron microscopy (TEM) images of the microorganism GS (top left image) and the purified nanowire network produced by GS (top right image), with the depicted scale bar representing 100 nm. As depicted, the protein nanowires 12 have an average diameter of around 3 nm and an average length of around 1-3 μm and form a mesh network in the film.

Figure 2A:
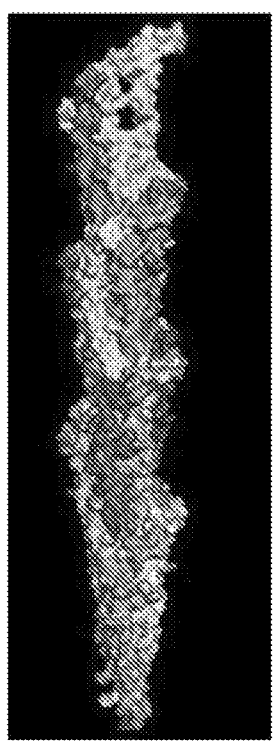
FIGS. 2A-B are views of a pilus structure modeled by a molecular dynamics simulation.
Figure 2B:
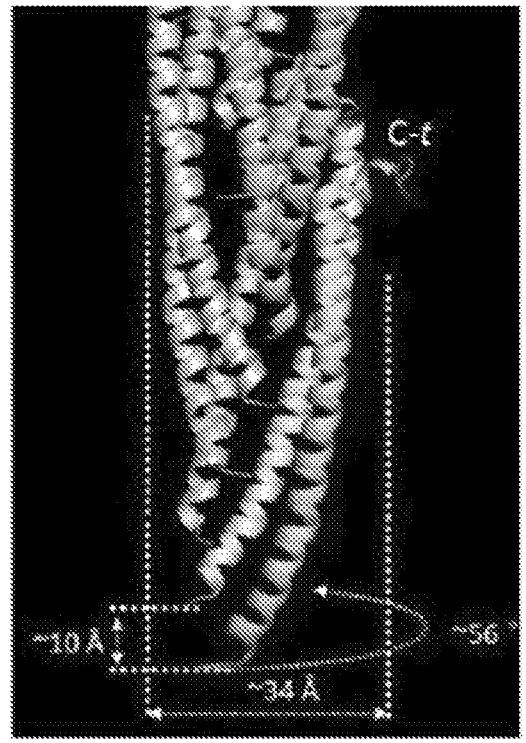
Figure 2C:
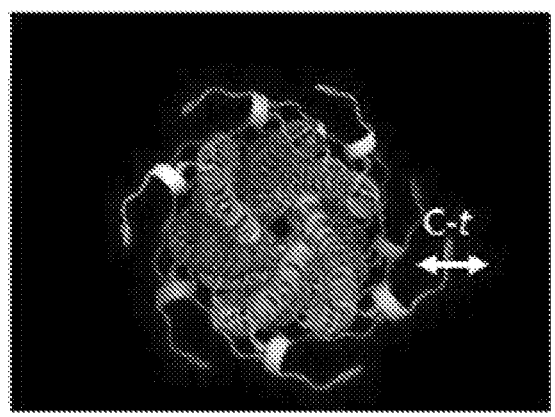
FIG. 2C is a top view of the pilus structure modeled in FIGS. 2A-B.

In one embodiment, the protein nanowire film 12 is a conductive microbial protein nanowire (c-MPN) film. A c-MPN is a microbial pilus that assembles from a single peptide subunit known was a pilin. Each pilin's N-terminal (N-t) bonds to a neighboring one through helical salt bridge with around 10.5 Å raise to form the pilus core, depicted in FIGS. 2A-B. The C-terminal (C-t), however, is a flexible end slightly bent way from the axis of the pilus core and considered as electron-exchange site for GS' extracellular reduction of iron oxides. Together, the pilus features an average diameter of around 35 Å (the core) with a helical bulge of around 47 Å (the C-t) in solution (FIG. 2B). Under dehydration, the C-t contracts and yields a reduced helical bulge (e.g., around 40 Å). Such conformational change effectively produces swelling and deswelling in individual pilus at hydrated and dehydrated states, respectively (FIG. 2C). For the close packing between c-MPNs revealed by TEM, the deswelling and swelling effectively turn ON and OFF the molecular channels (i.e., inter-pilus spacing) of water vapor passing through the c-MPN film. This means that in an initially dehydrated c-MPN film, atmospheric moisture goes through the film and reaches the bottom interface to form residual moisture. However, as the top surface adsorbs moisture at a faster rate (due to proximity to atmospheric moisture) and reaches a completely hydrated/swelled state, all the molecular channels for water passage are closed in the top surface layer and the c-MPN layer beneath no longer has a moisture supply. This is how the moisture gradient is created and maintained in the thin film.

As such, a dehydrated c-MPN film, which does not produce voltage output initially, gradually builds up a voltage when placed in the ambient environment. Moreover, a c-MPN film in the ambient environment is water vapor tight, whereas a dehydrated film is not. Meanwhile, the high-density (around 1 $nm^{-1}$) carboxylic groups innate to c-MPN tend to be protonated in the hydrated state. The moisture gradient creates a gradient in protonation or a concentration gradient of the mobile protons that is similar to the membrane potential in biological systems. The downstream sides are the high potential (+) side. The charge diffusion also determines that a potential/voltage difference is proportional to an ion-concentration difference. Accordingly, a moisture difference (assume ionization is proportional to adsorbed moisture) determines the output voltage.

In other embodiments, the protein nanowires may involve different species, such as genetically modified Aro-5 nanowires, OmcS-OmcS nanowires, and/or OmcS-pili nanowires. Additionally, synthetic protein nanowires may be used, as described above. In these embodiments, the protein nanowires are known to have non-uniform diameters with periodic surface structures along the axis. As a result, nanometer-scale pores or nanopores form at nanowire-nanowire interface in the protein nanowire film. An average nanopore size may be, for example, in the range of 0.1 nm-10 nm in the largest dimension. Even at the most compact stacking configuration in different wires, there still exist nanopores that allow for water molecule passage. The nanowires are randomly distributed, indicating a wide distribution of nanopores.

In any embodiment, the existence of a high density of these nanopores in the film helps to account for the existence and self-maintenance of a moisture gradient within the thin film when the thin film is exposed to ambient atmospheric humidity. Specifically, vapor pressure lowering is generally observed in porous medium due to the contribution of a capillary pressure, and this effect is stronger for smaller pore size. In fact, for water vapor, substantial effect can be observed at a nanometer-scale pore size, which the protein nanowire film of the present disclosure has. At steady state, a vapor-pressure gradient exists at the air-material interface. For a thin nanowire film (e.g., less than 7 μm thick), the entire thickness is within this interfacial gradient, whereas thicker nanowire films extend over the finite gradient region. Furthermore, water adsorption at a solid surface is a dynamic equilibrium involving constant adsorption-desorption exchange at the interface. In a general recombination dynamic, the adsorption is proportional to molecular concentration or the vapor pressure. As a result, the induced vapor pressure gradient in the nanowire film leads to a moisture gradient. Saturation in the vapor-pressure difference for thicker film leads to a saturation in moisture-adsorption difference ($\Delta W_{H_2O}\%$).

The moisture gradient accounts for the voltage generation in the nanowire films of the present disclosure. The surface functional groups (e.g., carboxylic group) innate to the nanowires are a source of exchangeable protons. The moisture gradient creates an ionization gradient in the carboxylic groups or a concentration gradient in mobile protons (against an immobile —$COO^-$ anionic background). The proton gradient leads to its diffusion, further facilitated by a hole-like conduction in the nanowire. This charge diffusion induces a counterbalancing electrical field or potential analogous to the resting membrane potential in biological systems. The lower-moisture side always has higher (+) potential. In particular, the built-up voltage is proportional to the difference in proton concentration, which is considered closely related to $\Delta W_{H_2O}\%$. This is consistent with the fact that $\Delta W_{H_2O}\%$ is closely correlated with output voltage. A high density of nanopores helps to form the moisture gradient, and a high density of surface functional groups subsequently leads to a potential gradient by charge diffusion in the film. In contrast, other devices made from other porous thin films, which feature either larger pore sizes or nanoscale pores without functional groups, do not yield electric output. The maintained moisture gradient, which is fundamentally different from all previous systems, results in the continuous voltage output of the electric power generator device 10 disclosed herein.

According to an aspect of the present disclosure, therefore, a method of producing continuous electric power using atmospheric relative humidity in an ambient environment is provided. The method includes providing an electric power generation device. The electric power generation device includes a thin film, or biofilm, of protein nanowires or a nanowire composite, as previously described. The thin film has an opposing first surface and second surface. The thin film may be, for example, around 7 μm thick. The thin film, however, may be anywhere in the range of several μm to hundreds of μm. For example, the thin film may be anywhere in the range of 0.5 μm-500 μm, 1.0 μm-250 μm, 2.0 μm-100 μm, 3.0 μm-50 μm, 4.0 μm-25 μm, 4.0 μm-10 μm, 4.0 μm-7.0 μm, or 5.0 μm-6.0 μm.

A first electrode is electrically connected to the first surface of the thin film and a second electrode is electrically connected to the second surface of the thin film. As the first and second electrodes are electrically connected to opposing surfaces of the thin film of protein nanowires, the first and second electrodes measure an electric field or DC voltage through the thin film. The first electrode 14 may be, for example, made of gold (Au), platinum (Pt), aluminum (Al), carbon (C) or other suitable materials. The first electrode 14 may have an area of around 25 mm². The first electrode 14 may, however, have any area that is the same size or smaller than the area of the protein nanowire film. The first electrode may be patterned on a glass substrate. The second electrode 16 may have an area of around 1 mm² or may have any area that is smaller than the area of the protein nanowire film to allow exposure of the protein nanowire film to the ambient atmosphere. The second electrode 16 may be, for example, made of Au, Pt, Al, or other suitable materials, similar to the first electrode 14. The second electrode 16 may be in a mesh form, or may otherwise be porous.

The method then includes exposing at least one of the first surface and the second surface of the thin film of the electric power generation device to the ambient environment. In this way, moisture from the ambient environment, in which the atmospheric relative humidity is at least 20%, can reach the thin film. The atmospheric relative humidity, however, may be anywhere in the range of 20%-100%, 30%-90%, 40%-80%, and 50%-70%. When moisture reaches the thin film, the method then includes forming and maintaining a moisture gradient in the thin film and, therefore, continuously generating power in the electric power generation device, according to the mechanisms and concepts described herein.

Figure 3:
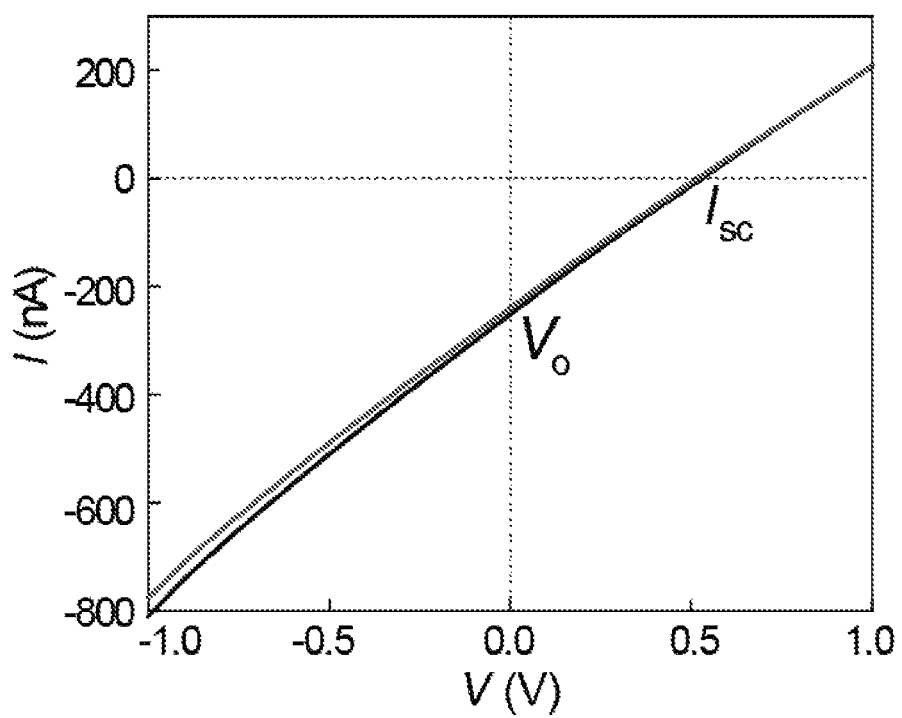
FIG. 3 is a graph showing a typical I-V curve from the electric power generation device of the present invention.

With reference to FIG. 3, an exemplary current voltage (I-V) output from the electric power generator device 10 (depicted in FIG. 1) is depicted when operated under ambient lighting (upper curve) versus in the dark (lower curve), at a ambient relative humidity (RH) around 50%. As depicted, the I-V between the first electrode 14 and the second electrode 16 shows approximately linear behavior. As depicted, the I-V curve does not pass the origin, showing an open-circuit voltage ($V_o$) of around 0.5 V and short-circuit current ($I_{sc}$) of around −250 nA. This effect is robust and highly reproducible, with a uniform $V_o$ (0.53±0.03 V, N=16) from different devices of the same film thickness. Moreover, the non-zero output is independent of light illumination and is maintained in a completely dark environment (lower curve), indicating the lack of photovoltaic effect. Both $V_o$ and $I_{sc}$ are stable and last greater than 12 hours, indicating that the power output is not a transient phenomenon caused by a charge/capacitive effect during the measurement.

The electric power generator device 10 of the present disclosure is different from a typical chemical cell as no living microorganism or chemical is fed to the system. Instead, the protein nanowires 12 are environmentally stable and do not decompose even in harsh (e.g., pH 2-10) solution. Accordingly, it is understood that the continuous voltage is not due to chemical decomposition of the protein nanowires over time. Additionally, inert material in (Au) electrodes reduces the possibility of a redox reaction from the electrodes contributing to output voltage. Moreover, because a similar electric output results from inert carbon electrodes, it is understood that the observed voltage is not due to the electrode material. Furthermore, removal of oxygen or nitrogen from the gas phase had no impact on the generation of the voltage whatsoever. The generation of voltage in the electric power generator device 10 is therefore understood to be affected by the relative humidity available from atmospheric moisture.

Figure 4C:
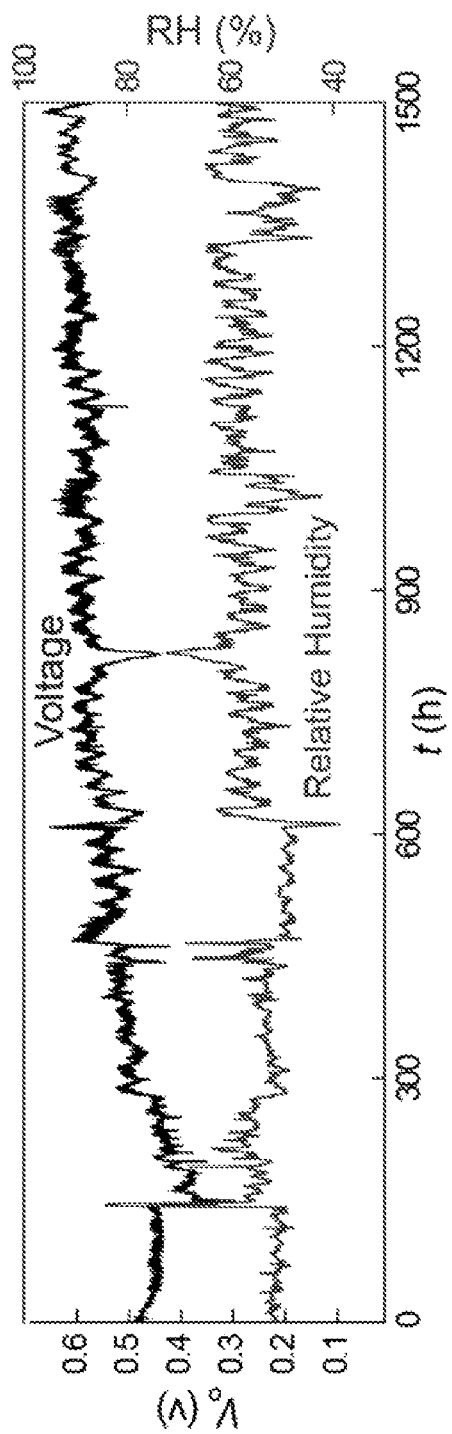
FIG. 4C is a graph showing the continuous recording of $V_o$ from the electric power generation device of the present invention for 1500 hours.

Continuous $V_o$ recording, depicted in FIGS. 4A-C, shows that the electric power generator device 10 of the present disclosure maintains a stable DC baseline over a significant period of time. With reference to FIG. 4A, the evolution of I and V from the electric power generator device 10 in an ambient environment having a relative humidity around 50% is depicted. Generally, FIG. 4A depicts how the device 10 maintains a stable DC baseline of around 0.35-0.5 V for over 20 hours. After 20 hours of current production, the voltage declines, but is restored within 5 hours. After an additional 20 hours, the voltage is again slightly reduced, but can be repeatedly self-recharged.

Specifically, FIG. 4A depicts that the device 10 initially has a $V_o$ of around 0.52 V for the first 5 hours of operation. Connecting the device 10 to a load resistor ($R_L$=2 MΩ) yields a continuous and gradually stabilized I of around 110 nA for 20 additional hours. When $R_L$ is disconnected and the $V_o$ is recorded (indicated by the arrow at t=25 hours), $V_o$ gradually increases to the initial value of 0.5 V for the next 5 hours (25<t<30 h), showing a self-recharging process. Re-connecting to $R_L$ yields a repeated continuous powering to the $R_L$ (I of around 115 nA; 30<t<50 h). Disconnecting the $R_L$ yields a $2^{nd}$ self-recharging process (50<t<55 hours), bringing $V_o$ back to 0.5 V. The inset in FIG. 4A depicts the circuit diagram, in which connections to terminal '1' and '2' correspond to I and $V_o$ measurements, respectively.

FIG. 4B generally depicts how the device 10 maintains a stable DC baseline of around 0.4-0.5V (upper curve) for over 700 hours (1 month). Furthermore, FIG. 4C generally depicts how the device 10 maintains a stable DC voltage of around 0.4-0.6 V for over 1,500 hours (2 months). Fluctuations in voltage are associated with changes in the ambient relative humidity (RH; lower curves). Both the field amplitude (around 700 V/cm) and sustainability in the voltage are a more than 10-fold improvement over the best results from previous ambient generators (e.g., around 40 V/cm for 120 hours). In a controlled humidity environment, around 40-50% RH yielded the highest voltage, but substantial voltages were still generated at RH as low as 20% (e.g., comparable to desert environment) as well as at 100% humidity). This output trend contrasts with carbon-based ambient electric generators which show a unidirectional increase in output voltage with increasing RH.

Figure 5A:
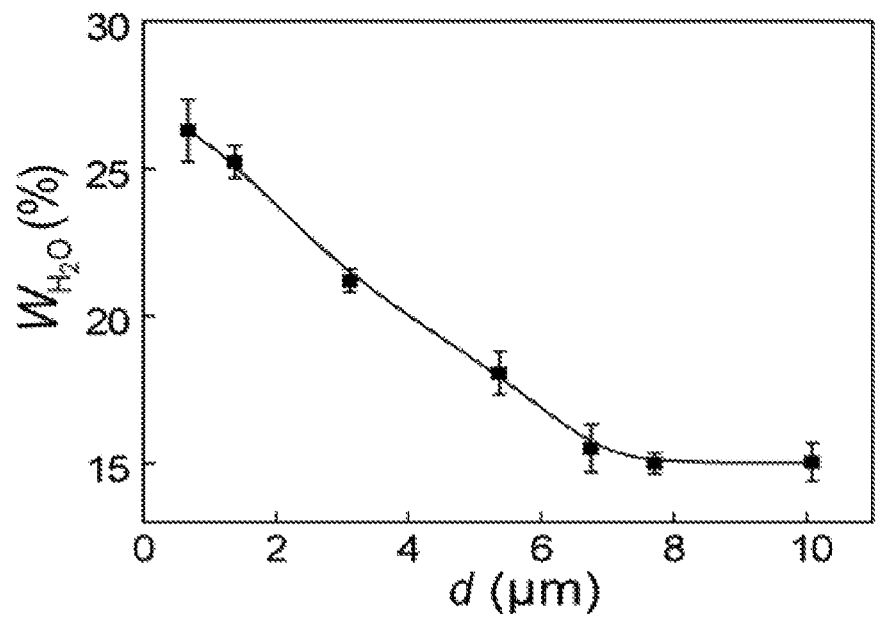
FIG. 5A is a graph showing $W_{H_2O}\%$ in protein nanowire films with respect to film thickness (d) at ambient RH of around 50%.
Figure 5B:
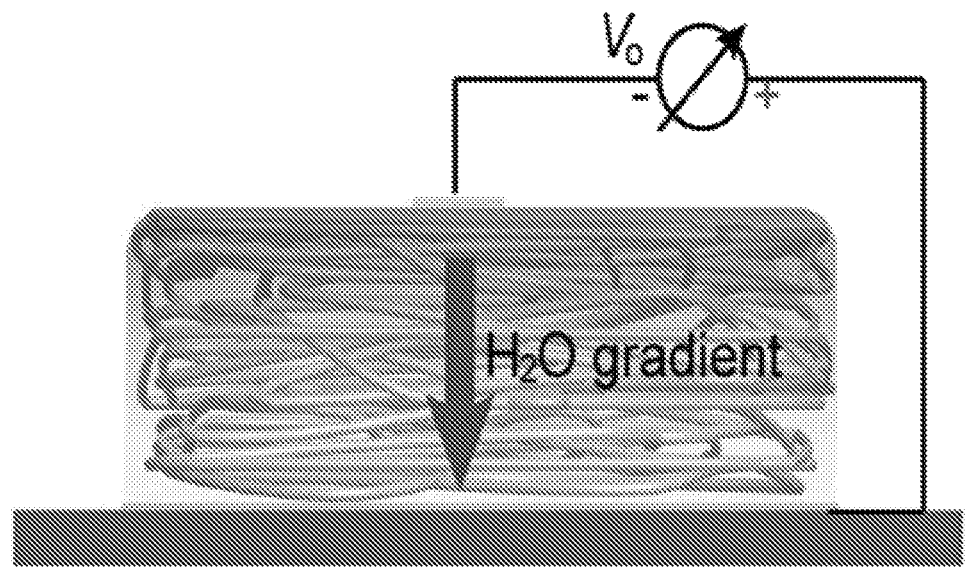
FIG. 5B is a schematic of an analyzed vertical moisture gradient in the protein nanowire film.
Figure 5C:
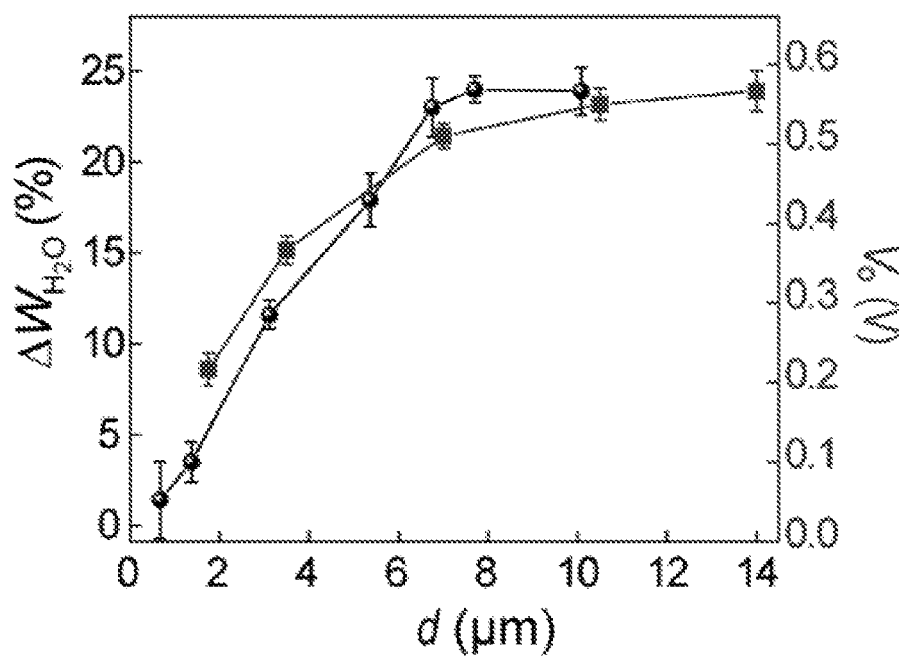
FIG. 5C is a graph showing $\Delta W_{H_2O}\%$ at different nanowire-film thicknesses (d). $\Delta W_{H_2O}\%=2\times(27\%-W_{H_2O}\%)$, is the estimated difference in moisture-adsorption ratios between the top and bottom interfaces. The blue curve shows $V_o$ with respect to film thickness.
Figure 5D:
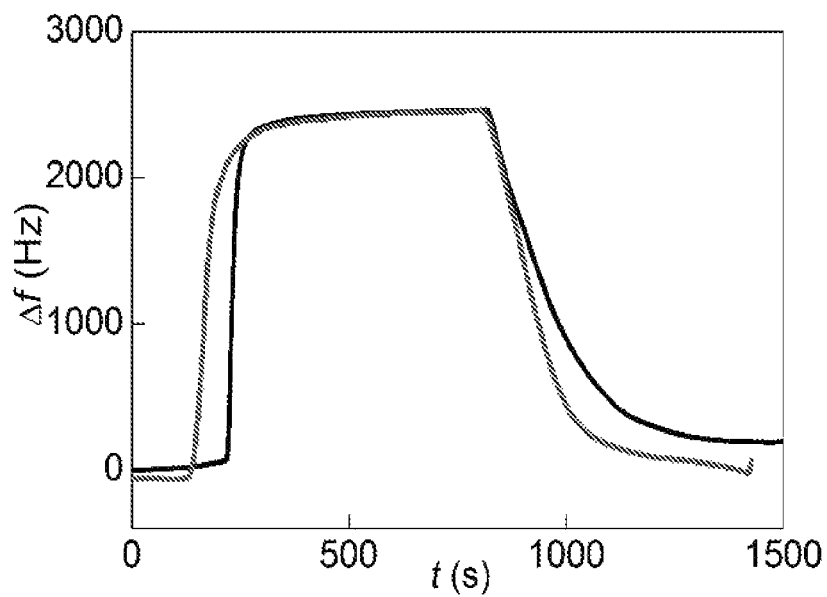
FIG. 5D is a graph showing the moisture adsorption/desorption dynamics in a nanowire film and in the same nanowire film after 5 days measured by using Quartz Crystal Microbalance (QCM) technique.

With reference to FIG. 5A, the moisture adsorption ratio ($W_{water}$%), defined as the weight of adsorbed moisture over the total weight of protein nanowire film and measured by a quartz crystal microbalance, is inversely proportional to film thickness (d) in the device 10 at an ambient RH of about 50%. As depicted, $W_{water}$% reaches around 27% for thin films (i.e., less than 1 μm thick) and retains around 15% for thick films (i.e., greater than 8 μm thick). This film thickness-dependent adsorption is supported by Fourier-transform infrared spectroscopy. This trend can be largely accounted for by a vertical moisture gradient in the protein nanowire film, depicted schematically in FIG. 5B. FIG. 5C depicts that the $\Delta W_{H_2O}\% = 2 \times (27\% - W_{H_2O}\%)$ $\Delta W_{H_2O}\%$ is the estimated difference in moisture-adsorption ratios between the top and bottom interfaces of the thin film. The upper curve shows $V_o$ with respect to film thickness. FIG. 5C indicates around a 27% adsorption ratio at surface area (e.g., less than 1 μm depth) and close to 3% at the bottom (e.g., greater than 8 μm depth) to yield an average ratio of around 15% in thick films. Modeling this apparent difference in moisture adsorption ($\Delta W_{H_2O}\%$) between the top (exposed) and bottom (sealed) interfaces demonstrates a clear correspondence between increasing $\Delta W_{H_2O}\%$ and increasing $V_o$ up to a plateau of around 0.55 V for thick films with d around 10 μm. Moisture contents, and thus presumably the proposed moisture gradients, remain stable over time, as depicted in FIG. 5D, which is consistent with the long-term stability of $V_o$, depicted in FIGS. 4A-C. As depicted in FIG. 5D, the moisture adsorption/desorption dynamics in the nanowire film and in the same nanowire film after 5 days measured by using a QCM technique did not change, reflected by the very close amplitudes in the change of resonance frequency ($\Delta f$). The moisture gradient built up from a non-gradient ambient environment is fundamentally different from all previous moisture-based technologies which lack this capability.

Figure 6A:
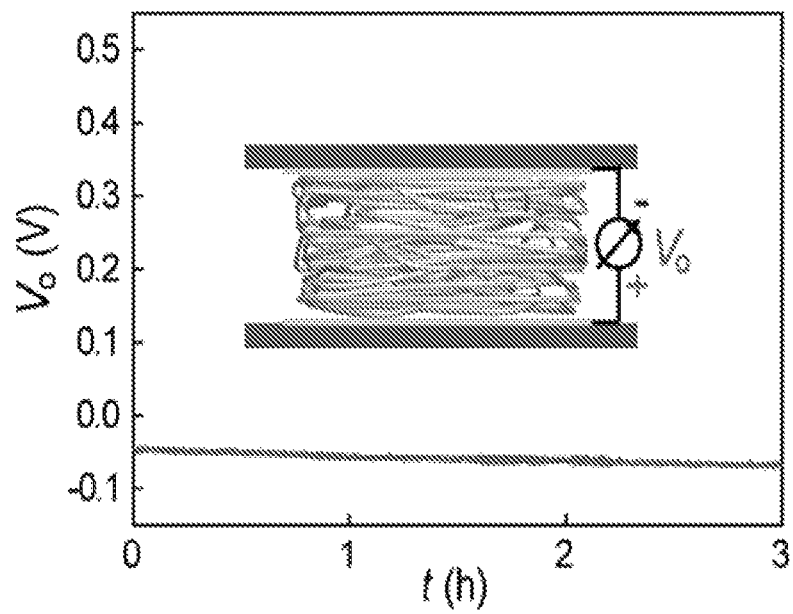
FIG. 6A is a schematic and graph showing residual $V_o$ of around −50 mV from a symmetric nanowire device with both top and bottom surfaces sealed.
Figure 6B:
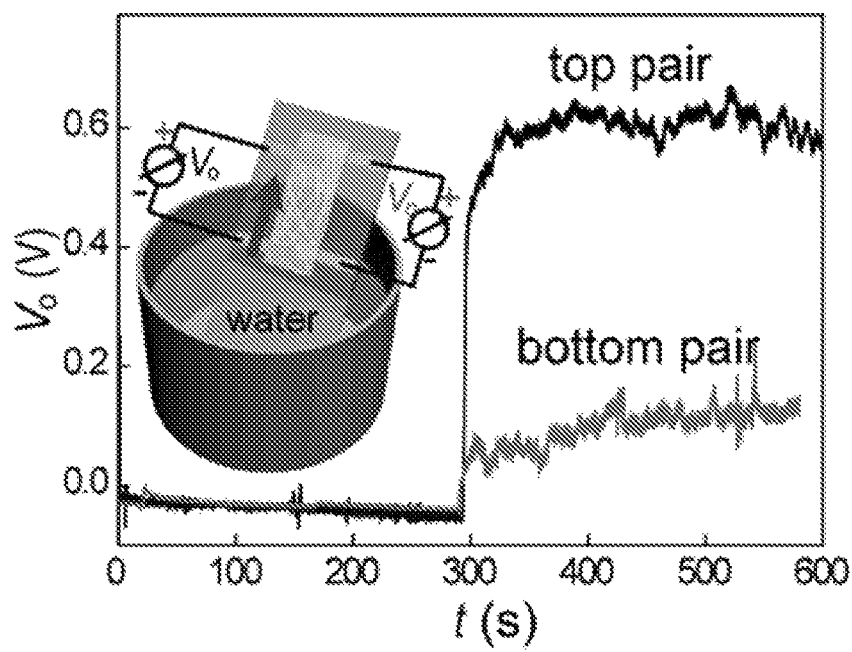
FIG. 6B is a schematic and graph showing a nanowire device (1×2 cm², around 7 μm thick) vertically aligned with moisture gradient above the water surface, with a pair of electrodes placed at either the top or bottom interface.
Figure 6C:
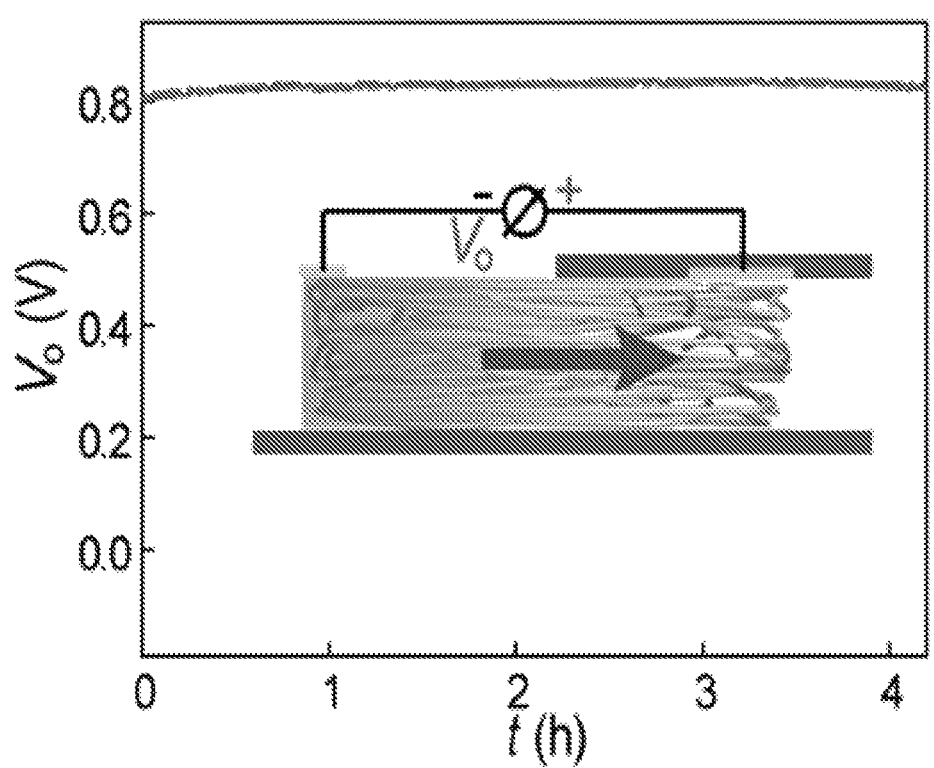
FIG. 6C is a schematic and graph showing $V_o$ of around 0.8 V from a pair of top electrodes in a nanowire device with half of the top surface covered by a glass slide.

Further evidence for the importance of the adsorption-difference induced moisture gradient to generate voltage was the observation that a voltage was not generated when the top film was also completely covered with a gold electrode, as depicted in FIG. 6A. FIG. 6A depicts a residual $V_o$ of around −50 mV from a symmetric nanowire device with both top and bottom surfaces sealed. Additionally, horizontally adjacent top or bottom pairs of electrodes produce near-zero voltages, as no horizontal moisture gradient is produced in the protein nanowire film. However, if the film is rotated so that the horizontally adjacent electrodes are vertically positioned over water to produce a moisture gradient between the two electrodes, then a voltage is produced, as depicted in FIG. 6B. A pair of electrodes placed underneath the film produced a considerably smaller voltage, consistent with the expected lower moisture adsorption at depth. Alternatively, creating an adsorption difference and hence a moisture gradient between two top electrodes by covering a portion of the film with a glass slide also generated a stable voltage, such as around 0.8 V, as depicted in FIG. 6C.

Figure 7A:
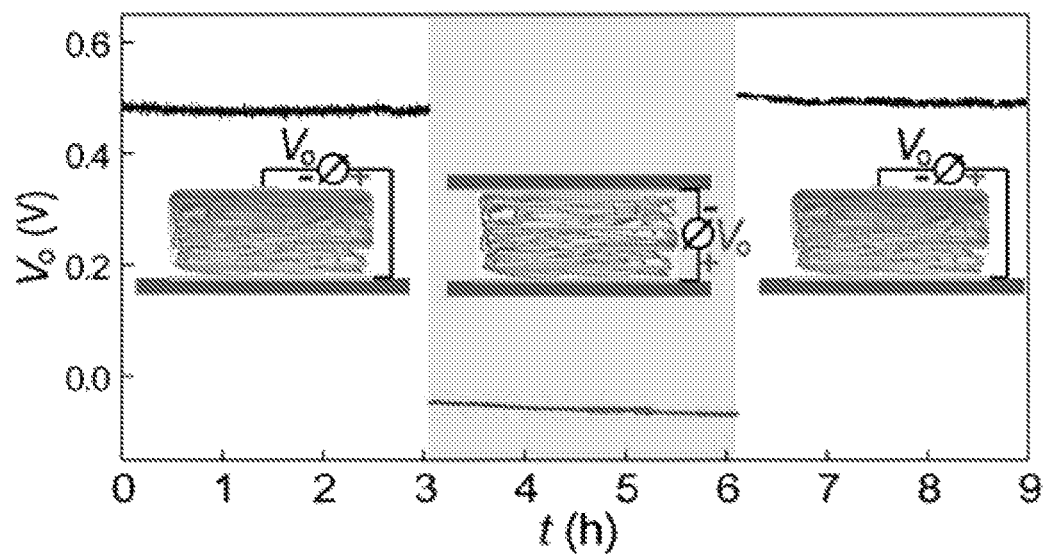
FIG. 7A is a schematic and graph showing $V_o$ with varied top electrode configurations in the electric power generation device.
Figure 7B:
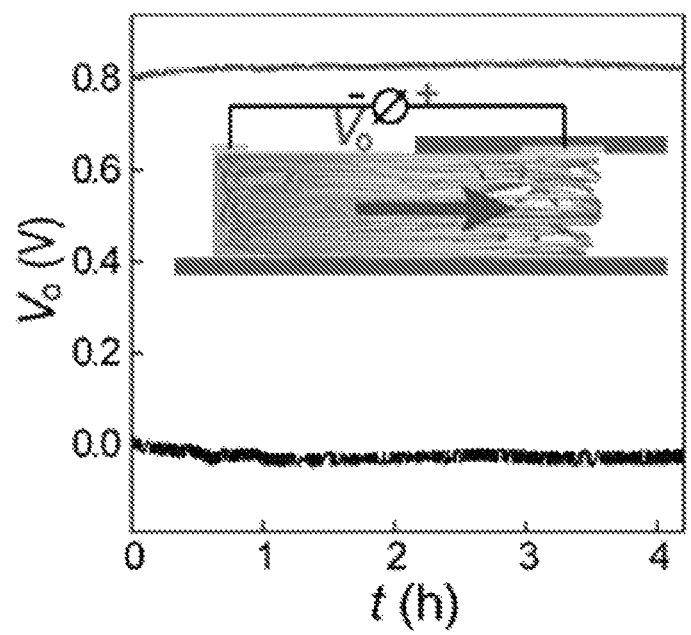
FIG. 7B is a schematic and graph showing $V_o$ from a pair of top electrodes, with half of the top surface covered by a glass slide. The lower curve shows a typical $V_o$ from the pair of top electrodes without the glass cover.

Furthermore, when a pair of vertical electrodes that initially produces a constant $V_o$ of around 0.5 V in ambient environment (FIG. 7A, where t is less than 3 h) is modified so that the top electrode is replaced with a film electrode on a glass slide that prevents exposure of the top protein nanowire film surface to the ambient environment, the voltage output drops to close to 0 V (FIG. 7A, where t is greater than 3 and less than 6 hours). Switching back to the point electrode returns $V_o$ back to around 0.5 V (FIG. 7A, where t is greater than 6 hours). On the other hand, for a pair of horizontal electrodes that initially produces close-to-zero $V_o$ (FIG. 7B, lower curve), covering half of the top film surface yields substantially increased $V_o$ around 0.8 V (FIG. 7B, upper curve). These results indicate that the built-up moisture gradient in the protein nanowire film is a dynamic equilibrium involving constant moisture exchange with ambient environment. Such indication is consistent with a fast moisture adsorption/desorption rate in the protein nanowire film. The dynamic moisture exchange is also the basis of a continuous energy input for power output. This dynamic moisture gradient built up out of a non-gradient ambient environment is completely different from previous systems which are incapable of producing self-supported moisture gradient, and hence forms a fundamentally different basis for continuous power generation.

Figure 8A:
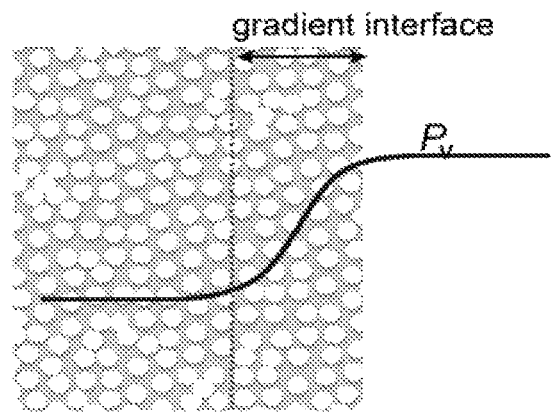
FIG. 8A is a schematic of water vapor pressure ($P_v$) lowering in a porous material and the existence of a vapor-pressure gradient close to air interface.
Figure 8B:
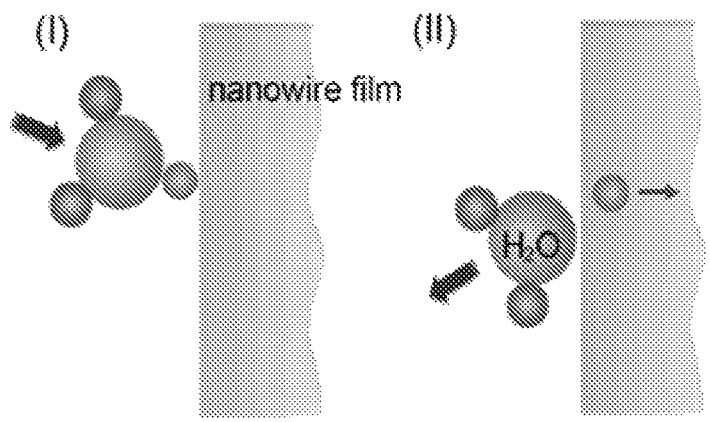
FIG. 8B is a schematic of the mechanism of charge donation to the nanowire film from ambient water clusters.
Figure 8C:
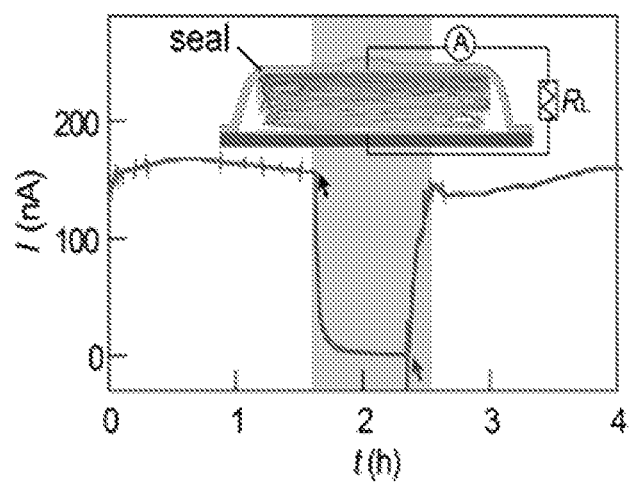
FIG. 8C is a schematic and graph showing that the continuous current output from a nanowire device in the ambient environment (RH of around 45%) is disrupted when the top interface was covered with a parafilm (inset) and persisted (gray region) till the seal was removed, when the current began to restore its original value. A load resistor $R_L=2$ MΩ was used.

With reference to FIGS. 8A-C, a mechanism for energy harvesting in the nanowire film is described. FIG. 8A depicts a schematic of vapor pressure ($P_v$) lowering in a porous material and the existence of a vapor-pressure gradient close to the air interface. Air water clusters naturally contain ionized species or may be ionized when adsorbed on the nanowire surface. The ionized clusters (e.g., $H(H_2O)_n^+/HO(H_2O)_n^-$) donate charge (e.g., $H^+/e^-$) to the nanowire, as depicted in FIG. 8B, which supplies the close-loop current flow driven by the voltage resulted from moisture gradient. Dynamic adsorption-desorption exchange of water clusters at the interface provides the continuous input. The ambient environment provides a large reservoir for continuous exchanges required for sustained electric output. FIG. 8C depicts how the continuous current output from a nanowire device in the ambient environment (RH of about 50%) was disrupted when the top interface was covered with a parafilm (see insert). The current disruption persisted until the seal was removed, when the current began to restore its original value).

The device shows a wide operation window with respect to relative humidity in the ambient environment, which indicates that it can still function even in desert areas having low relative humidity. The device can produce a power output, for example, anywhere in the range of 20%-100%, 30%-90%, 40%-80%, and 50%-70% relative humidity. An optimal $V_o$, however, is found to be at around 40-50% relative humidity, which is close to typical ambient relative humidity. This output trend is different from previous carbon systems, where a unidirectional increase in power output with increasing relative humidity was observed. The results demonstrate that although moisture adsorption is likely to result in the current output, the output is not directly correlated with a total moisture adsorption.

Figure 9A:
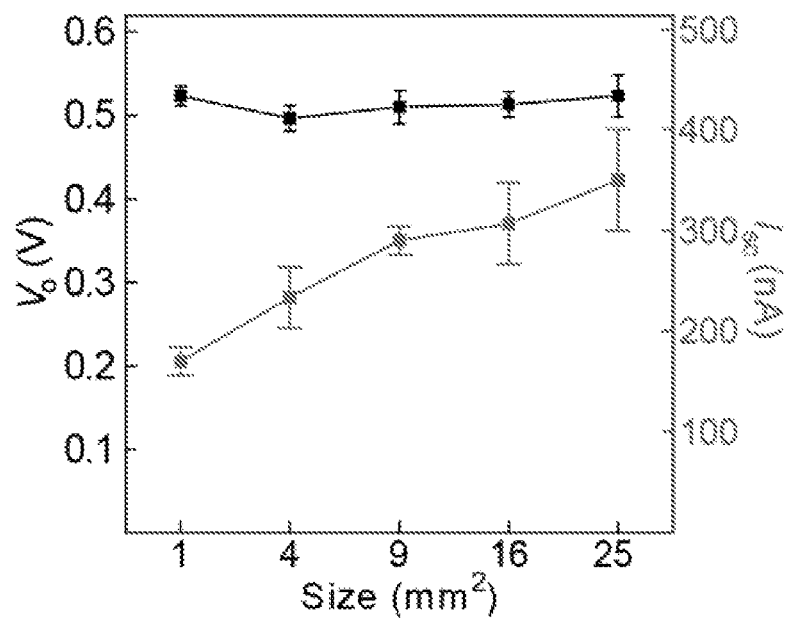
FIG. 9A is a graph showing $V_o$ (upper curve) and $I_{sc}$ (lower curve) with respect to device size at ambient RH around 50%. The film thickness was kept at around 7 μm.
Figure 9B:
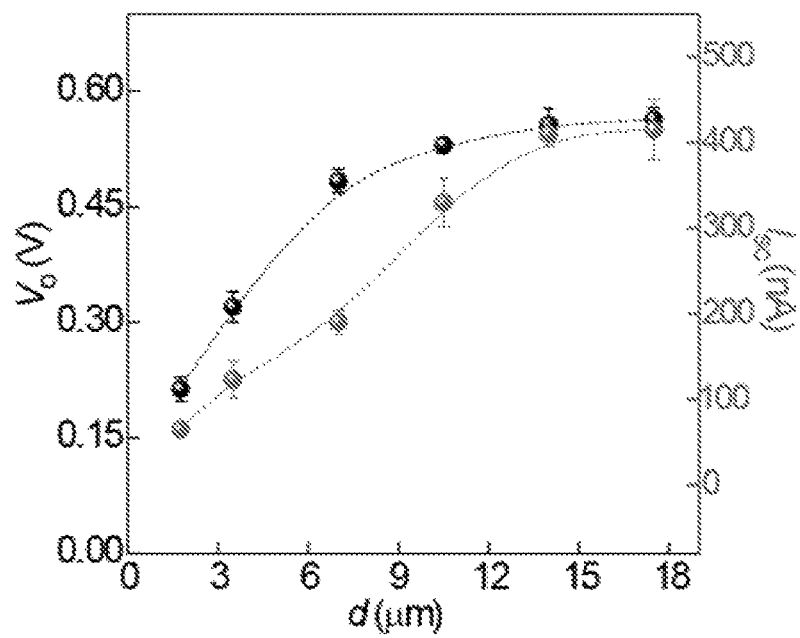
FIG. 9B is a graph showing $V_o$ (upper curve) and $I_{sc}$ (lower curve) with respect to film thickness (d) at ambient RH around 50%. The film size was kept at around 1 mm².

The device 10 according to the disclosed invention may be reduced in size and multiple devices may be connected in series or in parallel to linearly increase the output voltage or current. For example, a $V_o$ around 0.5 V may be maintained even with a device size reduced to around 1 mm², whereas short-circuit current ($I_{sc}$) may be gradually decreased to around 170 nA, as depicted in FIG. 9A. The reduction in $I_{sc}$ is a direct result from the non-linear increase in film resistance between a pair of point-to-area asymmetric electrodes. With reference to FIG. 9B, the areal power density increases with the increase of film thickness and saturates at around 22 µW/cm² at a film thickness of around 14 µm, which is consistent with the trend of voltage output previously described. This power output is estimated to be around 16% of the theoretical upper limit, described later herein with reference to FIG. 28. The converted volumetric power density of around 16 mW/cm³ is more than two orders of magnitude larger than those from previous carbon-based systems.

Figure 9C:
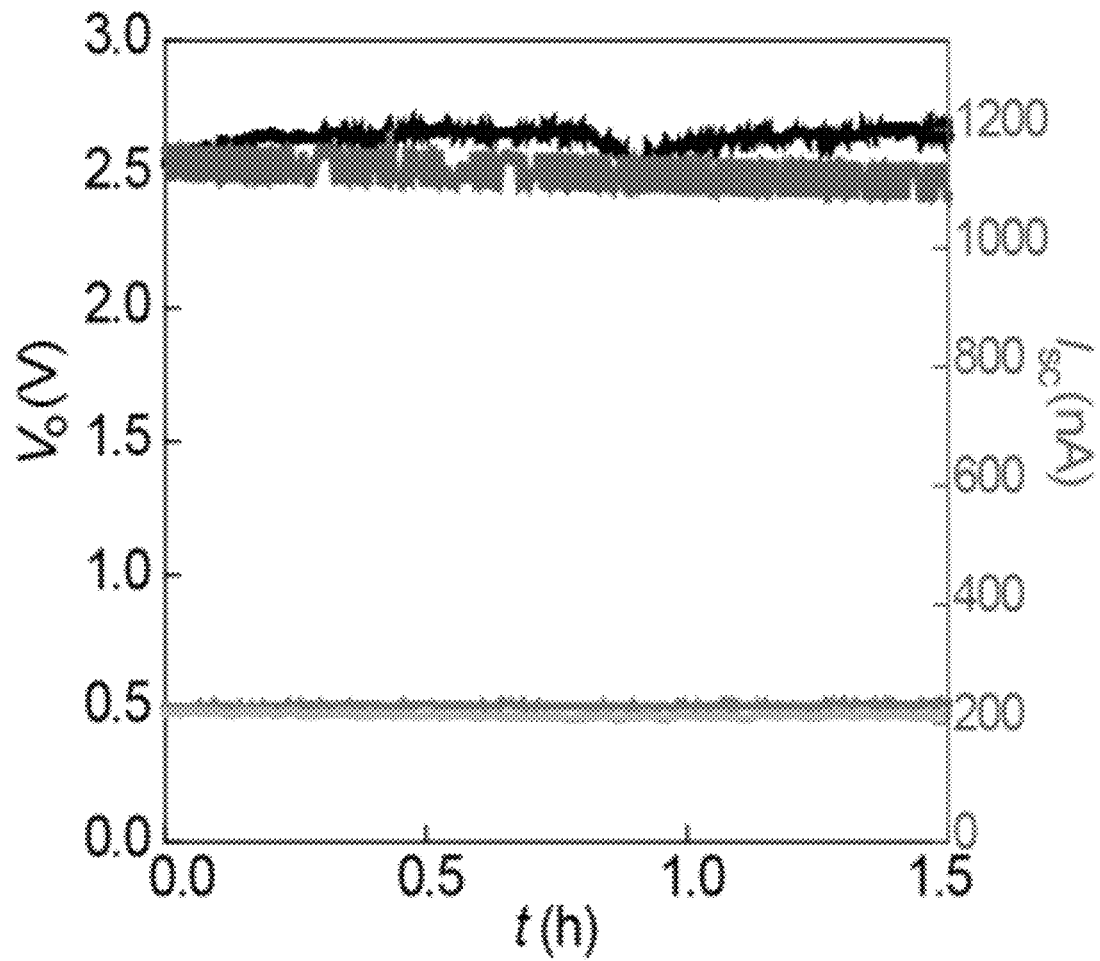
FIG. 9C is a graph showing $V_o$ (upper curve) and $I_{sc}$ (lower curve) by connecting 5 nanowire devices in series and in parallel, respectively, compared to $V_o$ (upper curve on bottom) and $I_{sc}$ (lower curve on bottom) from an individual nanowire device.
Figure 9D:
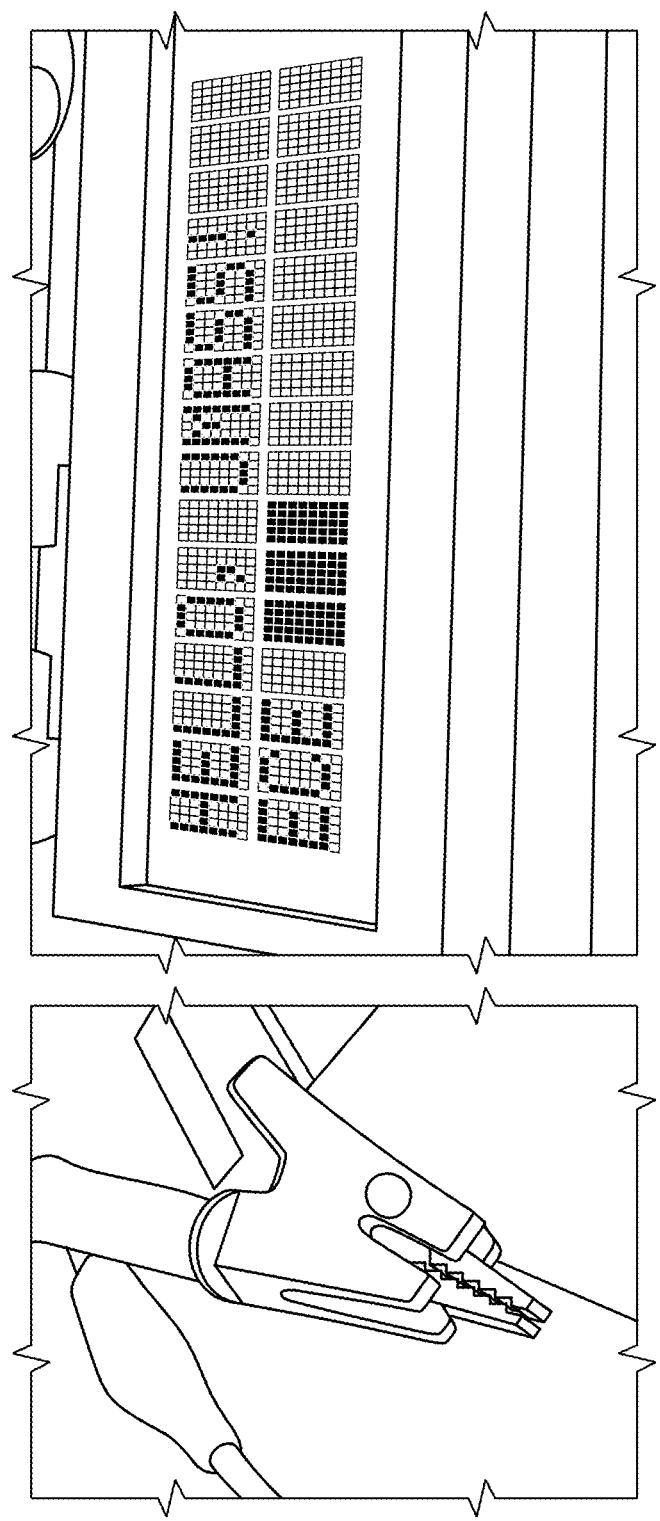
FIG. 9D is a picture showing the nanowire devices used to charge up capacitors to power a LED (left) or LCD panel (right).

As ambient humidity is 3D diffusive, stacking thin-film devices in the vertical direction with a 1:1 film-airgap ratio can lead to practical volumetric power density greater than 5 kW/m³, potentially outperforming solar cells which are intrinsically surface confined. Multiple devices could be connected in series or in parallel to linearly increase the output voltage or current, like a battery (see FIG. 9C). For example, an output voltage of 10 V may be achieved by serially connecting 17 devices. As the device is thin (e.g., less than 7 µm thick), a vertical stacking can yield practical high-power and area-efficient output. Connected devices can be used to charge up a capacitor to power up a LED or a LCD, for example, as depicted in FIG. 9D. The device may also be used to power a logic device made from semiconductor nanowire, in which the generator provides the source-drain power to a nanowire transistor. This nanowire powered transistor shows typical p-type transistor behaviors. Such logic control and signal amplification without an external power supply can result in low-cost, self-supported, and environment-driven sensing and computation.

EXPERIMENTAL

Figure 10A:
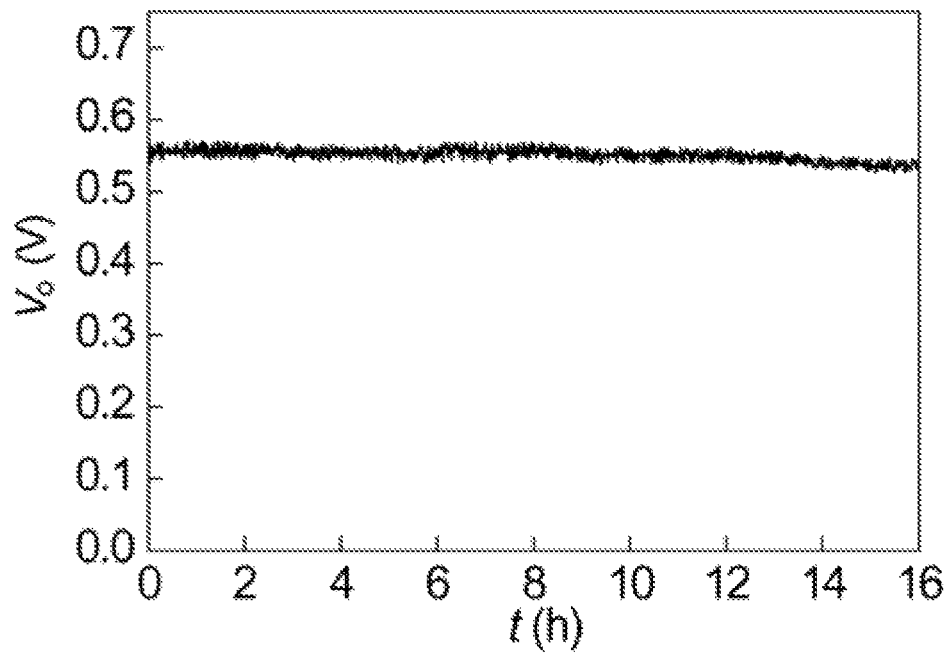
FIG. 10A is a graph showing a 16 hour continuous recording of the open-circuit voltage ($V_o$) from a nanowire device in the ambient environment.
Figure 10B:
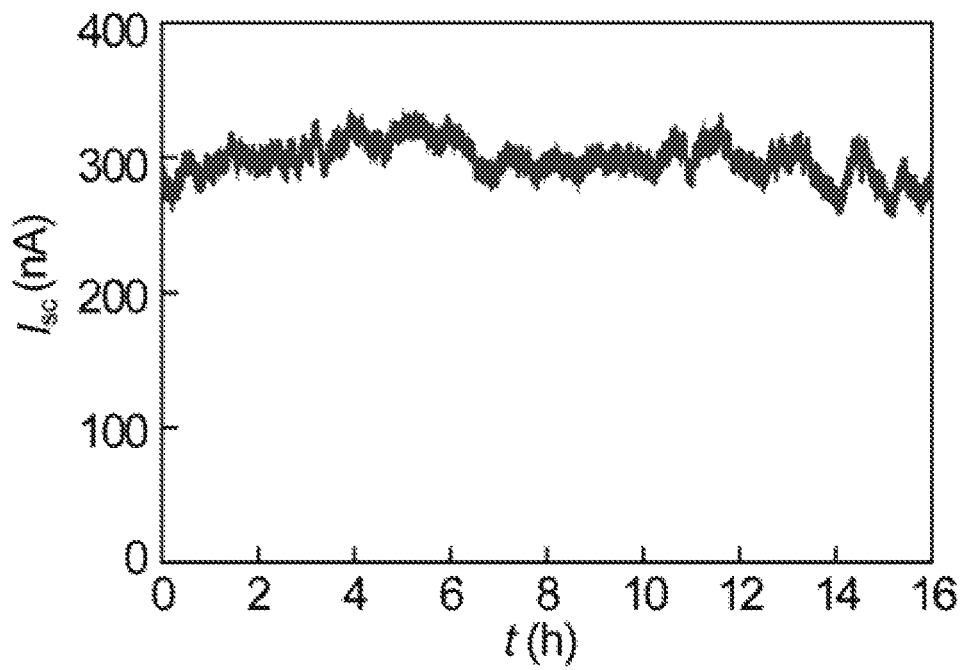
FIG. 10B is a graph showing a 16 hour continuous recording of the short-circuit current ($I_{sc}$) from a nanowire device in the ambient environment (RH around 60%). The device sizes were 5×10 mm², the nanowire thickness was around 7 μm.

Continuous voltage and current from nanowire devices. With reference to FIG. 10A, a 16 hour continuous recording of the open-circuit voltage ($V_o$) from a nanowire device in the ambient environment is depicted. With reference to FIG. 10B, a 16 hour continuous recording of the short-circuit current ($I_{sc}$) from a nanowire device in the ambient environment (RH around 60%) is depicted. In both instances, the device size is 5×10 mm² and the nanowire thickness is around 7 μm.

Figure 11A:
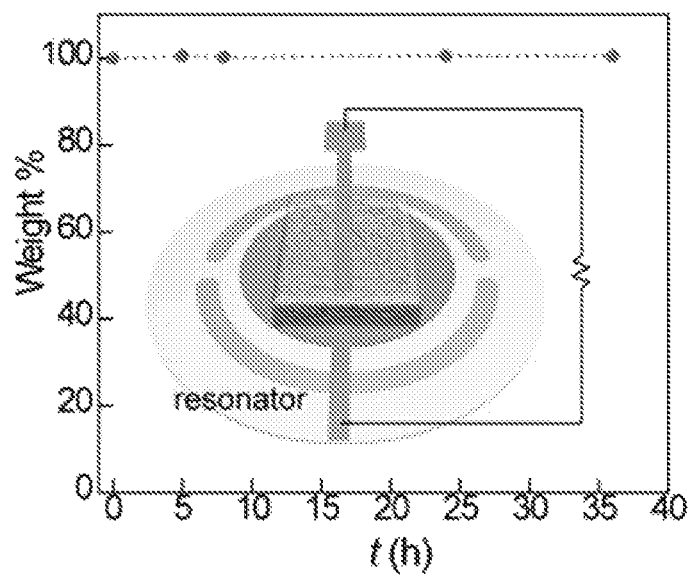
FIG. 11A is a schematic and graph showing the normalized weight of a protein-nanowire film, measured by quartz crystal microbalance before and after 4, 8, 24, and 36 hours of continuous current output.
Figure 11B:
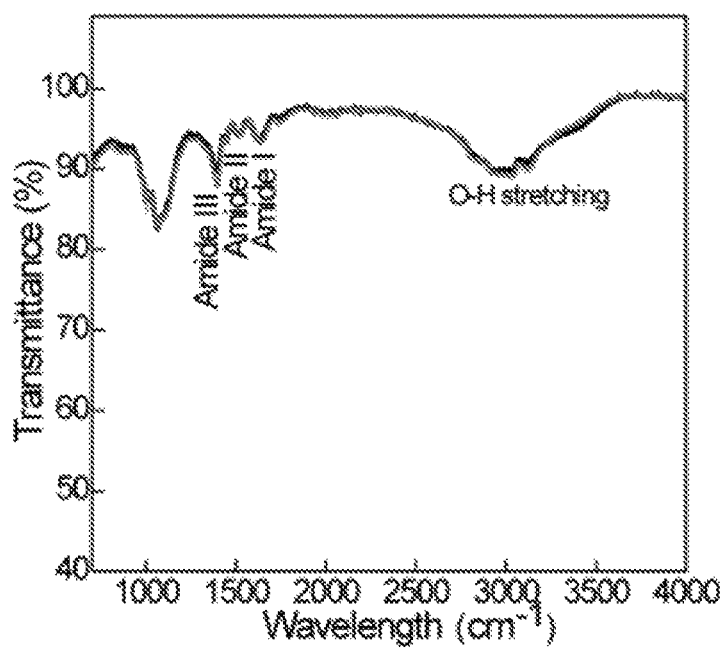
FIG. 11B is a graph showing Fourier transform infrared (FTIR) spectroscopy of the protein-nanowire film before and after an 18 hour continuous current output.

Characterizations of protein-nanowire properties during electric outputs. With reference to FIG. 11A, a normalized weight of a protein-nanowire film, measured by quartz crystal microbalance before and after 4, 8, 24, and 36 hours of continuous current output, is depicted. The weight change/fluctuation was negligible (e.g., less than 0.5%) and within the measurement error. (Inset) The protein-nanowire film (around 7 μm thick, size ~0.2 cm²) was directly deposited on the quartz resonator with the resonator (Au) electrode also serving as the bottom electrode for the nanowire film; an Au wire served as the top electrode. The relative humidity was kept at 45% throughout the measurements. With reference to FIG. 11B, Fourier transform infrared (FTIR) spectroscopy of the protein-nanowire film before and after an 18 hour continuous current output. The lack of change in adsorption peaks (e.g., frequency shift, intensity) is a strong indication of the lack of redox process.

Figure 12A:
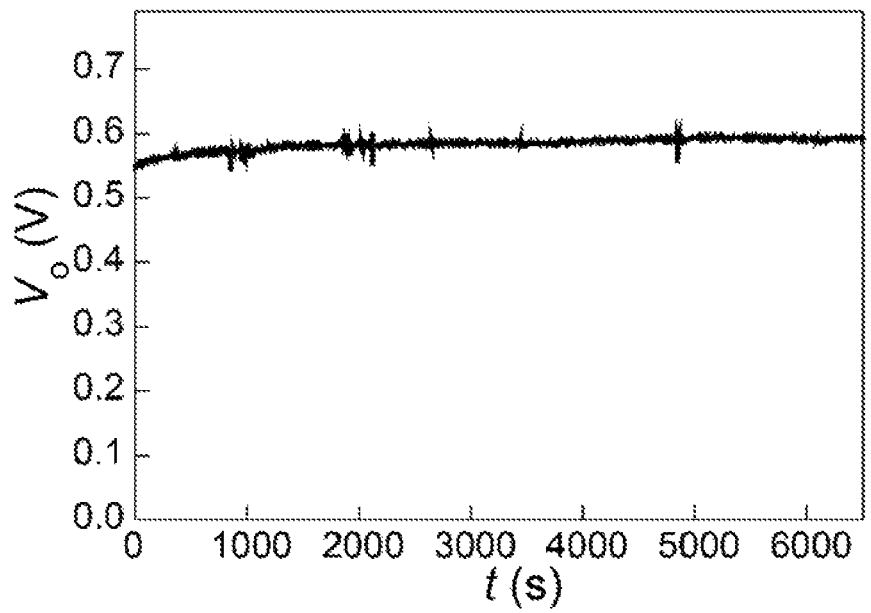
FIG. 12A is a graph showing open-circuit voltage ($V_o$) maintained at ~0.55 V from a nanowire device (around 7 μm thick) after being exposed to the ambient environment for over 10 months.
Figure 12B:
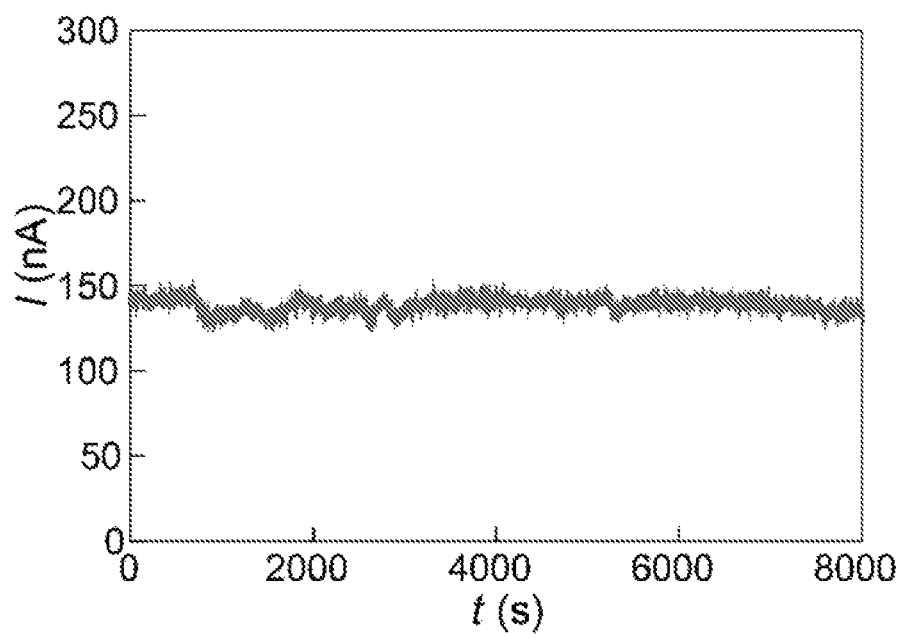
FIG. 12B is a graph showing the current (I) output (with a load resistor of 2 MΩ) maintained at ~130 nA from a nanowire device (around 7 μm thick) after being exposed to the ambient environment for over 10 months.

Electric outputs from a nanowire device (around 7 μm thick) after being exposed to the ambient environment for over 10 months. With reference to FIG. 12A, the open-circuit voltage ($V_o$) maintained at around 0.55 V. With reference to FIG. 12B, the current (I) output (with a load resistor of 2 MΩ) maintained at around 130 nA. The measurements were performed at a relative humidity of around 50%. The results were close to values obtained from relatively fresh samples.

Figure 13:
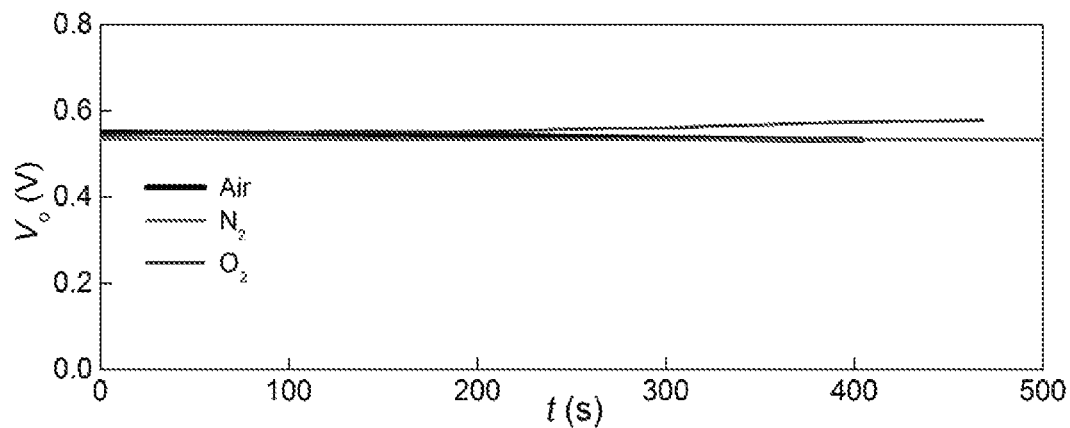
FIG. 13 is a graph showing open-circuit voltage ($V_o$) from a nanowire device exposed to different gaseous (e.g., air, nitrogen, and oxygen) environments, with the relative humidity (RH) kept constant around 53%.

Performance dependence on gaseous environments. With reference to FIG. 13, open-circuit voltage ($V_o$) from the same nanowire device exposed to different gaseous (e.g., air, nitrogen, and oxygen) environments is depicted, with the RH kept constant at around 53%. The curves show that $V_o$ was largely independent of the gaseous environment with RH kept constant.

Figure 14:
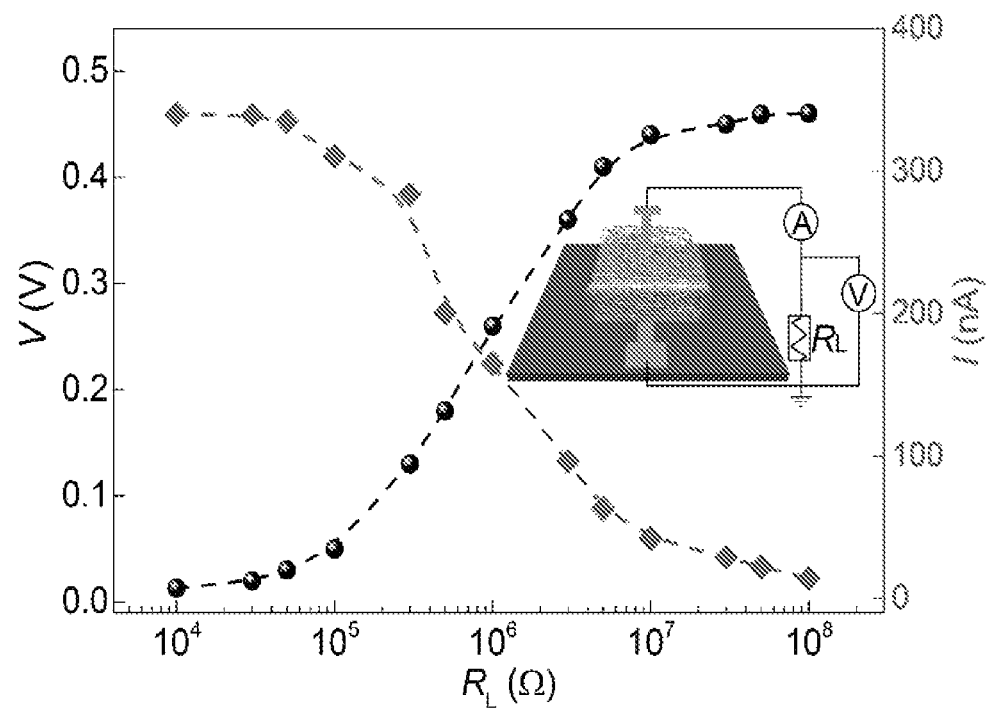
FIG. 14 is a schematic and graph showing electric outputs from a protein-nanowire device at different load resistances ($R_L$).

Electric outputs from a protein-nanowire device at different load resistances ($R_L$). With reference to FIG. 14, the testing was performed in the ambient environment with a RH of around 45%.

Figure 15:
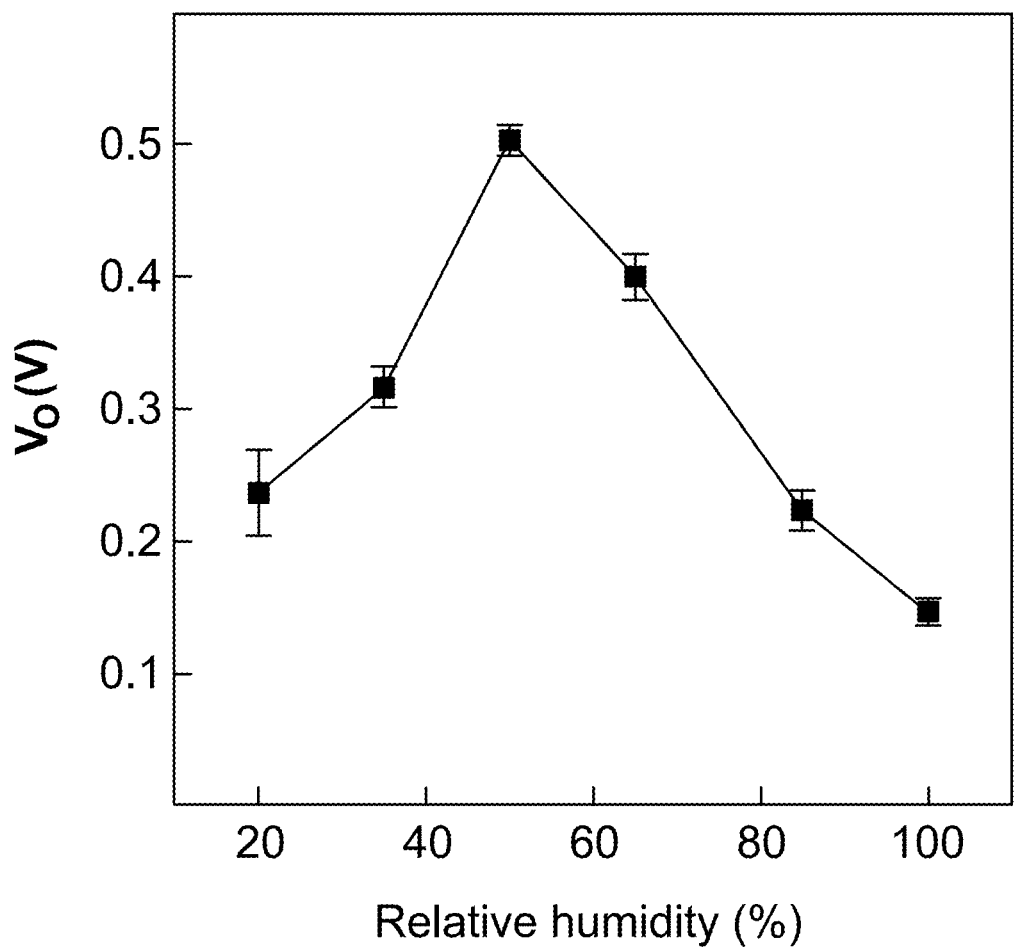
FIG. 15 is a graph showing $V_o$ with respect to relative humidity. The device size was ~0.5×0.5 cm² with film thickness around 7 μm.

$V_o$ with respect to relative humidity. With reference to FIG. 15, the device size was around 0.5×0.5 cm² with film thickness of around 7 μm.

Figure 16A:
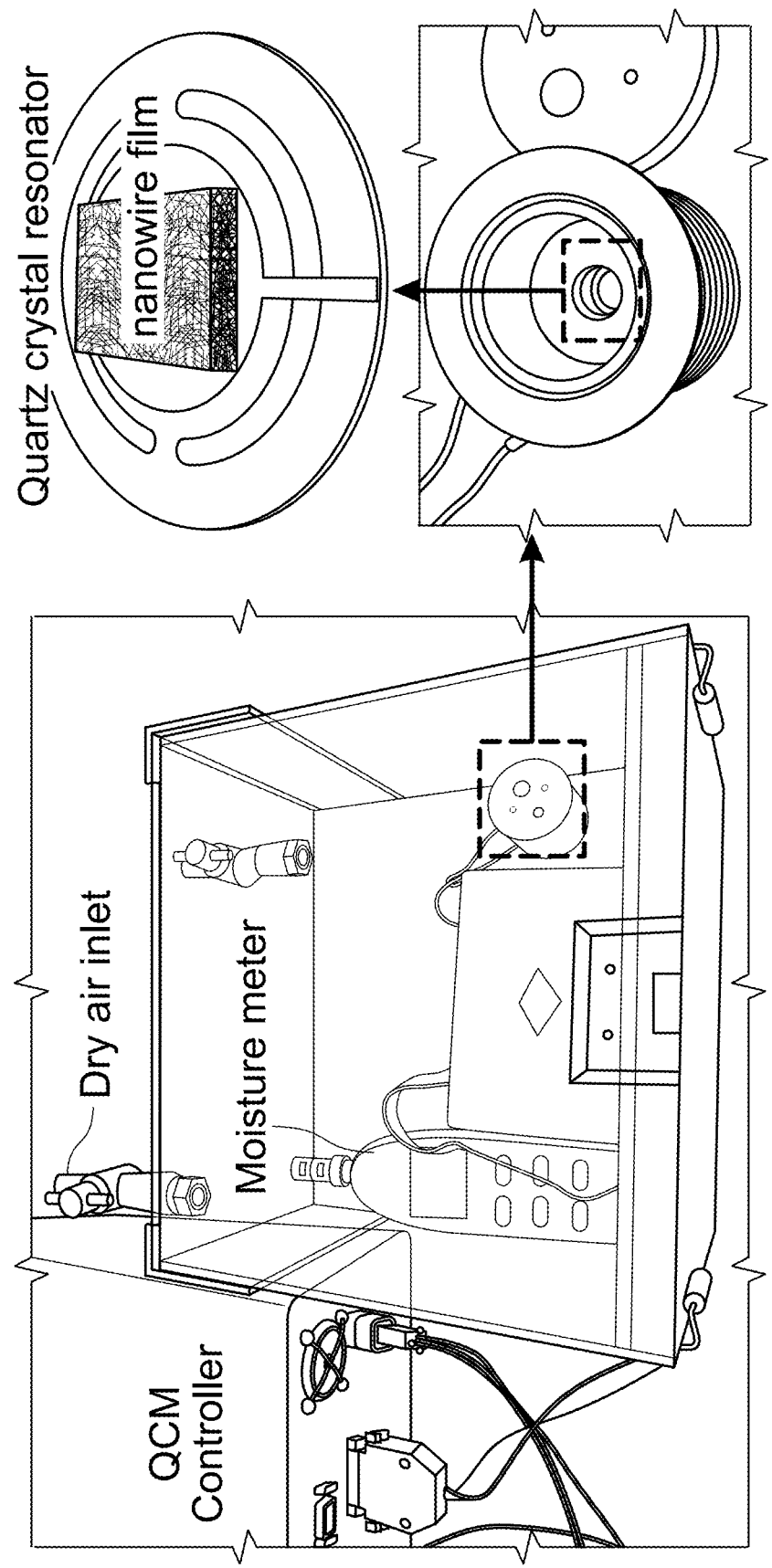
FIG. 16A is a picture and schematic showing the setup for measuring moisture adsorption in nanowire films using a quartz crystal microbalance (QCM).

Measurement of moisture adsorption in nanowire films. With reference to FIG. 16A, a setup for measuring moisture adsorption in nanowire films using a quartz crystal microbalance (QCM) is depicted. The nanowire thin film was coated on the quartz crystal resonator (right top) using a PDMS mold. The mass sensitivity of the QCM originates from the dependence of the oscillation frequency on the total mass of the metal-coated crystal, including any adlayers of deposited material. The mass change can be determined by $$\Delta m = -\Delta f \cdot A \cdot \frac{\sqrt{\mu \rho}}{2 f_0^2},$$

where $f_0$, A, ρ, μ are resonant frequency of crystal's fundamental mode, area of the gold disk on the crystal, crystal's density (2.684 g·cm⁻³) and shear modulus of quartz (2.947×10¹¹ g·cm⁻¹·s⁻²), respectively. Using this, the mass/weight of the coated nanowire film ($W_{nw}$) in ambient environment (with adsorbed moisture) was first determined. Then the resonator was placed in a sealed container with dry air flowing in to reduce the RH to around 0% inside to drive away adsorbed moisture in the nanowire film. During the process, the mass change ($\Delta W_{nw}$), which corresponds to the amount of moisture loss in the pili film, was continuously monitored by the QCM. The moisture adsorption ratio $W_{H_2O}\%$ in the pili film can be determined as: $W_{H_2O}\% = \Delta W_{nw}/W_{nw} \times 100\%$.

Figure 16B:
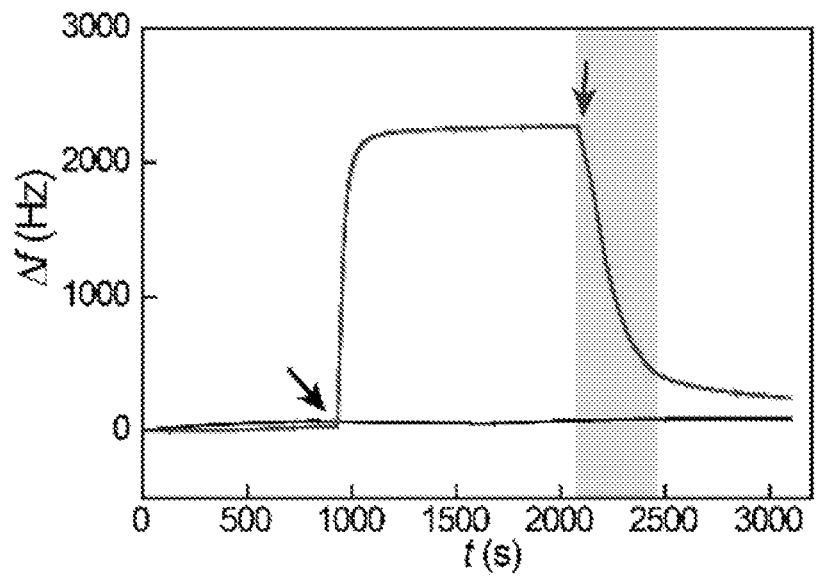
FIG. 16B is a graph showing a typical frequency response from the QCM.
Figure 16C:
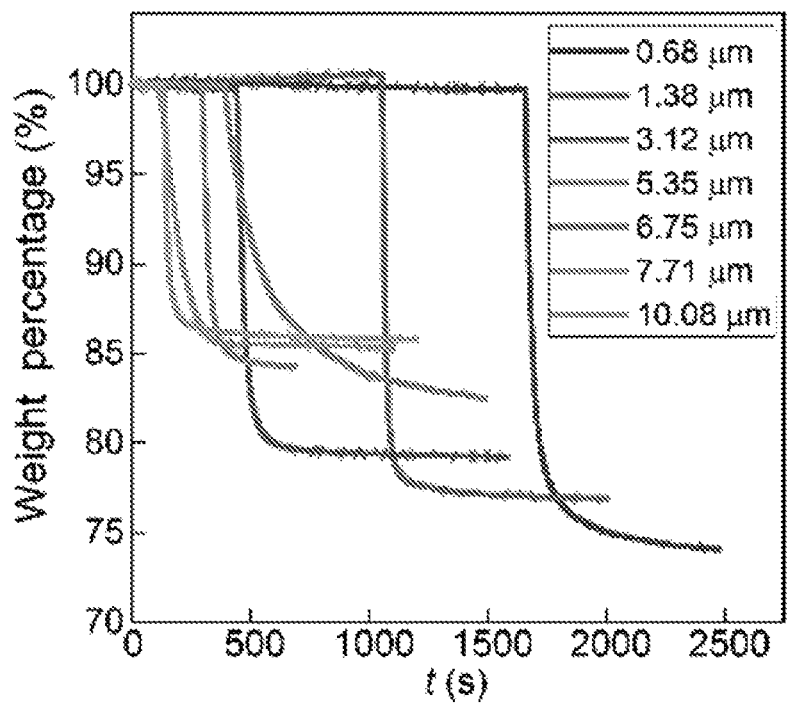
FIG. 16C is a graph showing measured weight changes in nanowire films of different thicknesses.

With reference to FIG. 16B, a typical frequency response from the QCM is depicted. The lower, straighter line is the response from the bare quartz crystal resonator before and during dry-air flowing, showing no signal change or mass change. The upper curved line shows the frequency response from a nanowire-coated crystal resonator, with the first and second arrows indicating the start and stop of dry-air flow, respectively. The moisture re-adsorption time (e.g., around 300 s, gray region) is consistent with a voltage building-up time (e.g., around 300 s). FIG. 16C depicts measured weight changes in nanowire films of different thicknesses (corresponding to moisture content).

Figure 17A:
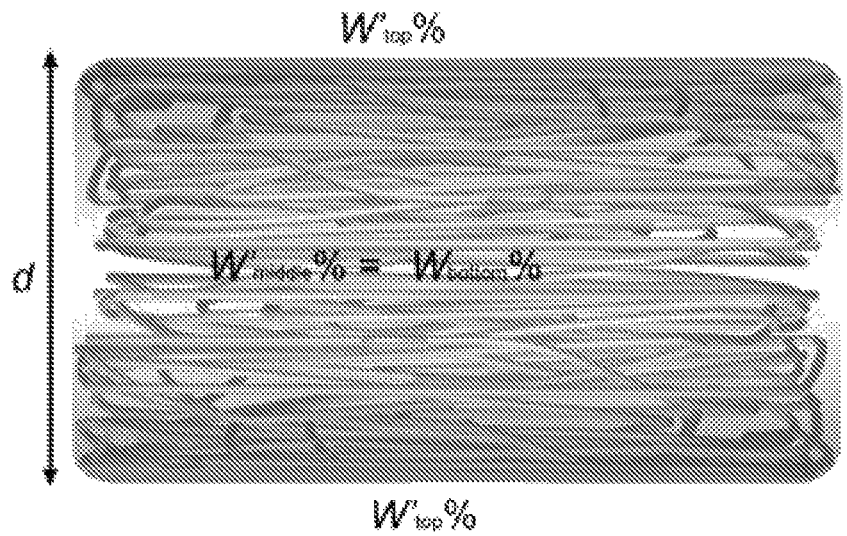
FIG. 17A is a schematic showing the existence of a moisture gradient where the average adsorption ratio ($W'_{H2O}$%) in a peel-off film (thickness d) is ($W'_{top}$%+ $W'_{middle}$%)/2, where $W'_{top}$% and $W'_{middle}$% are the local adsorption ratios at the top and middle interfaces, respectively.
Figure 17B:
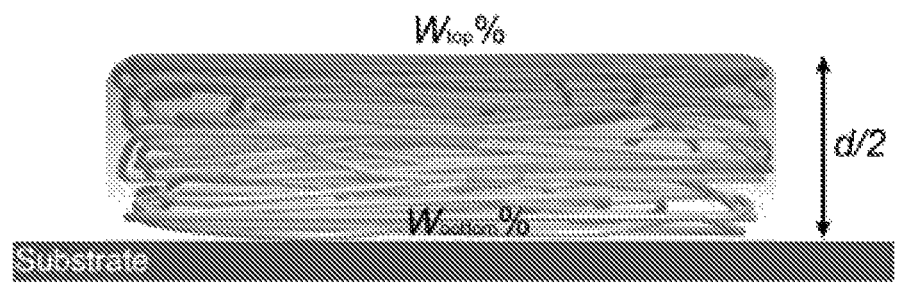
FIG. 17B is a schematic showing the existence of a moisture gradient for a symmetric diffusion from top and bottom interfaces, where $W'_{middle}$% is the same as the bottom adsorption ratio ($W_{bottom}$%) in a half-thick (d/2) film deposited on substrate (i.e., bottom interface being sealed).
Figure 17C:
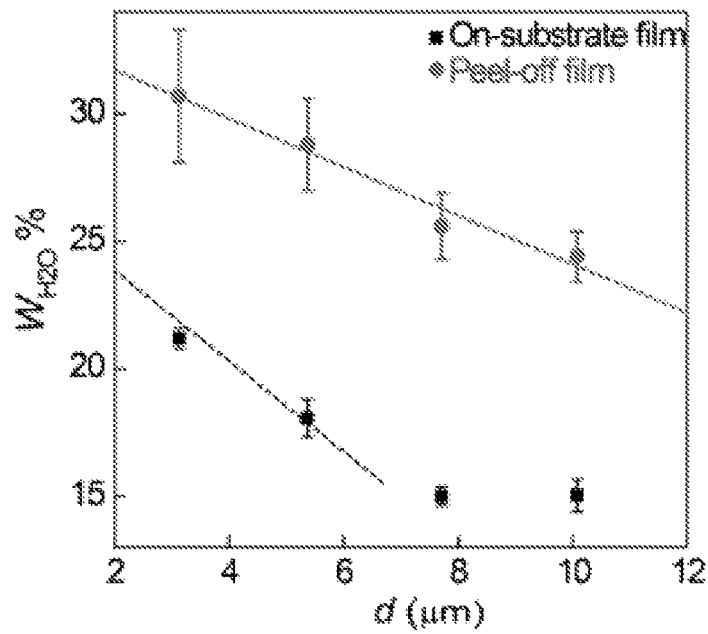
FIG. 17C is a graph showing measured adsorption ratios in peel-off nanowire films at different thicknesses, compared to those in on-substrate nanowire films.
Figure 17D:
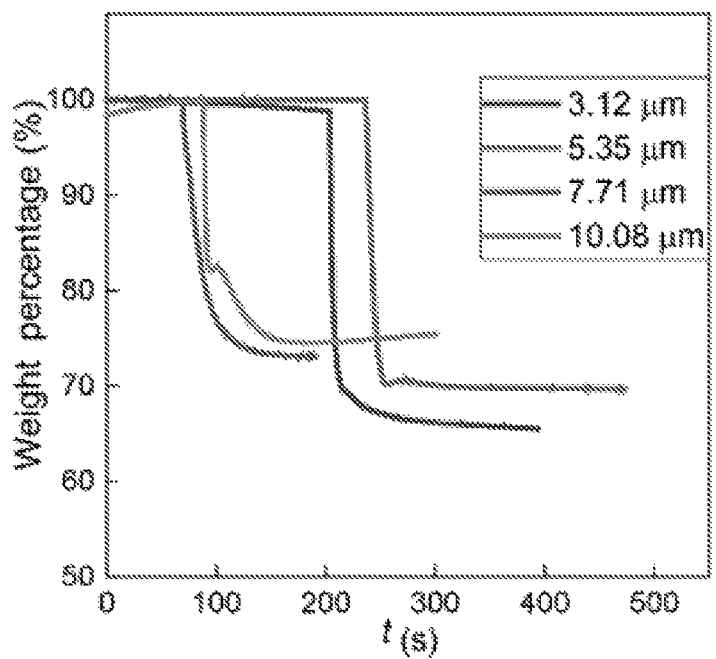
FIG. 17D is a graph showing weight changes in nanowire films of different thicknesses, corresponding to data points of peel-off films in FIG. 17C, measured by QCM.

Moisture adsorption in peel-off nanowire films. With reference to FIGS. 17A-D, the existence of moisture gradient can be further verified. If a moisture gradient existed (i.e., the local adsorption would be dependent on its depth from the interface), then exposing both interfaces would yield increased moisture adsorption. Specifically, with reference to FIG. 17A, the average adsorption ratio ($W'_{H_2O}\%$) in a peel-off film (thickness d) is ($W'_{top}\% + W'_{middle}\%$)/2, where $W'_{top}\%$ and $W'_{middle}\%$ are the local adsorption ratios at the top and middle interfaces, respectively. With reference to FIG. 17B, for a symmetric diffusion from top and bottom interfaces, $W_{middle}\%$ is the same as the bottom adsorption ratio ($W_{bottom}\%$) in a half-thick (d/2) film deposited on substrate (i.e., bottom interface being sealed). This indicates that (before saturation) the average adsorption ratio in a peel-off film is similar to that in a half-thick on-substrate film, or its thickness dependence (slope) is half of that in on-substrate films. With reference to FIG. 17C, measured adsorption ratios in peel-off nanowire films at different thicknesses (upper dots), compared to those in on-substrate nanowire films (lower dots) are depicted. The linear fitting (dashed lines) yielded a slope of −0.95% μm⁻¹ in peel-off films, which was close to half the value (−1.77% μm⁻¹) in on-substrate films. With reference to FIG. 17D, weight changes in nanowire films of different thicknesses, corresponding to data points of peel-off films in FIG. 17C, measured by QCM are depicted.

Figure 18A:
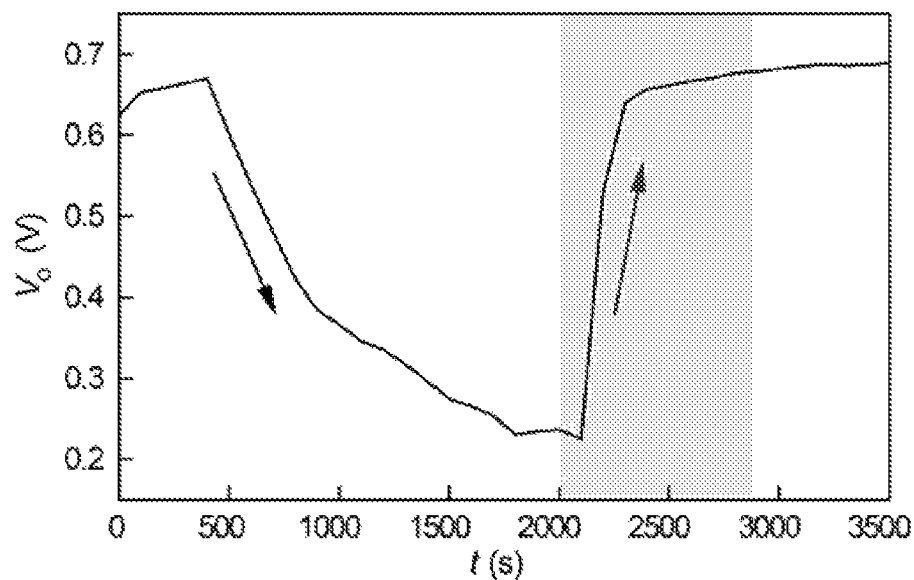
FIG. 18A is a graph showing the evolution of the open-circuit voltage ($V_o$) in a nanowire device.
Figure 18B:
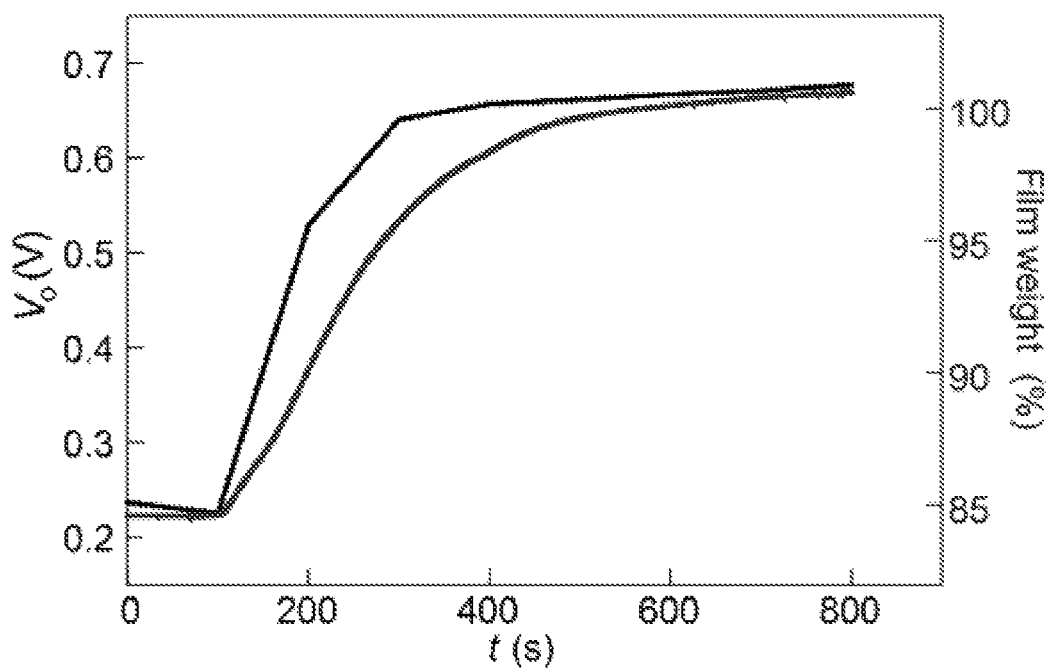
FIG. 18B is a graph showing a comparison between the $V_o$ recovery process (upper curve) with a typical moisture re-adsorption process in the nanowire film (lower curve) measured by QCM.

Moisture adsorption-dependent voltage. With reference to FIG. 18A, evolution of the open-circuit voltage ($V_o$) in a nanowire device is depicted. The downward facing arrow indicates the stage when the nanowire device was placed on a hot plate (around 80° C.) to drive out the initially adsorbed moisture. The upward facing arrow indicates the stage when the device was removed from the hot plate and placed in ambient environment, showing a recovery in $V_o$. With reference to FIG. 18B, comparison between the $V_o$ recovery process (upper curve, corresponding to gray region in FIG. 18A) with a typical moisture re-adsorption process in the nanowire film (lower curve) measured by QCM. The two curves show similar recovery rates.

Figure 19A:
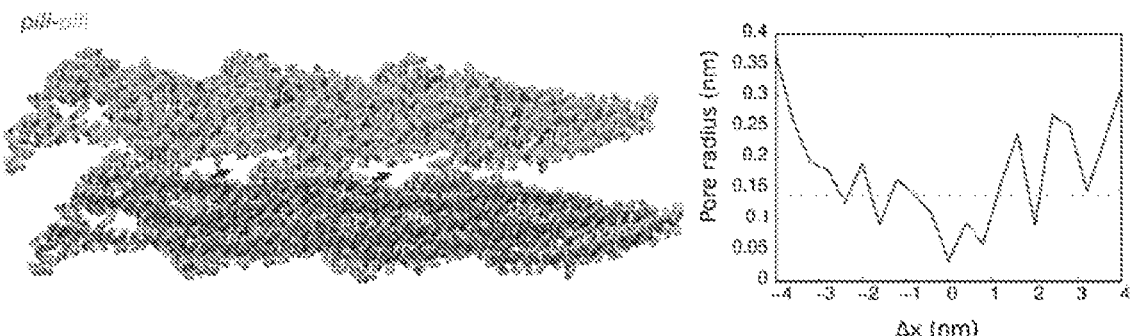
FIG. 19A is a schematic and graph showing (Left panel) Molecular modeling of two pili nanowires interfacing with each other, with the arrows indicating the pores formed at the interface. (Right panel) Calculated maximal pore radius with respect to the relative position (Δx) of the two protein nanowires. The dashed line indicates the radius of a water molecule (around 0.14 nm).
Figure 19B:
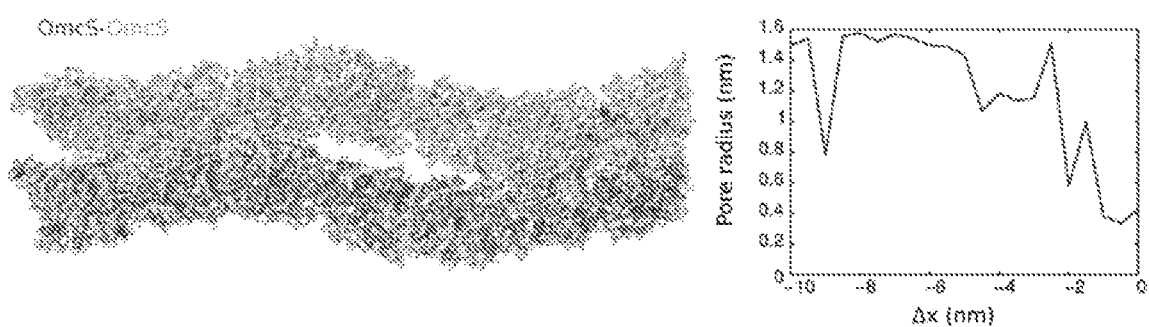
FIG. 19B is a schematic and graph showing representative conformation of tightly packed OmcS-OmcS filaments (left) and calculated pore radius with respect to Δx (right).
Figure 19C:
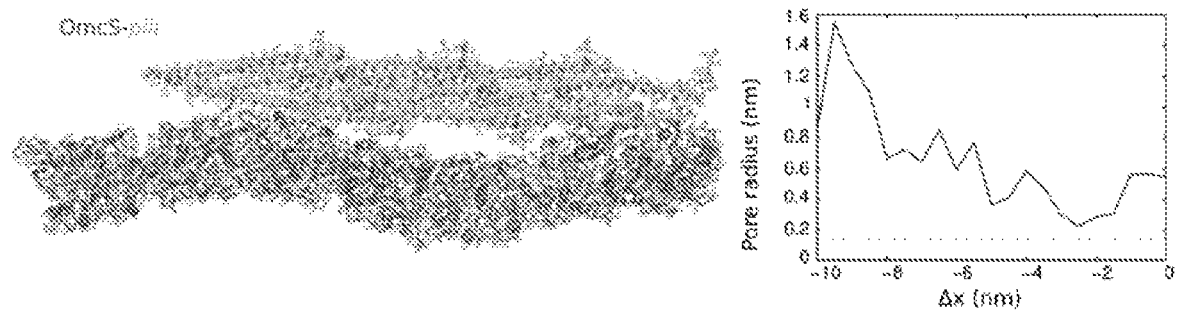
FIG. 19C is a schematic and graph showing representative conformation of tightly packed OmcS-pili filaments (left) and calculated pore radius with respect to Δx (right).

Molecular modeling of nanowire-nanowire interfaces. The simulation details are described in the Materials and Methods below. With reference to FIGS. 19A-C, the nanowire-nanowire interface in the simulation involved two nanowire filaments in parallel configurations. The axis of both filaments is along the x direction. One filament was designated as the reference and the other filament was shifted in both x- and y-directions with respect to the reference filament and rotated along the filament axis to identify the most stable packing configurations. With reference to FIG. 19A (left panel), molecular modeling of two pili nanowires interfacing with each other is depicted, with the arrows indicating the pores formed at the interface. The right panel depicts calculated maximal pore radius with respect to the relative position (Δx) of the two protein nanowires. The dashed line indicates the radius of a water molecule (around 0.14 nm). With reference to FIG. 19B, representative conformation of tightly packed OmcS-OmcS filaments (left) and calculated pore radius with respect to Δx (right) are depicted. With reference to FIG. 19C, representative conformation of tightly packed OmcS-pili filaments (left) and calculated pore radius with respect to Δx (right) are depicted.

Figure 20:
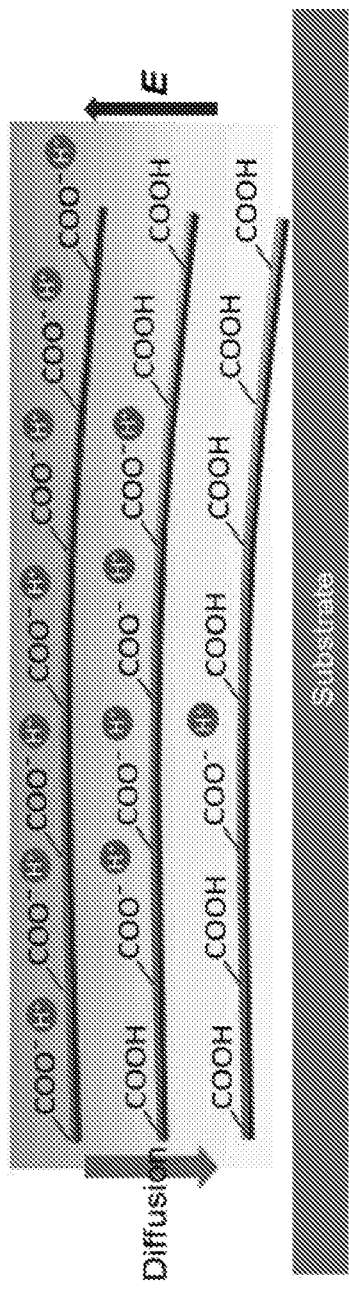
FIG. 20 is a schematic showing a moisture gradient (represented by the cyan background) in the nanowire film.

Analysis of moisture-dependent output voltage in nanowire device. With reference to FIG. 20, a schematic shows the moisture gradient (represented by the cyan background) in the nanowire film based on experimental observation. The nanowire contains a high-density carboxylic groups (—COOH). At higher moisture adsorption, a larger percentage of the carboxylic groups will be ionized (forming $H^+$ and —COO$^-$ ions). Therefore, an ionization gradient will form following the moisture gradient. Since the proton or $H^+$ is mobile (against an immobile —COO$^-$ anionic background), it will lead to $H^+$ diffusion from top to bottom (blue arrow). The diffusion current density can be expressed as $$J_{Diff} = -qD\frac{dC}{dx},$$

where q, D, C represent the carrier charge, diffusion coefficient, and concentration of $H^+$ ions in the nanowire film. The diffusion results in a (positive) charge accumulation at the bottom surface and a negative anionic background at the top, creating an electric field (E) that will counterbalance the charge diffusion (black arrow). The drift current density caused by this field can be expressed as $J_{Drift} = \sigma^{nw} \cdot E$, where $\sigma^{nw}$ represents the electric conductivity in the nanowire film. The net current in the nanowire film will be $$J = J_{Diff} + J_{Drift} = \sigma^{nw} \cdot E - qD\frac{dC}{dx}.$$

At equilibrium (open-circuit) state, net current J=0, which leads to $$\sigma^{nw} \cdot E = qD\frac{dC}{dx}. \quad \text{Eq. (1)}$$

As the nanowire film is thin (e.g., several μm), the concentration gradient $$\frac{dC}{dx}$$

can be approximated as $$\frac{\Delta C}{h},$$

where Δc, and h represent the difference in $H^+$ concentration between the top and bottom interfaces and thickness in nanowire film, respectively. Note that $$E = \frac{V_o}{h},$$

where $V_o$ is the open-circuit voltage. Eq. (1) yields $$V_o = \frac{qD}{\sigma^{nw}}\Delta C. \quad \text{Eq. (2)}$$

Although the actual ionization or $H^+$ concentration is subjected to molecular dynamics that requires further investigation, a reasonable assumption is that the ionization can be approximately proportional to the availability of water molecules or the moisture-adsorption ratio ($W_{H_2O}$%) in the nanowire film. Therefore, we would expect $$V_o \propto \frac{qD}{\sigma^{nw}}(\Delta W_{H_2O}\%),$$

or that the open-circuit voltage ($V_o$) would be proportional to the moisture difference $\Delta W_{H_2O}$% between the top and bottom interfaces.

Figure 21:
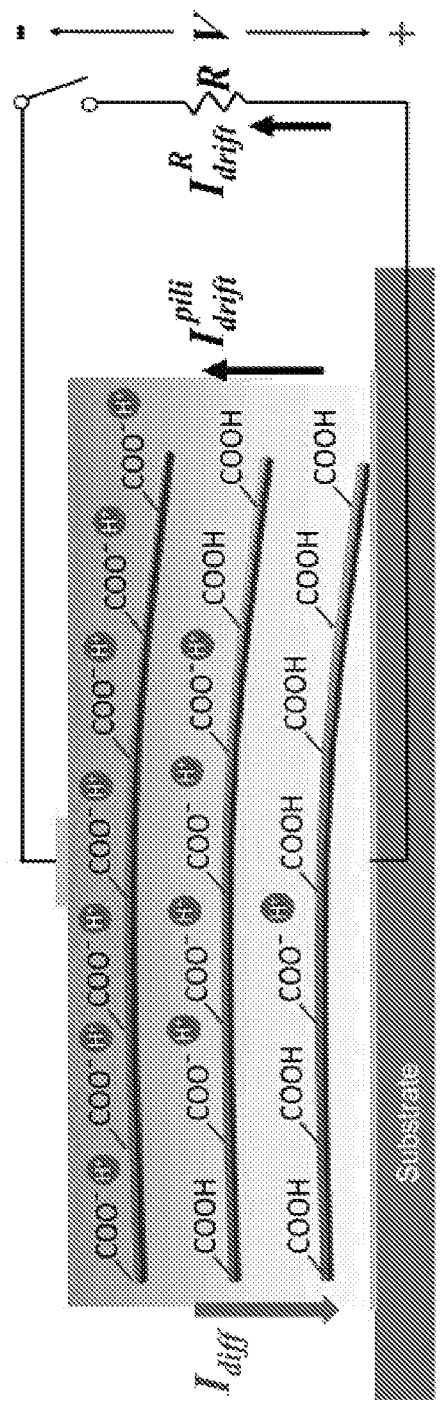
FIG. 21 is a schematic showing current in a nanowire device.

Current in nanowire device. With reference to FIG. 21, following discussion from FIG. 20 above, at steady state, the nanowire film has a balance or cancellation between the drift current ($I_{drift}$) and diffusion current ($I_{diff}$):

$$I_{drift} = I_{diff} = A \cdot qD \cdot \frac{\Delta C}{h}, \quad \text{eq. (3)}$$

where A represents the size of the device. If the nanowire device is connected to an external circuit, an additional path for the drift current is created. Therefore:

$$I_{drift} = I_{drift}^{nw} + I_{drift}^{R} = A \cdot qD \cdot \frac{\Delta C}{h}, \quad \text{Eq. (4)}$$

where $I_{drift}^{nw}$, $I_{drift}^{R}$ represent the drift-current components passing through the nanowire film and external circuit, respectively. In other words, an external circuit takes out portion of the initial internal drift current in an open-circuit nanowire device. Re-writing Eq. (4) yields $$\frac{V}{R^{nw}} + \frac{V}{R} = A \cdot qD \cdot \frac{\Delta C}{h}, \text{ or } V = A \cdot qD \cdot \frac{\Delta C}{h} \cdot \left(\frac{R^{nw} \cdot R}{R^{nw} + R}\right), \quad \text{Eq. (5)}$$

where $R^{nw}$, R, V represent the nanowire-film resistance, external load resistance, and final output voltage, respectively. For open circuit, R→∞ and by using $$\sigma^{pili} = \frac{A}{R^{pili} \cdot h},$$

Eq. (5) goes back to Eq. (2) that describes open-circuit voltage $V_o$. Consequently, Eq. (5) yields $$V = \left(\frac{R}{R^{nw} + R}\right)V_o, \quad \text{Eq. (6)}$$

$$I_{drift}^R = \left(\frac{R^{nw}}{R^{nw} + R}\right)I_{drift}, \quad \text{Eq. (7)}$$

where $V_o$, $I_{drift}$ represent the output voltage and internal drift current (equivalent to short-circuit current $I_{sc}$) in an open-circuit nanowire device, respectively. $I_{drift}^R$ corresponds to the measured current (I) through the load resistor R. Eqs. (6), (7) indicate that when the nanowire device is connected to a load resistor R, both the output voltage V and measured current I will gradually drop from $V_o$ and $I_{sc}$ to $$\left(\frac{R}{R^{nw} + R}\right)V_o \text{ and } \left(\frac{R^{nw}}{R^{nw} + R}\right)I_{sc};$$

disconnecting the load resistor R will increase the voltage back to $V_o$ (re-charging process). These analyses are consistent with the voltage and current trends in the self-recharging process observed experimentally. Note that above analyses are based on the assumption that the $H^+$ concentration difference $\Delta C$ across the nanowire film thickness is kept constant.

Figure 22A:
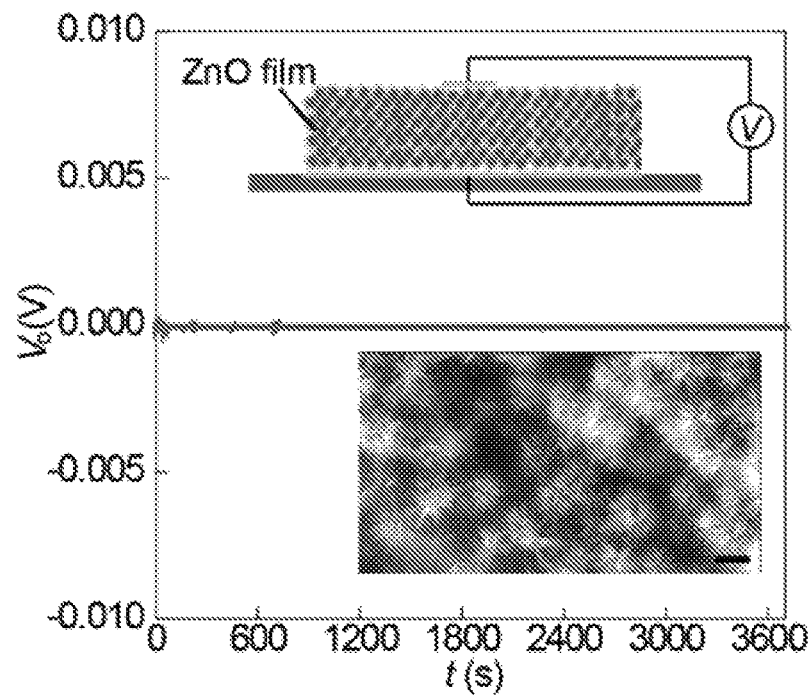
FIG. 22A is a schematic and graph showing $V_o$ (around 0 V) from thin film (around 10 μm thick) made from synthetic zinc-oxide (ZnO) microparticles.
Figure 22B:
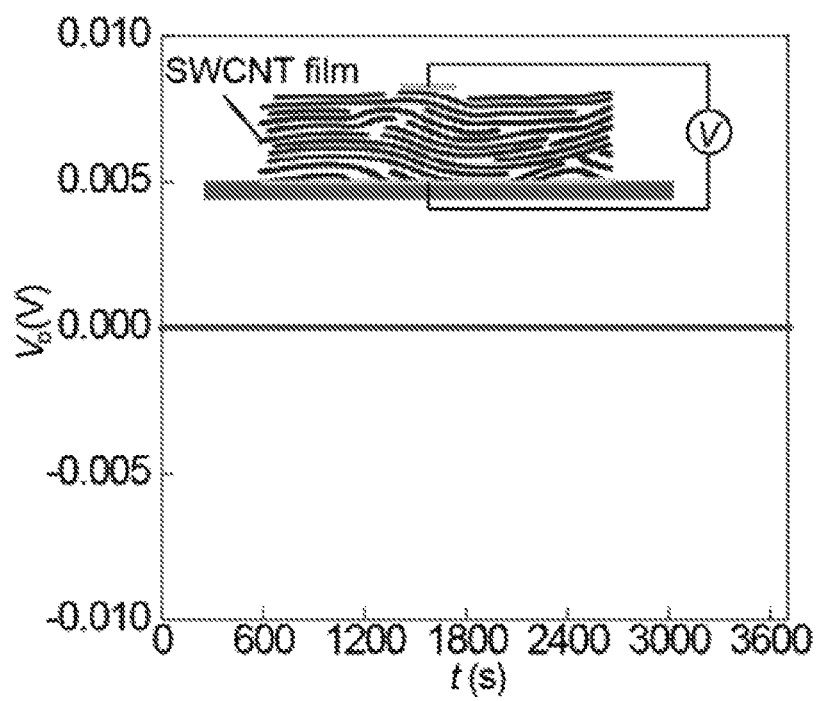
FIG. 22B is a schematic and graph showing $V_o$ (around 0 V) from thin film (around 10 μm thick) made from single-walled carbon nanotubes (SWCNTs).
Figure 22C:
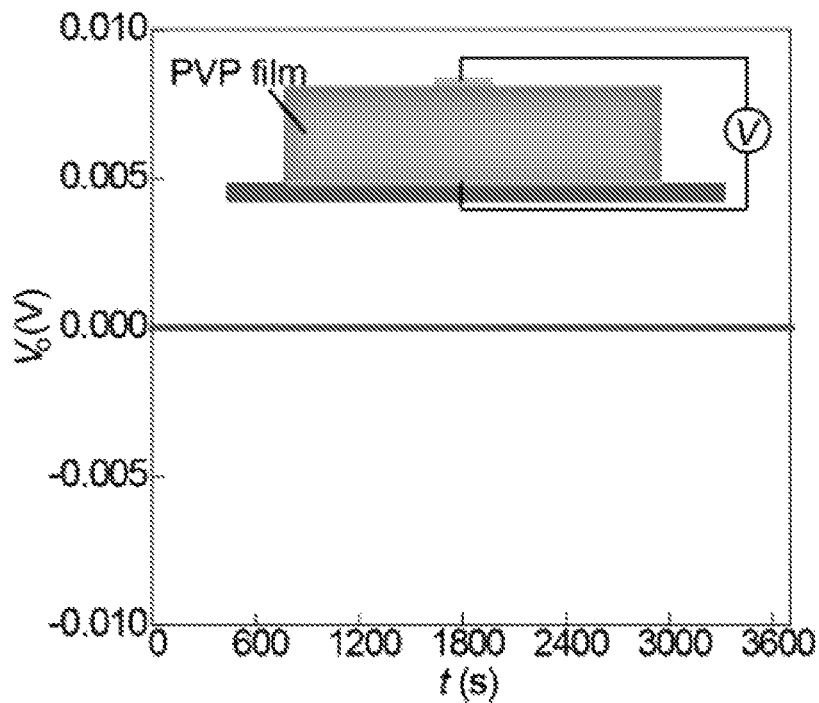
FIG. 22C is a schematic and graph showing $V_o$ (around 0 V) from thin film (around 10 μm thick) made from polyvinylpyrrolidone (PVP).
Figure 22D:
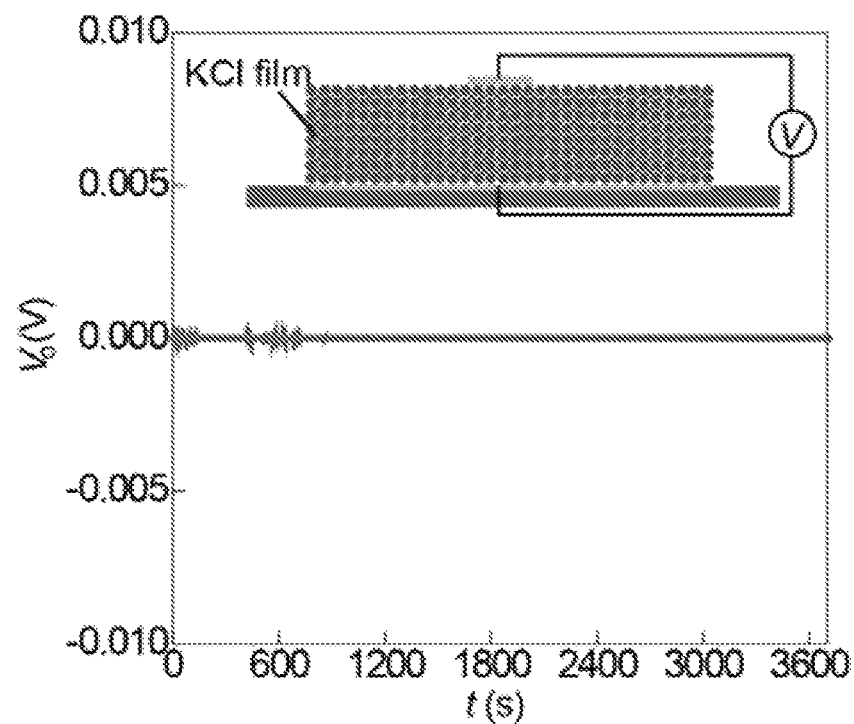
FIG. 22D is a schematic and graph showing $V_o$ (around 0 V) from thin film (around 10 μm thick) made from potassium chloride (KCl) by evaporating KCl solution.

Open-circuit voltage ($V_o$) measured from control devices in the ambient environment (RH around 50%). With reference to FIG. 22A, $V_o$ (around 0 V) from thin film (around 10 μm thick) made from synthetic zinc-oxide (ZnO) microparticles is depicted. The film featured a high density of pores larger than molecular scale due to a spiked morphology in the microparticles. The bottom inset shows a scanning electron microscope (SEM) image of the assembled film. Scale bar, 2 μm. The ZnO microparticles were synthesized using a low-temperature solution process. With reference to FIG. 22B, $V_o$ (around 0 V) from thin film (around 10 μm thick) made from single-walled carbon nanotubes (SWCNTs) is depicted. The SWCNTs (#US4101; US Research Nanomaterials, Inc.), with diameters of 1-2 nm similar to nanowire, yield molecular pores in the film but lack surface functional groups. The thin film was made by dropcasting SWCNTs solution prepared in dimethyl sulfoxide (DMSO). With reference to FIG. 22C, $V_o$ (around 0 V) from thin film (around 10 μm thick) made from polyvinylpyrrolidone (PVP) is depicted. The PVP thin film is hygroscopic and adsorbs similar amount of moisture (e.g., 30 w.t. %) in the ambient environment. The film was made by dropcasting PVP solution (3 mg/mL, molecular weight 360000) onto the bottom electrode. With reference to FIG. 22D, $V_o$ (around 0 V) from thin film (around 10 μm thick) made from potassium chloride (KCl) by evaporating KCl solution is depicted. Moisture adsorption in hygroscopic KCl will result in ionic conduction.

Figure 23A:
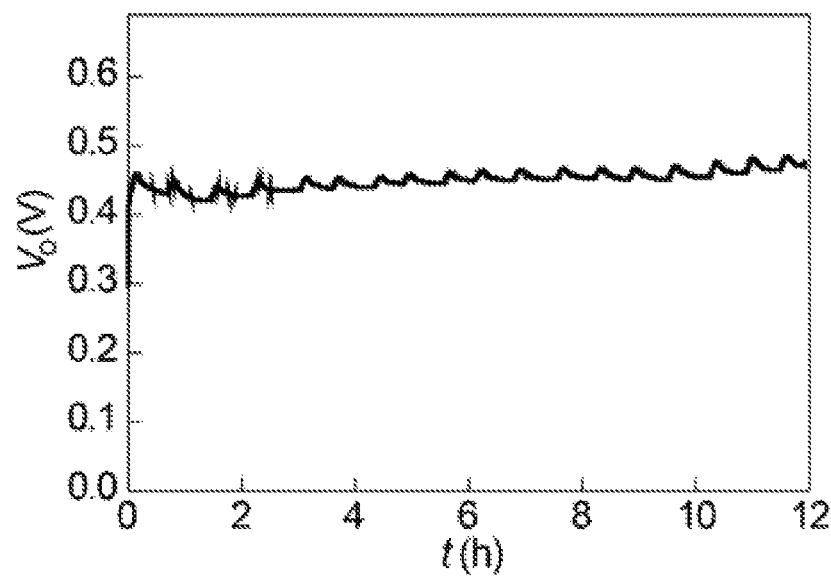
FIG. 23A is a graph showing open-circuit voltage measured from a thin film made from genetically modified nanowire (Aro-5) in the ambient environment (RH around 50%).
Figure 23B:
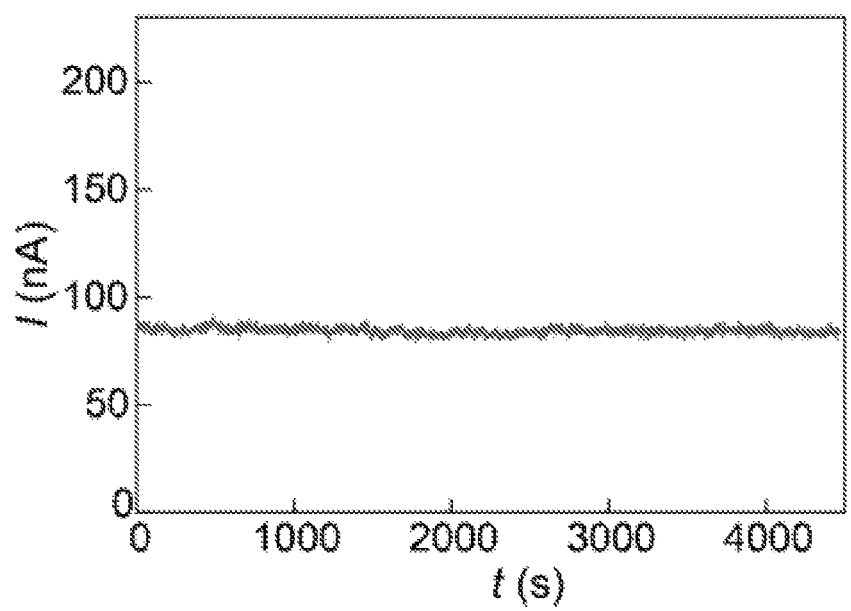
FIG. 23B is a graph showing short-circuit current measured from a thin film made from genetically modified nanowire (Aro-5) in the ambient environment (RH around 50%).

Open-circuit voltage (FIG. 23A) and short-circuit current (FIG. 23B) measured from a thin film made from genetically modified nanowire (Aro-5) in the ambient environment (RH around 50%).

In Aro-5 nanowire, the four aromatic amino acid groups in the pilin monomer are substituted with alanine. The substitutions nevertheless do not alter the molecular structure in the nanowire.

Previous measurements of individual nanowires revealed that the Aro-5 nanowire had over 100-fold lower conductivity compared to a wild-type wires, which characterized the intrinsic electron conduction. When nanowires aggregate into thin films, the measured conductivity will include extrinsic conduction through the nanowire-nanowire interface (e.g., contact resistance). The dominant nanowire-nanowire contact resistance was the reason why the measured conductivity in nanowire films (e.g., ~μS/cm) was over $10^3$ fold lower than that of individual nanowires (e.g., ~mS/cm). It was also the main reason why a wild-type nanowire film had only several times (e.g., 3-10) higher conductivity than Aro-5 nanowire films, as the extrinsic conduction (a limiting factor) basically screened the intrinsic conduction.

Similarly, the extrinsic conduction will dominate in thin films. As a result, Aro-5 thin films will have a conductivity closer to wild-type one. This is consistent with the result that the Aro-5 films produced a similar voltage but a around 4-fold lower current (around 80 nA) compared to wild-type device. This 4× reduction in conductance falls into the range (e.g., 3-10) observed in nanowire films.

Figure 24A:
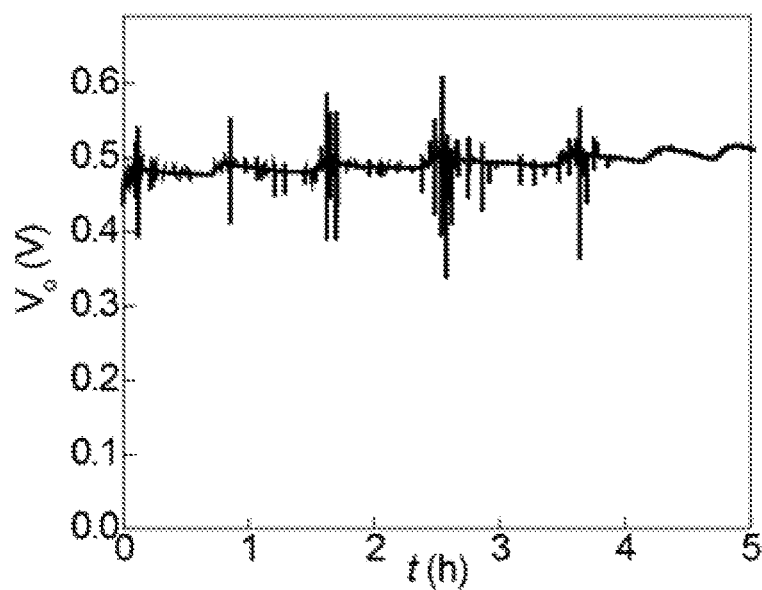
FIG. 24A is a graph showing electric output (open-circuit voltage) in nanowire film prepared from close-to-neural solution (pH around 8).
Figure 24B:
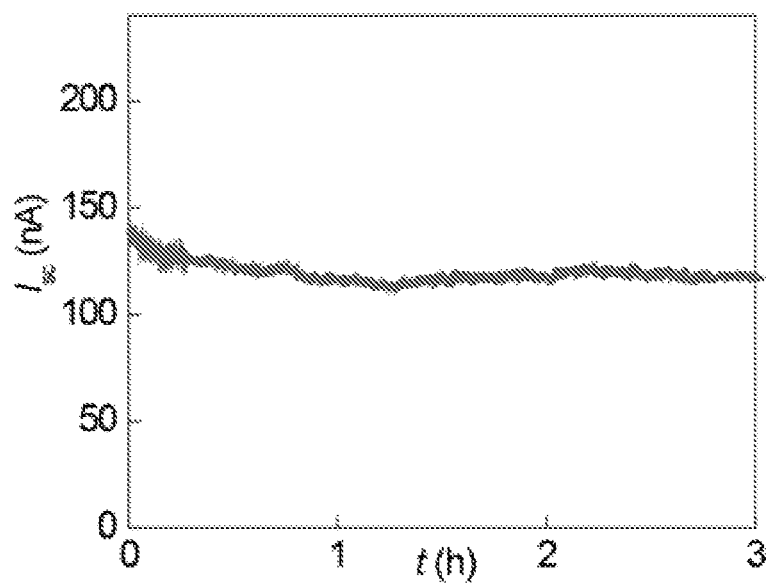
FIG. 24B is a graph showing electric output (short-circuit current) in nanowire film prepared from close-to-neural solution (pH around 8).

Electric outputs in nanowire film prepared from close-to-neural solution (pH around 8). Previous study revealed that a low pH (around 2) in the nanowire preparation solution increased the conductivity in individual nanowire, although the mechanism is not yet known (e.g., by doping to functional groups). For this reason, hydrochloric acid (HCl) was added to adjust the pH in nanowire preparation solution to around 2 and intend to improve nanowire film conductivity. As the film was formed by evaporating the solution at 80° C. (see Materials and Methods), the volatile HCl component was expected to be driven out and introduce negligible effect to observed phenomenon. With reference to FIG. 24A, as control, thin-film device made from as-purified nanowire solution (e.g., pH around 8) without adding HCl produced similar open-circuit voltage ($V_o$ around 0.5 V) in the ambient environment (RH around 45%), which is consistent with the expectation because voltage generation is diffusion based and hence only dependent on film/nanowire structure. With reference to FIG. 24B, the reduced short-circuit current ($I_{sc}$ around 120 nA) is consistent to the circuit analysis that an increase in film resistance leads to reduced current. The nanowire film had an increased resistance (by a factor around 2) compared to film prepared at pH around 2.

Figure 25A:
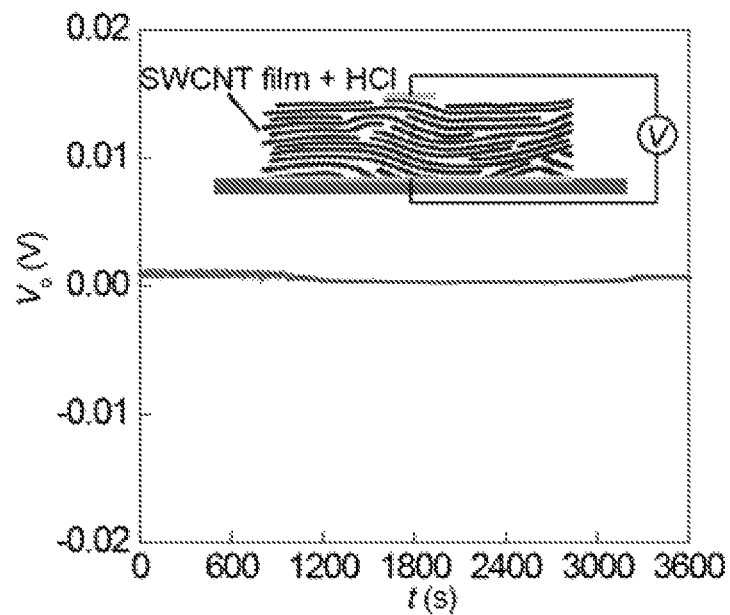
FIG. 25A is a schematic and graph showing open-circuit voltage ($V_o$ around 0 V) from control devices made from SWCNTs added with HCl.
Figure 25B:
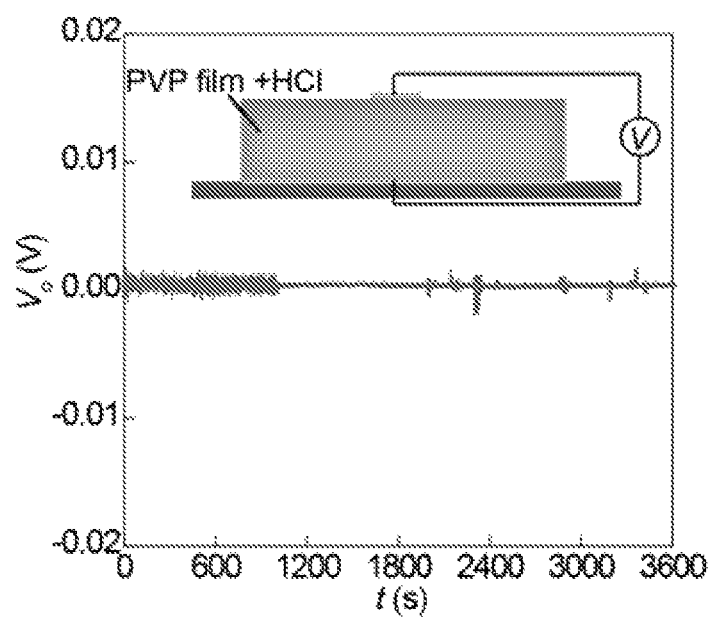
FIG. 25B is a schematic and graph showing open-circuit voltage ($V_o$ around 0 V) from control devices made from hygroscopic PVP added with HCl.

Open-circuit voltage ($V_o$ around 0 V) from control devices added with HCl. HCl solution (pH around 2) was purposely added to thin-film devices made from other materials and left dry. Measurements showed negligible $V_o$ (e.g., less than 1 mV) in devices made from SWCNTs (FIG. 25A) and hygroscopic PVP (FIG. 25B) in the ambient environment (RH around 50%).

Figure 26:
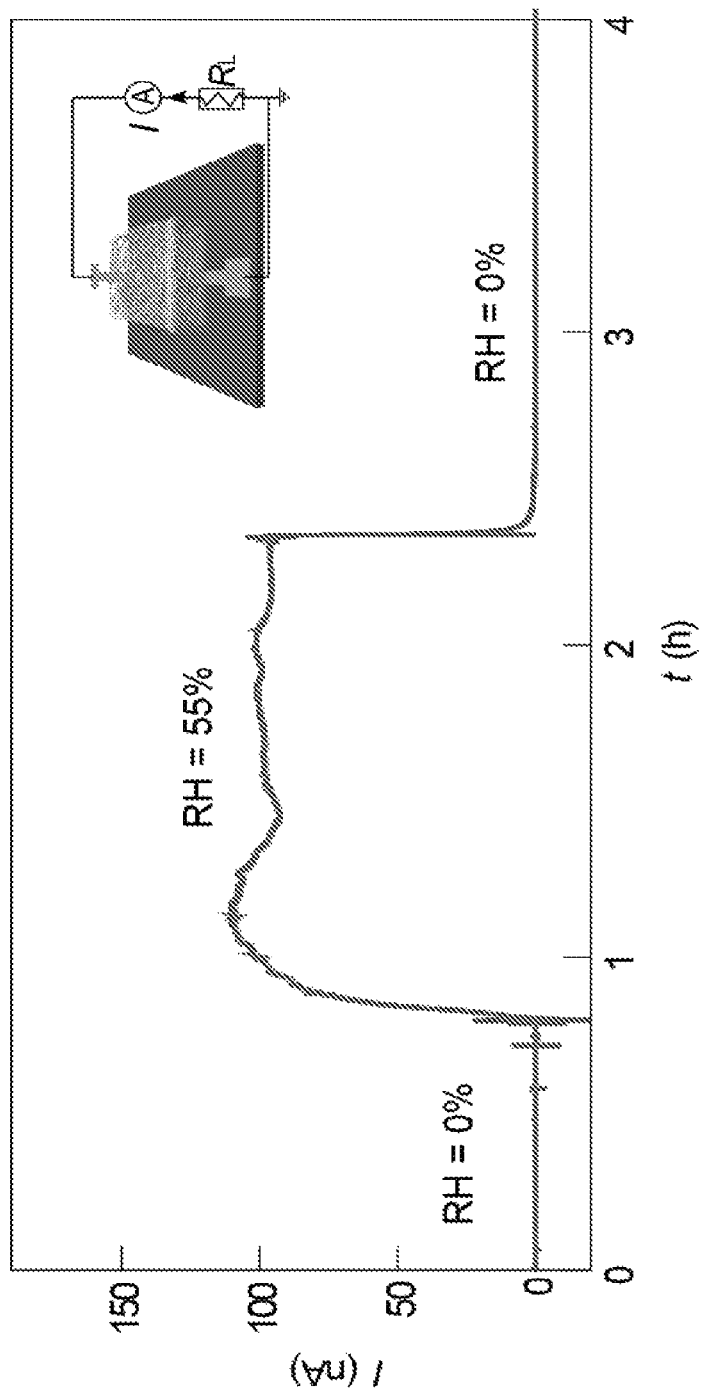
FIG. 26 is a schematic and graph showing reversible current output from a nanowire device with respect to the change in relative humidity (RH).

Reversible current output from a nanowire device with respect to the change in relative humidity (RH). With reference to FIG. 26, a load resistor ($R_L$=2 MΩ) was added to the circuit as shown in the schematic (inset). The result shows the dominant role of ambient moisture plays for electric output.

Figure 27A:
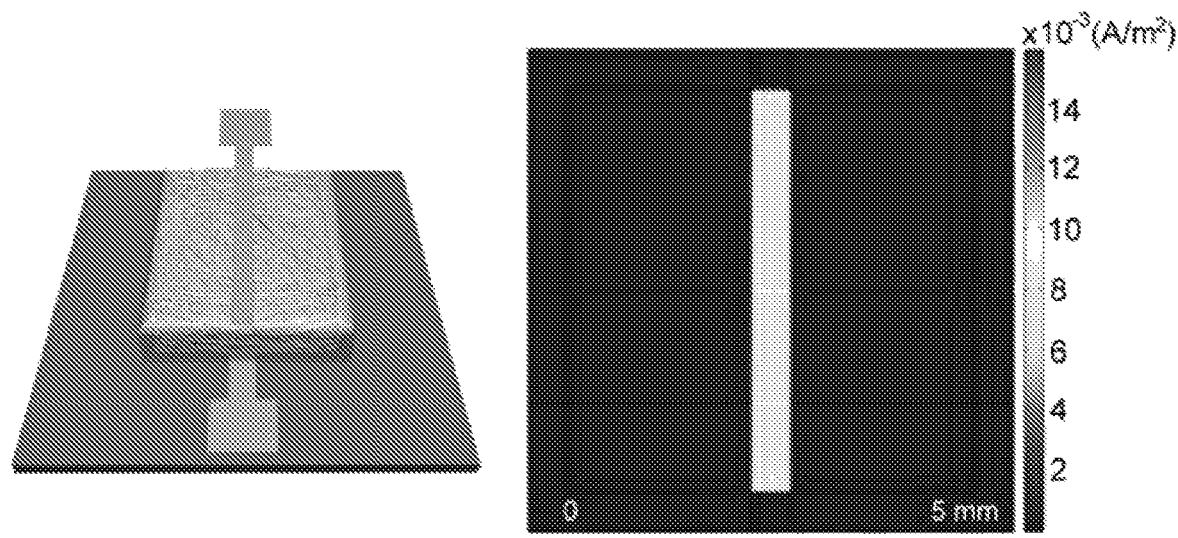
FIG. 27A is a schematic showing (Left panel) a device structure used for voltage/current scaling study and (Right panel) a top-view current distribution in the nanowire device simulated by using the finite element method (COMSOL 4.3).
Figure 27B:
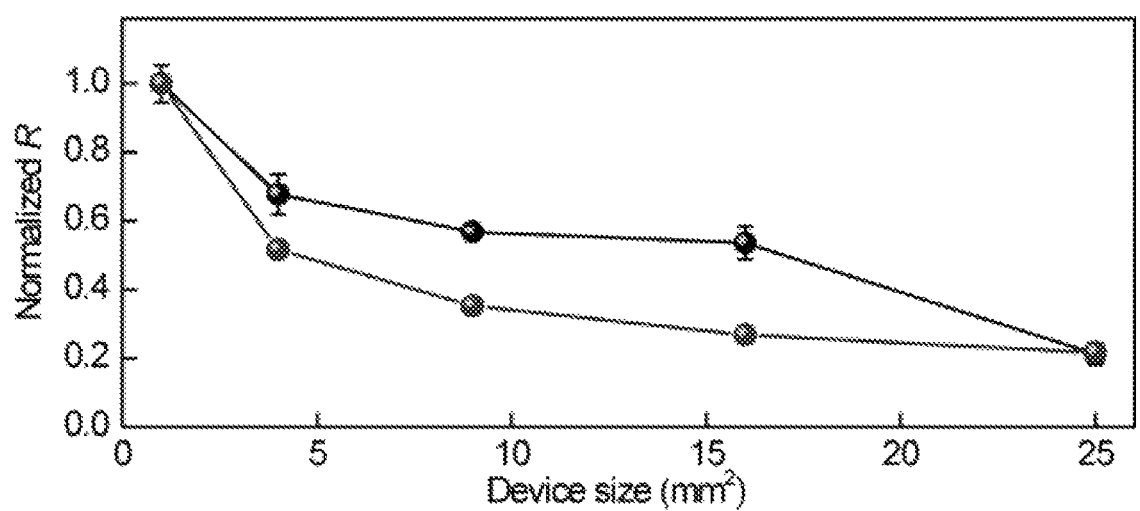
FIG. 27B is a graph showing changes in resistance in the nanowire devices with respect to changes in device size from (upper curve) experiment (i.e., $V_o/I_{sc}$) and (lower curve) simulation, respectively.

Internal resistance scaling in nanowire devices. With reference to FIG. 27A (left panel), a schematic of the device structure used for voltage/current scaling study is depicted. The width of the top electrode was kept constant (around 0.5 mm), whereas the sizes of the bottom electrode and nanowire film were changed. With reference to the right panel of FIG. 27A, top-view current distribution in the nanowire device simulated by using the finite element method (COMSOL 4.3) is depicted. The square and rectangular bar (black lines) indicate the bottom and top electrodes, respectively. A thickness of around 5 μm and a sheet resistance around 1 MΩ/□ in the nanowire film obtained from experimental values were used for the simulation. Note that eventually the actual values were less relevant as we focused on the change in relative resistance. Both top and bottom electrodes were assumed to be ideal conductors, given that the conductivity in gold electrodes (e.g., $4\times10^5$ S/cm) is orders of magnitude larger than that in nanowire film. With reference to FIG. 27B, changes in resistance in the nanowire devices with respect to changes in device size from (upper curve) experiment (i.e., $V_o/I_{sc}$) and (lower curve) simulation, respectively, are depicted. The resistance was normalized to the (maximal) value obtained in the smallest device size (1 mm$^2$).

Figure 28:
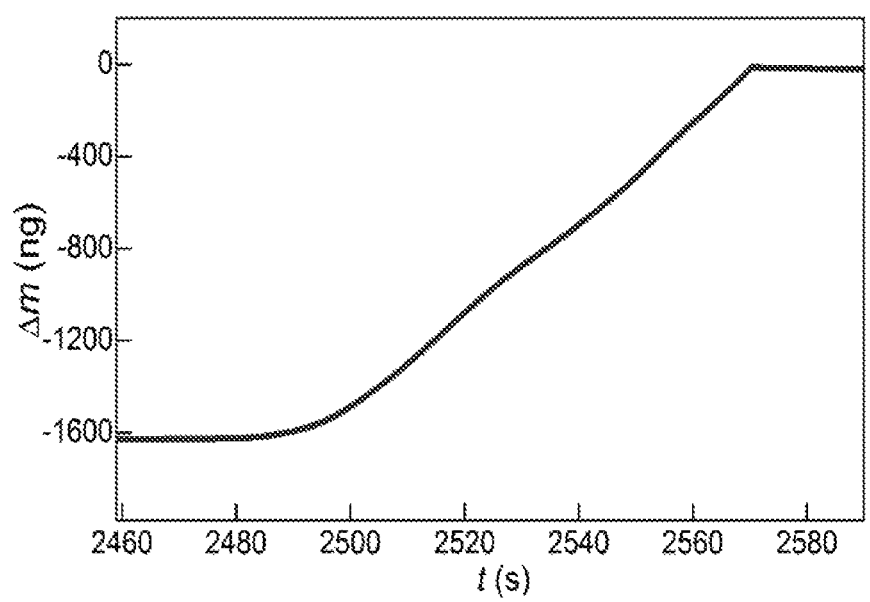
FIG. 28 is a graph showing an estimated upper limit of power output for the electric power generation device according to the present invention.

Estimate of the upper limit in power output. With reference to FIG. 28, the proposed mechanistic picture can help to estimate the theoretical limit in power output from the device. The possible maximal energy input from ambient moisture is P=ΔE×n, where ΔE, n are the average electron energy difference between ambient water molecules and the nanowire film, and water-molecule exchange rate (cm$^{-2}\cdot$s$^{-1}$). ΔE (around 0.2 eV) can be estimated from the voltage difference between an open circuit (around 0.5 V) and close circuit (around 0.3 V). Meanwhile, the water resorption rate was experimentally determined in a dry nanowire film (around 1 μm thick). The QCM measurement showed that the dry film (size A around 0.20 cm$^2$) adsorbed Δm around 1.6 μg of water in t~70 s (RH around 50%). The resorption rate (n') can be calculated as:

$$n' = \frac{\frac{\Delta m}{M_{H2O}} \times N_A}{t \times A},$$

where $M_{H2O}$ (18 g·mol$^{-1}$) and NA ($6.022\times10^{23}$ mol$^{-1}$) are the molar mass of water and Avogadro's number, respectively. The equation yields a resorption rate n'=$3.9\times10^{15}$ cm$^{-2}\cdot$s$^{-1}$.

In a general chemical/recombination process defined as [A]+[B]4-[AB], the recombination rate (r) is proportional to the product of [A] and [B] as r=k·[A]·[B], whereas the dissociation rate (d) is proportional to [AB] as d=k'·[AB]. In this case, [A], [B], and [AB] are the densities of ambient water molecules, vacant sites on protein nanowires, and filled sites, respectively. [A] is considered constant. The resorption rate (n') is the difference between recombination and dissociation as n'=r-d=k·[A]·[B]-k'·[AB]. During resorption, the number of vacant sites on nanowires [B] is maximal whereas the water-filled sites are minimal (e.g., [AB]~0). Consequently, the resorption rate is approximately the same as recombination rate as n'~k·[A]·[B]. At equilibrium (n'=0; or r=d), the number of vacant sites [B'] reduces. The exchange rate is the same as recombination rate (or dissociation rate) of k·[A]·[B'], which is smaller than the initial resorption rate of k·[A]·[B].

The above analysis indicates that the resorption rate (n') can be viewed as the upper limit of the exchange rate n. Together, we can estimate the theoretical limit of power generation as P=ΔE×n~120 μW/cm$^2$. The measured maximal electric output (around 20 μw/cm$^2$) from the nanowire device was ~16% of the theoretical limit.

Figure 29A:
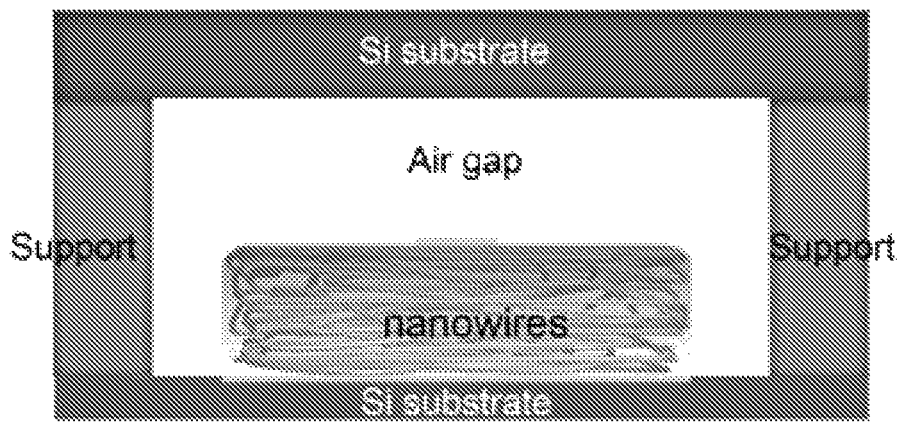
FIG. 29A is a schematic of a measurement setup of the electric power generation device according to the present invention.
Figure 29B:
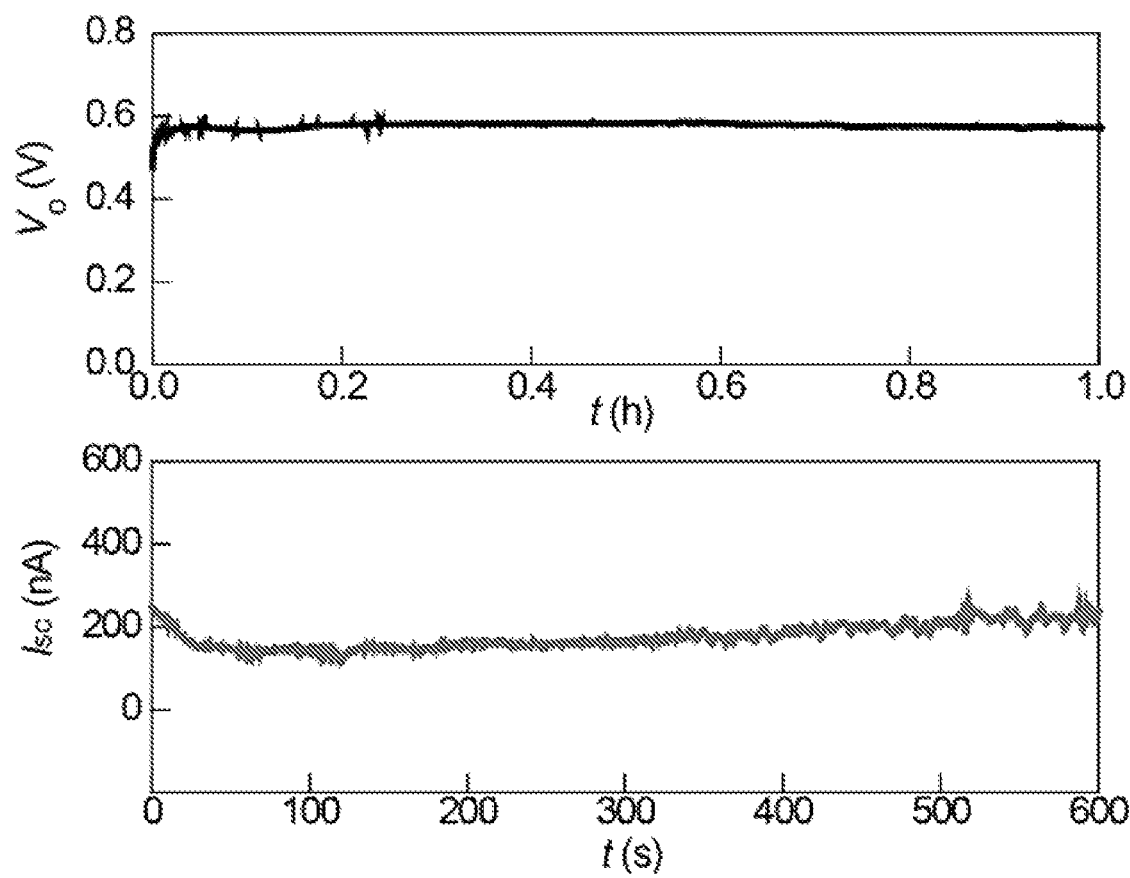
FIG. 29B is a graph of the measured $V_o$ and $I_{sc}$ from the device in the ambient environment (RH around 55%), showing similar value to that in open air.

Electric output in nanowire device placed in an air gap. With reference to FIG. 29A, a schematic of the measurement setup is depicted. The air gap (around 20 μm) was controlled by defining the height of the supports (around 20 μm thick polyethylene-terephthalate films) to a top silicon substrate (cover). The nanowire device (around 0.5×0.5 cm$^2$) had a film thickness around 10 μm. The top electrode was made by depositing Au layer (100 nm) on a polyimide substrate (around 1.2 μm thick). With reference to FIG. 29B, measured $V_o$ and $I_{sc}$ from the device in the ambient environment (RH around 55%) is depicted, showing similar value to that in open air.

Figure 30:
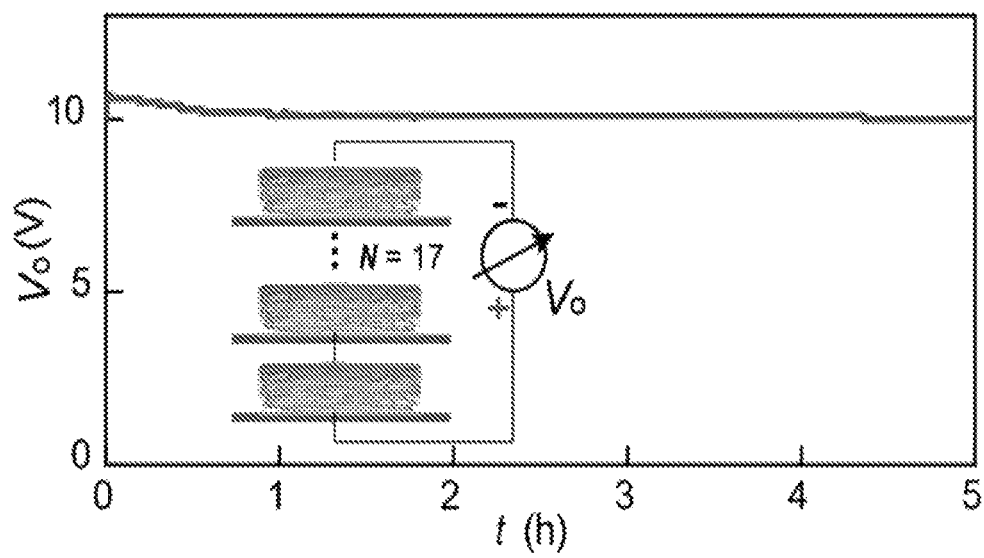
FIG. 30 is a schematic and graph showing voltage output from connected nanowire devices in series.

Voltage output from connected nanowire devices in series. With reference to FIG. 30, an output voltage $V_o$ around 10 V was produced by connecting 17 nanowire devices (each with film thickness around 7 μm) in series in the ambient environment (RH around 50%).

Figure 31:
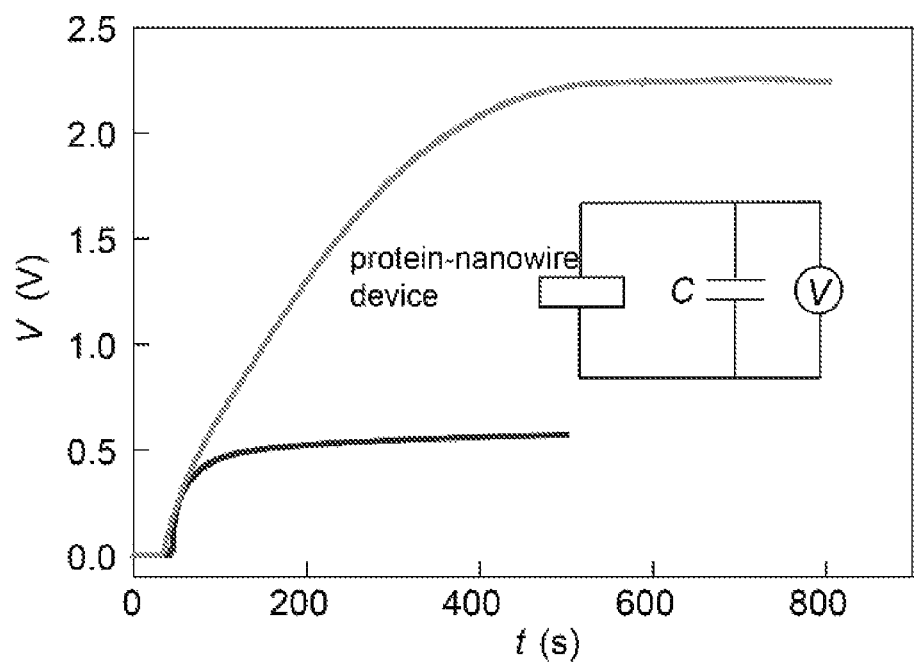
FIG. 31 is a schematic and graph showing charging to capacitor using nanowire devices.

Charing to capacitor using nanowire devices. With reference to FIG. 31, the capacitor's voltage gradually increased to the open-circuit voltage (around 0.5 V) of a nanowire device in the ambient environment (lower curve, RH around 60%), indicating the continuous energy input (charging) to the capacitor from the nanowire device. Multiple (4×) nanowire devices can be connected in series to charge the capacitor to higher voltage around 2.2 V (upper curve). This is also a direct evidence of the scalability in power output.

Figure 32A:
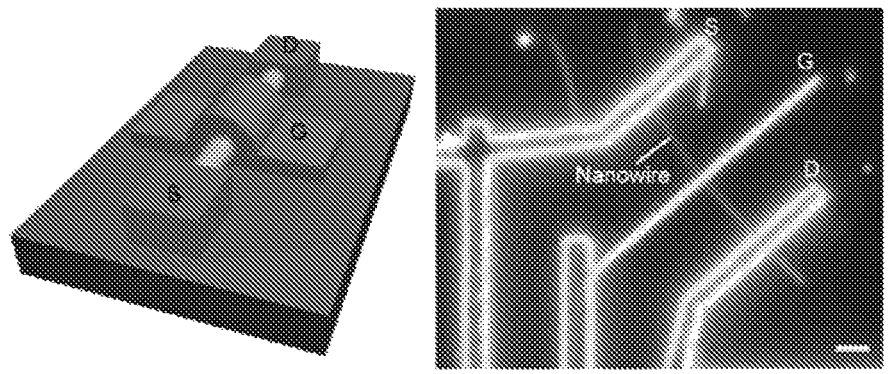
FIG. 32A is a schematic showing a Ge—Si core-shell nanowire transistor. The S, D and G denote source, drain and gate electrodes, respectively. The right panel shows a dark-field optical image of the fabricated nanowire transistor. Scale bar, 1 µm.
Figure 32B:
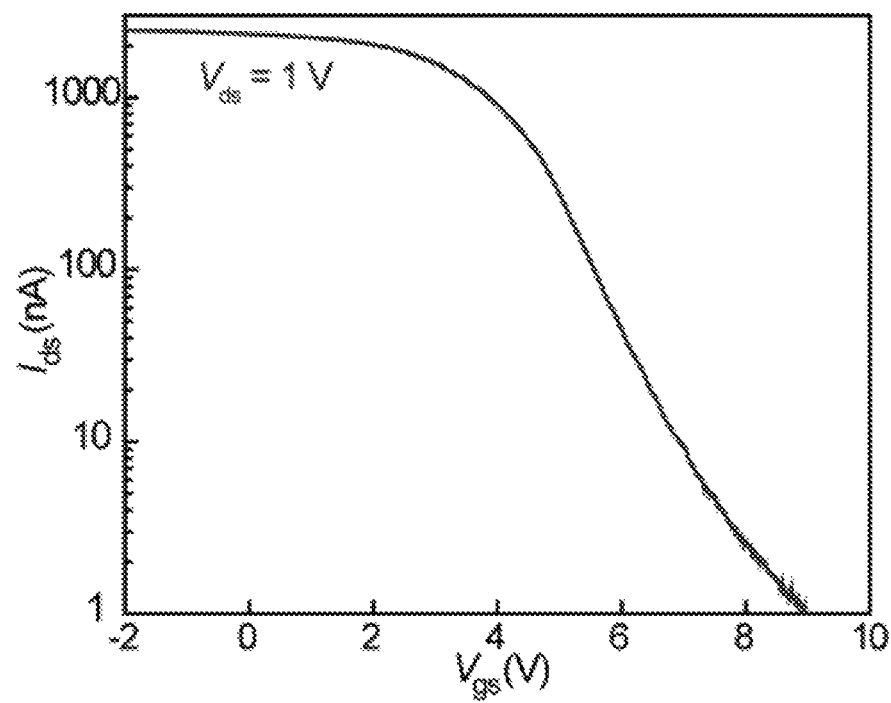
FIG. 32B is a graph showing a typical transfer curve from the transistor powered by external voltage $V_{ds}$=1 V.
Figure 32C:
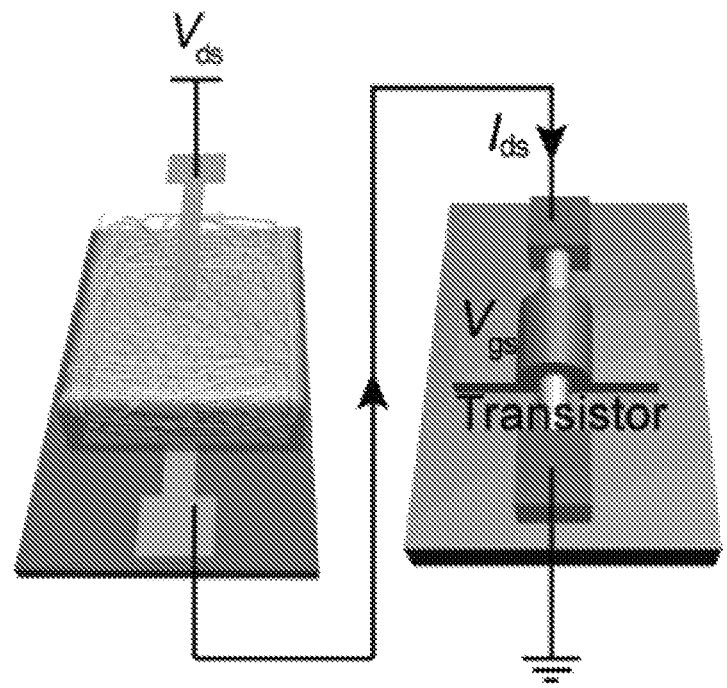
FIG. 32C is a schematic showing the use of a protein-nanowire device to power the Ge—Si nanowire transistor.
Figure 32D:
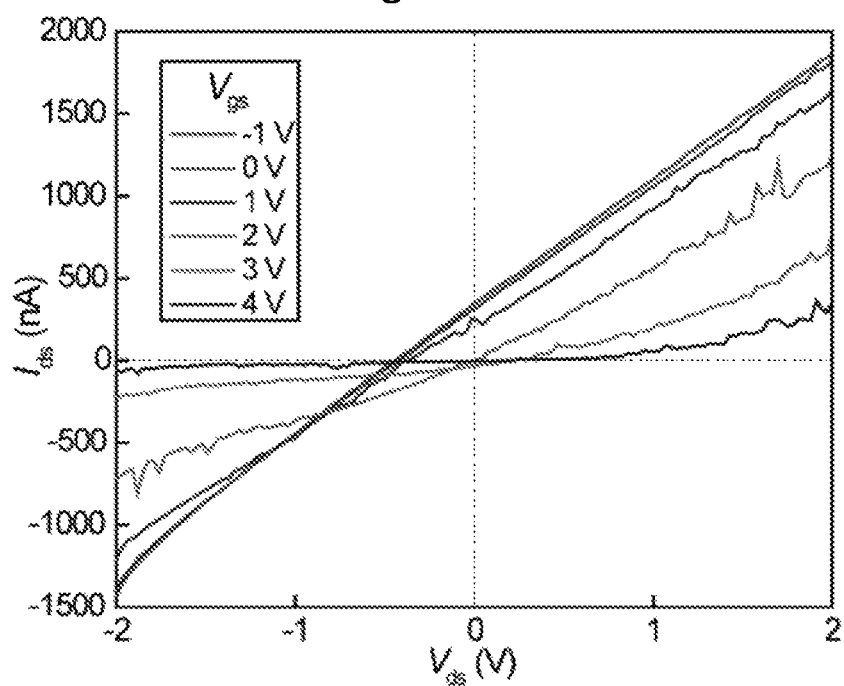
FIG. 32D is a graph showing source-drain current ($I_{ds}$) at different gate voltages ($V_{gs}$) measured from the transistor.

Ge—Si nanowire transistor and performance. With reference to FIG. 32A, a schematic of the Ge—Si core-shell nanowire transistor is depicted. The S, D and G denote source, drain and gate electrodes, respectively. The right panel shows a dark-field optical image of the fabricated nanowire transistor. Scale bar, 1 μm. With reference to FIG. 32B, a typical transfer curve from the transistor powered by external voltage $V_{ds}$=1 V is depicted. With reference to FIG. 32C, a schematic of using a protein-nanowire device to power the Ge—Si nanowire transistor is depicted. With reference to FIG. 32D, the source-drain current ($I_{ds}$) at different gate voltages ($V_{gs}$) measured from the transistor is depicted. The non-zero $I_{ds}$ at $V_{ds}$=0 indicates the powering from the protein-nanowire device. Note that the ON current in the protein nanowire-powered transistor was lower due to both a lower output voltage from the protein-nanowire device (e.g., around 0.5 V) and increased circuit resistance contributed from the internal resistance of the protein-nanowire device (e.g., around 2 MΩ).

Materials and Methods

Synthesis and purification of protein nanowires. *Geobacter sulfurreducens* (GS) was routinely cultured at 25° C. under strict anaerobic conditions (80/20 $N_2$—$CO_2$) in chemostats in the previously described mineral based medium containing acetate (15 mM) as the electron donor and fumarate (40 mM) as the electron acceptor. Cells were collected with centrifugation and re-suspended in 150 mM ethanolamine buffer (pH 10.5). The nanowires were harvested and purified. Briefly, protein nanowires were sheared from the cells in a blender. Cells were removed with centrifugation. The nanowires in the supernatant were precipitated with ammonium sulfate followed by centrifugation. The precipitate was re-suspended in ethanolamine buffer and additional debris was removed with centrifugation. The nanowires were collected with a second 10% ammonium sulfate precipitation and subsequent centrifugation at 13,000 g. The nanowires were re-suspended in ethanolamine buffer. This nanowire preparation was dialyzed against deionized water to remove the buffer and stored at 4° C.

Fabrication of protein-nanowire devices. The bottom electrode (Cr/Au, 10/100 nm) was first defined on a glass slide (25×75 mm², Fisher Scientific) by standard metal electron-beam evaporation using a shadow mask. A polydimethylsiloxane (PDMS, Sylgard 184, 10:1 mix ratio; Dow Corning) film (3-5 mm thick) was cut with an opening (1-25 mm²), which served as the well for holding nanowire solution and placed on the glass slide with the opening aligned to the defined bottom electrode. The purified nanowire solution was tuned to pH 2.0 by hydrochloric acid (HCl) solution to improve nanowire conductivity and dropcasted into the PDMS well. Nanowire film prepared by as-purified, close-to-neutral solution without HCl yielded similar electric output. The glass slide was then placed on a hot plate (around 80° C.) to facilitate solvent (water) evaporation to form nanowire thin film. Note the nanowires were revealed to be stable at temperature >100° C. The final nanowire-film thickness was controlled by tuning the solution volume over unit area. Empirically, 110 μL/cm² nanowire solution (150 μg/mL) yielded an average film thickness around 1 μm. The PDMS mold was removed after nanowire-film assembly. Finally, a confined gold electrode was placed on top of the nanowire film to complete the device structure for electrical measurement. Two forms of top gold electrodes were used. The first was a braided gold-plated shield (around 0.7 mm diameter, model CC-SC-50; LakeShore) and the second was a polyethylene terephthalate (PET) thin-film stripe (around 0.5 mm wide) coated with 50-nm gold film. Both top electrodes yielded close electrical outputs. For control protein-nanowire devices using printed carbon electrodes, conductive carbon film was printed using a desktop inkjet printer (DMP-2831, Dimatix; carbon ink: JR-700HV, NovaCentrix) on the glass slide and on a paper stripe to form the bottom and top electrodes, respectively.

Figure 33A:
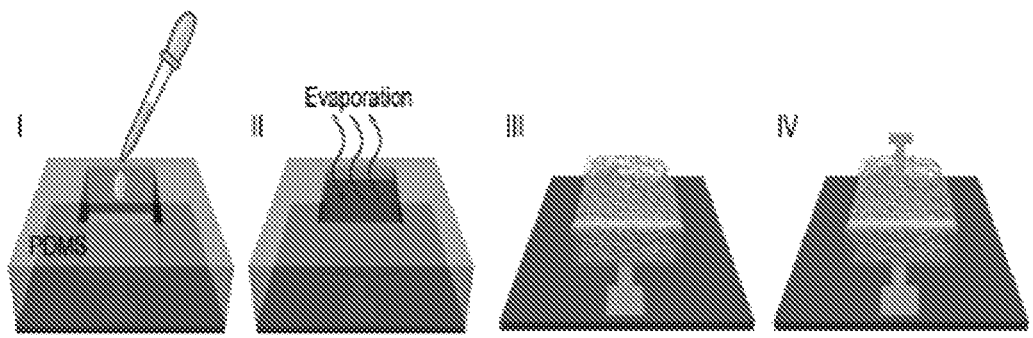
FIG. 33A is a schematic showing a fabrication process of the electric power generation device according to the present invention.
Figure 33B:
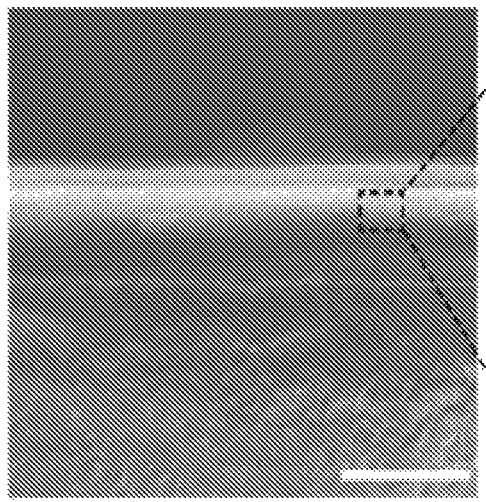
FIG. 33B is a scanning electron microscopy (SEM) image of a typical nanowire thin film. Scale bar, 10 µm.
Figure 33C:
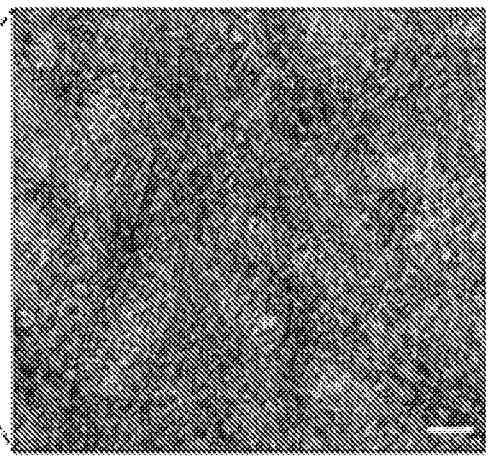
FIG. 33C is a transmission electron microscopy (TEM) image of the nanowire film at relatively high density.
Figure 33D:
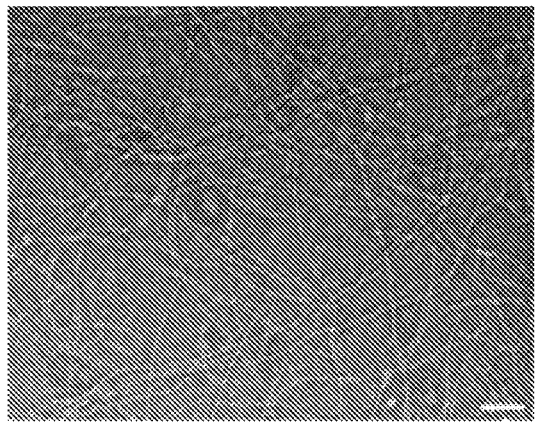
FIG. 33D is a TEM image of the nanowire film of FIG. 33C at low density. Scale bars, 100 nm.
Figure 33E:
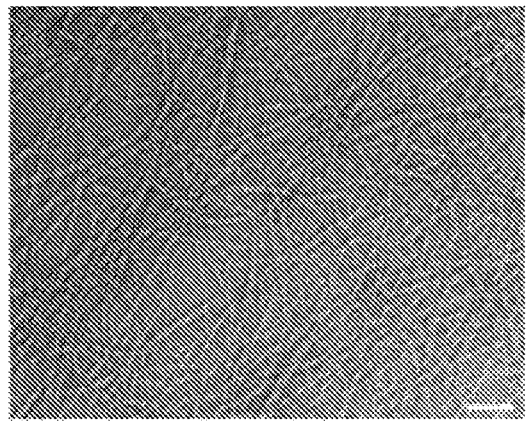
FIG. 33E is a TEM image of the nanowire film of FIG. 33C at medium density. Scale bars, 100 nm.
Figure 33F:
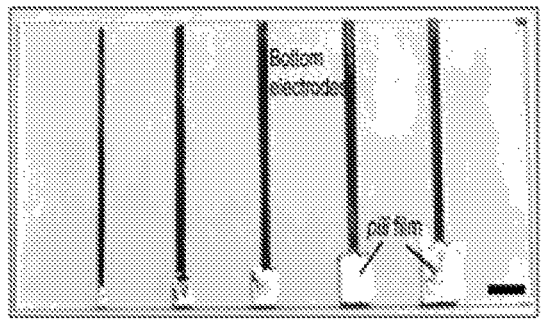
FIG. 33F is an image of an as-fabricated nanowire device array on a glass slide with different bottom-electrode sizes (e.g., 1, 4, 9, 16, 25 mm²).
Figure 33G:
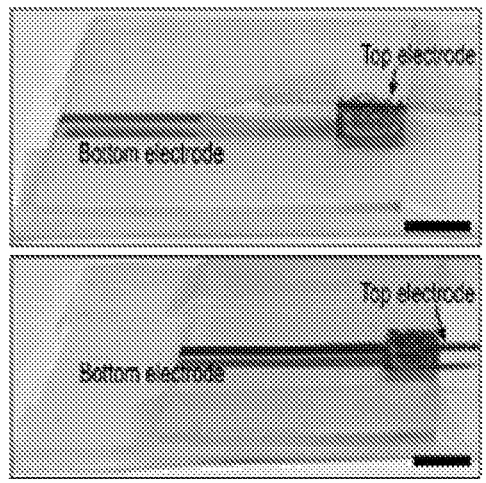
FIG. 33G is an image of typical nanowire devices using (top panel) braided gold-plated wire or (bottom panel) gold-coated PET stripe as the top electrodes.

FIG. 33A-G depicts the device fabrication and structure. With reference to FIG. 33A, a schematic of device fabrication is depicted. Specifically, in step I, purified nanowire solution (150 μg/mL) was first dropcasted on top of a defined Au bottom electrode by using a molded PDMS well. In step II, the device was then placed on a hotplate (around 80° C.) to facilitate the solvent (water) evaporation to (in step III) form nanowire thin film. In step IV, a confined top Au electrode was placed on the dry nanowire film to form the device. FIG. 33B depicts a scanning electron microscopy (SEM) image of a typical nanowire thin film prepared. Scale bar, 10 μm. FIG. 33C depicts a transmission electron microscopy (TEM) image of the nanowire film at relatively high density. Note that nanowire density in actual thin-film devices (4-7 μm thick) can be higher but was less transparent for TEM imaging. For comparison, TEM images of nanowire networks at low density (FIG. 33D) and medium density (FIG. 33E) are depicted. Scale bars, 100 nm. FIG. 33F depicts a photo image of an as-fabricated nanowire device array on a glass slide with different bottom-electrode sizes (e.g., 1, 4, 9, 16, 25 mm²). The top electrodes had not yet been placed on. Scale bar, 5 mm. FIG. 33G depicts typical nanowire devices using (top panel) braided gold-plated wire or (bottom panel) gold-coated PET stripe as the top electrodes. Scotch tape (outside the nanowire-film regime) was used to mechanically fix the top electrodes. Scale bars, 5 mm.

Figure 34A:
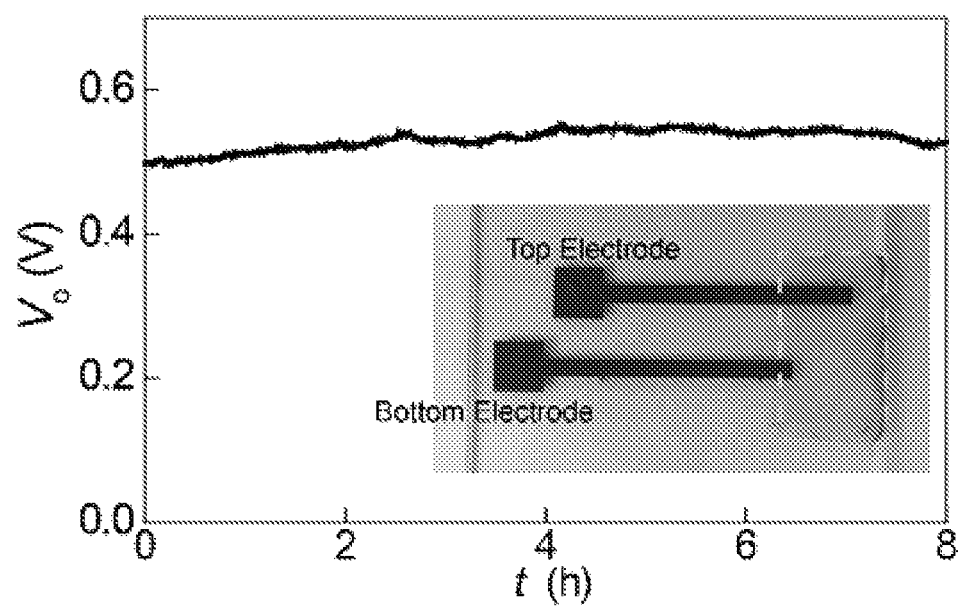
FIG. 34A is a schematic and graph showing an open-circuit voltage ($V_o$) recorded from a nanowire device using a pair of top and bottom carbon electrodes in the ambient environment (RH around 50%).
Figure 34B:
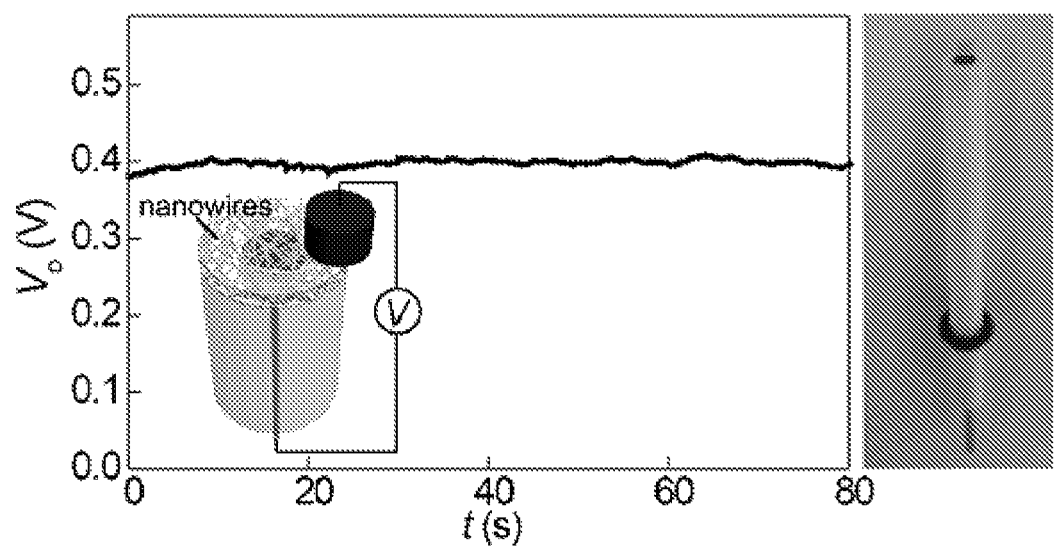
FIG. 34B is a schematic and graph showing an open-circuit voltage ($V_o$) recorded from a nanowire device using a pair of commercial glassy carbon electrodes in the ambient environment (RH around 40%).

FIGS. 34A-B depict control devices using carbon electrodes. With reference to FIG. 34A, the open-circuit voltage ($V_o$) was recorded from a nanowire device using a pair of top and bottom carbon electrodes in the ambient environment (RH around 50%). $V_o$ shows a stable average value around 0.5 V. The top and bottom carbon electrodes were printed on a paper stripe and glass slide, respectively (Inset). The brown dashed line delineates the nanowire film. The thickness of nanowire film was around 7 μm, and the size of the nanowire film was around 5×10 mm². With reference to FIG. 34B, to exclude possible side effect from contaminates in printed carbon electrodes, a pair of commercial glassy carbon electrodes was also used for the measurement. The open-circuit voltage ($V_o$ around 0.4 V) maintained in the ambient environment (RH around 40%). The inset shows the measurement setup. A nanowire film (around 7 μm thick) was deposited directly on the bottom glassy-carbon electrode, whereas the top glassy-carbon electrode was shifted to the film edge to allow moisture exposure. The right panel shows the actual glassy-carbon electrode.

Synthesis of Germanium-Silicon (Ge—Si) core-shell nanowires. The Ge—Si core-shell nanowires were synthesized by the Au-nanocluster-catalyzed vapor-liquid-solid method described previously. Specifically, a growth substrate (Si substrate with 600 nm thermal $SiO_2$, Nova Electronics) was first dispersed with gold nanoparticles (10 nm, Ted Pella). Then the growth substrate was placed in a quartz-tube reactor. The Ge core was synthesized at 270° C. and 450 Torr, with 30 sccm germane ($GeH_4$, 10% in $H_2$) and 200 sccm $H_2$ serving as the reactant and carrier gases, respectively. The growth time was around 1 hour, yielding Ge nanowires with an average length of around 50 μm and an average diameter 10 nm. The epitaxial Si shell was grown immediately after the growth of core at 460° C. and 5 Torr for 2 min, with 5 sccm silane ($SiH_4$) as the reactant gas. The epitaxial growth yielded an average Si shell thickness around 2-3 nm, resulting in core-shell nanowires with an overall diameter around 15 nm.

Fabrication of Ge—Si nanowire transistors. The Ge—Si nanowires were first dispersed in ethanol solution, assisted by a brief ultrasonication. Then the dispersed nanowires were dropcasted on a Si substrate coated with 600 nm $SiO_2$ (Nova Electronics). The source and drain contacts of the nanowires were defined by standard electron-beam lithography, followed by the thermal evaporation of metal contacts (Cr/Ni, 1/40 nm) and lift-off process. A tri-layer $Al_2O_3$/$ZrO_2$/$Al_2O_3$ (2/5/5 nm) was deposited by atomic-layer deposition to serve as the top-gate dielectric. The top-gate contact was definition by standard electron-beam lithography, thermal evaporation of metals (Cr/Au, 4/65 nm), and liftoff process.

Electrical measurements. The electrical measurements were performed in ambient environment, unless otherwise specified. The output voltage ($V_o$) in the nanowire devices was first buffered by a unit-gain amplifier (LM 741; Texas Instruments) and the short-circuit current ($I_{sc}$) was amplified with a preamplifier (DL-1211; DL Instruments). Both signals were then recorded at an acquisition rate of 10-100 Hz using a 16-channel A/D converter (Digidata 1440A; Molecular Devices) interfaced with a computer running recording software (pClamp 11; Molecular Devices). The reason to use a unit-gain amplifier (LM 741; Texas Instruments) for voltage-signal buffering is that the nanowire devices have an internal resistance ~MΩ, which is comparable to the input resistance of the A/D converter (around 1 MΩ), so a direct connection would induce measurement error. The RH in the ambient environment was recorded by using a humidity datalogger (R6030; REED Instruments). The current-voltage (I-V) sweep in the nanowire devices were performed by using a source meter (Keithley 2401; Tektronix) interfaced with computerized recording software. The transfer characteristics in the Ge—Si nanowire transistors were measured by using a semiconductor characterization system (Keithley 4200-SCS; Tektronix). The sheet resistance in the nanowire film was measured by using a four-point resistivity system (Pro-4; Signatone). Individual capacitors (CAPXON Electrolytic Capacitors; 1000 μF 16 V) were charged by nanowire devices with average ~0.55 V voltage output. The LCD (ADM1602K-NSW-FBS/3.3 V; Sparkfun electronics) was lighted by ten capacitors in series and LED (630-HLMP-K150; Mouser electronics) was lighted by 4 capacitors in series.

Humidity control. For some specific device characterizations carried out at controlled RH, the RH was tuned through two approaches. First, carrier gases (e.g., $N_2$, $O_2$, air) bubbling through a water-containing conical flask was led into a gas-purge desiccator cabinet (H42053-0002; Bel-Art), and the flow rate was adjusted to control the RH in the desiccator cabinet. The RH was real-time monitored by a hygrometer (Model 8706; REED Instruments). The bubbler method was used for controlled RH in different gas environments and moisture adsorption measurements. Alternatively, RH was controlled by tuning the equilibrium vapor pressure of sulfuric acid solutions, i.e., the concentration of sulfuric acid. The relationship between the concentration of sulfuric acid and (measured) RH is listed below. The equilibrium-vapor method was used for control of stabilized RH over long term, instant RH changes, and wide-range RHs.

| Concentration | RH |
|---|---|
| 68 w.t. % | 20% |
| 57 w.t. % | 35% |
| 45 w.t. % | 50% |
| 36 w.t. % | 65% |
| 15 w.t. % | 85% |
| 0 w.t. % | 100% |

Imaging. The thicknesses in protein-nanowire films were measured by a desktop scanning electron microscope (SEM, EM-30 Plus; Element Pi). The optical image of Ge—Si nanowire device was taken by using an upright microscope (Olympus BH2-UMA). The nanowire networks were imaged by using a transmission electron microscope (TEM, JEM-2200FS; JEOL). The bonding spectra in protein nanowires were performed by a Fourier-transform infrared spectroscopy (FTIR; Perkin Elmer) equipped with a universal attenuated-total-reflection (ATR) sampling accessory.

Molecular dynamics simulation. Atomistic MD (molecular dynamics) simulations of the protein nanowires were performed using the CHARMM program using the latest CHARMM 36 m force field. The initial structure was obtained from a previous modeling work. 12 monomers were included in this work, which is sufficient to provide intact filament environment for flexible C-terminal tails (Cter) of the first six monomers. Two simulations were performed in this work, one with the pilus filament in the vacuum phase (which mimics the fully dehydrated state), and the other one in solution phase (which mimics the fully hydrated state). For the pilus filament in vacuum, all Glu, Asp, Lys, and Arg residues were simulated in their neutral states. For the solution simulation, the filament was placed in a rectangular simulation box, solvated by 25,721 water molecules along with 24 $K^+$ ions to provide a neutral net charge of the system. The size of the simulation box was 21×7.5×7.3 $nm^3$ and periodic boundary conditions were imposed. Both systems were first energy minimized for 1000 steps using a steepest descent algorithm, and another 1000 steps using the adopted basis Newton Raphson method. The systems were then heated from 100 K to 300 K in 10 ps, during which all heavy atoms were retrained using harmonic potentials with force constants of 20 kcal/mol/$Å^2$. This was followed by additional 1 ns simulation where the restraint force constant was reduced to 0.2 kcal/mol/$Å^2$. In production simulations, the backbone heavy atoms of residues 4-50 were restrained by harmonic potentials with force constants of 0.2 kcal/mol/$Å^2$, to maintain the filament core structural model. The solvated system was simulated under NPT conditions at temperature of 300 K and pressure of 1 atm. Van der Waals interactions were truncated at 1.3 nm, with the force smoothly switching to zero starting from 1.2 nm. Long-range electrostatic interactions were calculated using the particle mesh Ewald method. Lengths of all hydrogen-containing bonds were constrained using the SHAKE algorithm, and the MD integration time step was 2 fs. The vacuum simulation was performed at 300 K with similar setups as used in solution. Both simulations lasted for 110 ns, with the first 10 ns trajectories discarded in the analysis.

Atomistic molecular modeling and simulations were performed to further examine the nanoscale water permeable pores that may be formed in a nanowire network. Inspired by the TEM images, parallel configurations where the filaments would achieve the tightest packing were primarily focused on. 588 simulations were performed, in which the relative position of these two filaments were shifted along two directions, parallel or perpendicular to the filament axis, and one of the filaments was rotated along the filament axis. One filament was defined as the reference filament, and the other filament was mobile. 21 windows were set up along the direction of the filament axis, with the relative shift of two filaments ranging from −4 to 4 nm with a spacing of 0.4 nm. At each shift along the filament axis, four windows were used along the direction perpendicular to the filament axis, with the relative distance between two filaments varied between 3.3 and 4.2 nm with an interval of 0.3 nm. Seven windows were used for the rotation of one filament, with rotation angles between 0 and 60° with an interval of 10°. At each window, MD simulations were performed to equilibrate inter-filament interfacial packing. During MD equilibration, all Cα atoms of the helical core segment (residues 4-50) were fixed, in order to maintain the integrity of both filaments and minimize modelling error due to undesired structural changes. Each system was first energy minimized for 2000 steps, and then slowly heated up from 100 K to 300 K in 5000 steps. Production simulations were performed under 300 K for 3 ns. During analysis, the first half of each trajectory was discarded as the equilibration process, and the averaged potential energy was computed for each window. This allowed one to identify the inter-filament distance and filament rotation with minimal averaged potential energy for each shift distance along the filament axis. The maximum enclosed pore was then analyzed using the HOLE program[14] for the most stable configuration identified at each shift along the filament axis.

Similar approaches were also used to examine the formation of water-permeable pores in OmcS-OmcS filaments and OmcS-pili filaments. In both cases, one OmcS filament was defined as the reference filament, and the other filament was mobile. 21 windows were set up along the direction of the filament axis, with the relative shift of two filaments ranging from −10 to 0 nm with a spacing of 0.5 nm. Since OmcS filament showed a sinusoidal shape with a period of around 20 nm, the pore radii as a function of their relative shift in this direction will be symmetric with respect to relative shift of 0 nm. At each shift along the filament axis, six windows were used along the direction perpendicular to the filament axis, with the relative distance between two filaments varied between 4.2 and 5.7 nm with an interval of 0.3 nm in this direction. In the system of OmcS-OmcS filaments, nine windows were used for the rotation of one filament, with rotation angles between 0 and 80° with an interval of 10°. In the system of OmcS-pili filaments, seven rotational windows were used with the rotation angles ranging from 0 to 60° with a spacing of 10°. At each window, 2000 steps of energy minimization were performed to remove any steric clashes, and the final structure was analyzed using the HOLE program to identify water-permeable pores. At each shift along the filament axis, only results from the structure with minimal energy were reported, since this configuration was considered most probable.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An electric power generation system comprising:
    an electric power generation device including
        a thin film or biofilm, the thin film or biofilm comprising protein nanowires and having an opposing first surface and second surface,
        a first electrode electrically connected to the first surface of the thin film or biofilm, and
        a second electrode electrically connected to the second surface of the thin film or biofilm; and
    an ambient environment comprising an atmospheric relative humidity of at least 20%;
    wherein at least one of the first surface and the second surface of the thin film or biofilm is at least partially exposed to the ambient environment;
    wherein a moisture gradient is created and maintained in the thin film or biofilm;
    wherein the thin film or biofilm has a thickness in a range of 0.5 µm-20 µm; and
    wherein at least one of the first electrode and the second electrode has an area that is smaller than an area of the thin film or biofilm.

2. The system of claim 1, wherein the protein nanowires are of at least one of the microorganisms *Geobacter sulfurreducens, Geobacter metallireducens, Syntrophus aciditrophicus*, and *Methanospirillum hungatei*.

3. The system of claim 1, wherein at least two electric power generation devices are stacked in a three-dimensional configuration, wherein at least one of the first surface and the second surface of the thin film or biofilm of each electric power generation devices are at least partially exposed to the atmospheric relative humidity in the ambient environment.

4. The system of claim 1, wherein the first electrode and the second electrode comprise one or more of gold, platinum, aluminum and carbon.

5. The system of claim 1, wherein the thin film or biofilm has a thickness in a range of 4.0 µm-7.0 µm.

6. The system of claim 1, wherein the atmospheric relative humidity is in a range of 30%-90%.

7. The system of claim 1, wherein the thin film or biofilm comprises a composite material of protein nanowires of two or more species of bacteria.

8. The system of claim 1, wherein the thin film or biofilm comprises nanopores, the nanopores having an average size in a range of 0.1 nm-10 nm.

9. The system of claim 1, wherein the first electrode has an area that is different from an area of the second electrode.

10. The system of claim 1, wherein the protein nanowires are at least one of:
    genetically modified Aro-5 nanowires, OmcS-pili nanowires, OmcS-OmcS pili nanowires, and organic synthetic nanowires.

11. A method of continuously producing electric power using atmospheric relative humidity in an ambient environment, the method comprising:
    providing an electric power generation device comprising:
        a thin film or biofilm, the thin film or biofilm comprising protein nanowires and having an opposing first surface and second surface,
        a first electrode electrically connected to the first surface of the thin film or biofilm, and
        a second electrode electrically connected the second surface of the thin film or biofilm;
    at least partially exposing at least one of the first surface and the second surface of the thin film or biofilm of the electric power generation device to the ambient environment, wherein the atmospheric relative humidity is at least 20%;
    forming and maintaining a moisture gradient in the thin film or biofilm; and
    continuously generating power in the electric power generation device;
    wherein the thin film or biofilm has a thickness in a range of 0.5 µm-20 µm; and
    wherein at least one of the first electrode and the second electrode has an area that is smaller than an area of the thin film or biofilm.

12. The method of claim 11, wherein the protein nanowires are harvested from one or more of the microorganisms *Geobacter sulfurreducens, Geobacter metallireducens, Syntrophus aciditrophicus*, and *Methanospirillum hungatei*.

13. The method of claim 11, further comprising:
    providing at least two of the electric power generation devices, and
    stacking the at least two electric power generation devices in a three-dimensional configuration, wherein at least a portion of at least one of the first and second surfaces of the thin film or biofilm of each of the at least two electric power generation devices is at least partially exposed to the ambient environment.

14. The method of claim 11, wherein the first electrode and the second electrode comprise one or more of gold, platinum, aluminum and carbon.

15. The method of claim 11, wherein the thin film or biofilm has a thickness in a range of 4.0 µm-7.0 µm.

16. The method of claim 11, wherein the atmospheric relative humidity is in a range of 30%-90%.

17. The method of claim 11, wherein the thin film or biofilm is around 7 µm thick.

18. The method of claim 11, wherein the protein nanowires are at least one of: genetically modified Aro-5 nanowires, OmcS-pili nanowires, OmcS-OmcS pili nanowires, and organic synthetic nanowires.

19. An electric power generation device, comprising:
a thin film or biofilm, the thin film or biofilm comprising protein nanowires and having an opposing first surface and second surface;
a first electrode electrically connected to the first surface of the thin film or biofilm; and
a second electrode electrically connected to the second surface of the thin film or biofilm, at least a portion of one of the first surface and the second surface of the thin film or biofilm configured to be exposed to an ambient environment, the thin film or biofilm configured to create and maintain a moisture gradient when exposed to an ambient environment comprising an atmospheric relative humidity of at least 20%;
wherein the thin film or biofilm has a thickness in a range of 0.5 µm-20 µm; and
wherein at least one of the first electrode and the second electrode has an area that is smaller than an area of the thin film or biofilm.

20. The system of claim 1, wherein the thin film or biofilm is around 7 µm thick.

21. The device of claim 19, wherein the thin film or biofilm is around 7 µm thick.

22. The device of claim 19, wherein the protein nanowires are of at least one of the microorganisms *Geobacter sulfurreducens, Geobacter metallireducens, Syntrophus aciditrophicus*, and *Methanospirillum hungatei.*

23. The device of claim 19, wherein the protein nanowires are at least one of: genetically modified Aro-5 nanowires, OmcS-pili nanowires, OmcS-OmcS pili nanowires, and organic synthetic nanowires.

24. The device of claim 19, wherein the first electrode and the second electrode comprise one or more of gold, platinum, aluminum, and carbon.

25. The device of claim 19, wherein the thin film or biofilm has a thickness in a range of 4.0 µm-7.0 µm.

26. The device of claim 19, wherein the atmospheric relative humidity is in a range of 30%-90%.

27. The device of claim 19, wherein the thin film or biofilm comprises a composite material of protein nanowires of two or more species of bacteria.

28. The device of claim 19, wherein the thin film or biofilm comprises nanopores, the nanopores having an average size in a range of 0.1 nm-10 nm.

29. An electric power generation device, comprising:
a thin film or biofilm, the thin film or biofilm comprising protein nanowires and having an opposing first surface and second surface;
a first electrode electrically connected to the first surface of the thin film or biofilm; and
a second electrode electrically connected to the second surface of the thin film or biofilm, at least a portion of one of the first surface and the second surface of the thin film or biofilm configured to be exposed to an ambient environment, the thin film or biofilm configured to create and maintain a moisture gradient when exposed to an ambient environment comprising an atmospheric relative humidity of at least 20%;
wherein the thin film or biofilm has a thickness in a range of 0.5 µm-20 µm; and
wherein the first electrode has an area that is different from an area of the second electrode.

* * * * *